United States Patent
Agiwal et al.

(10) Patent No.: US 11,324,036 B2
(45) Date of Patent: May 3, 2022

(54) APPARATUS AND METHOD FOR ALLOCATING RESOURCE AND TRANSMITTING/RECEIVING RESOURCE ALLOCATION INFORMATION IN COMMUNICATION SYSTEM SUPPORTING DEVICE TO DEVICE SCHEME

(71) Applicant: Samsung Electronics Co., Ltd., Suwon-si (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 16/735,921

(22) Filed: Jan. 7, 2020

(65) Prior Publication Data

US 2020/0146051 A1    May 7, 2020

Related U.S. Application Data

(63) Continuation of application No. 15/033,817, filed as application No. PCT/KR2014/010418 on Nov. 3, 2014, now Pat. No. 10,531,485.

(30) Foreign Application Priority Data

Nov. 1, 2013   (IN) ............................. 1253/KOL/2013
Feb. 6, 2014   (IN) .............................. 157/KOL/2014
(Continued)

(51) Int. Cl.
*H04W 4/00*       (2018.01)
*H04W 74/00*      (2009.01)
(Continued)

(52) U.S. Cl.
CPC ......... *H04W 74/002* (2013.01); *H04W 8/005* (2013.01); *H04W 72/0413* (2013.01); *H04W 76/14* (2018.02)

(58) Field of Classification Search
USPC ....... 370/229, 230, 236, 252, 328, 329, 330, 370/331
See application file for complete search history.

(56) References Cited

U.S. PATENT DOCUMENTS

| 9,532,400 B2 | 12/2016 | Schmidt et al. |
| 2011/0106952 A1 | 5/2011 | Doppler et al. |

(Continued)

FOREIGN PATENT DOCUMENTS

| CA | 2 882 856 A1 | 2/2014 |
| CN | 102857901 A | 1/2013 |

(Continued)

OTHER PUBLICATIONS

ZTE, Discussion of D2D Discovery, 3GPP TSG-RAN WG1 #74, Barcelona, Spain, Aug. 19-23, 2013, pp. 1-10, R1-133149.
(Continued)

*Primary Examiner* — Nguyen H Ngo
(74) *Attorney, Agent, or Firm* — Jefferson IP Law, LLP

(57) ABSTRACT

A method for being allocated a discovery resource by a user equipment (UE) in a communication system supporting a device to device (D2D) scheme is provided. The method includes determining whether a discovery resource request message may be transmitted to a network entity; transmitting the discovery resource request message to the network entity based on the determining result; and receiving a discovery resource response message as a response message to the discovery resource request message from the network entity.

16 Claims, 23 Drawing Sheets

(30) Foreign Application Priority Data

| Mar. 13, 2014 | (IN) | .............................. 310/KOL/2014 |
| Apr. 29, 2014 | (IN) | .............................. 498/KOL/2014 |
| Sep. 24, 2014 | (IN) | .............................. 979/KOL/2014 |

(51) Int. Cl.
  *H04W 8/00* (2009.01)
  *H04W 72/04* (2009.01)
  *H04W 76/14* (2018.01)

(56) References Cited

U.S. PATENT DOCUMENTS

| 2013/0059583 | A1 | 3/2013 | Phan et al. | |
| 2013/0109301 | A1 | 5/2013 | Hakola et al. | |
| 2013/0188546 | A1 | 7/2013 | Turtinen et al. | |
| 2013/0290696 | A1 | 10/2013 | Broustis et al. | |
| 2013/0322388 | A1 | 12/2013 | Ahn et al. | |
| 2014/0056220 | A1 | 2/2014 | Poitau et al. | |
| 2014/0106757 | A1* | 4/2014 | Hakola | H04W 76/23 455/440 |
| 2014/0213221 | A1 | 7/2014 | Chai et al. | |
| 2014/0321430 | A1* | 10/2014 | Bakker | H04W 36/0072 370/331 |
| 2014/0342747 | A1* | 11/2014 | Lee | H04W 76/14 455/450 |
| 2014/0348081 | A1* | 11/2014 | Liao | H04L 67/16 370/329 |
| 2014/0378123 | A1* | 12/2014 | Stojanovski | H04L 5/0096 455/422.1 |
| 2015/0043448 | A1 | 2/2015 | Chatterjee et al. | |
| 2015/0222401 | A1 | 8/2015 | Xu et al. | |
| 2015/0230144 | A1* | 8/2015 | Wu | H04W 36/14 370/331 |
| 2015/0327046 | A1* | 11/2015 | Lee | H04W 76/14 370/338 |
| 2015/0382389 | A1 | 12/2015 | Seo | |
| 2016/0128116 | A1* | 5/2016 | Kim | H04W 4/70 370/329 |
| 2016/0142898 | A1 | 5/2016 | Poitau et al. | |
| 2016/0198508 | A1 | 7/2016 | Lee et al. | |
| 2016/0205534 | A1 | 7/2016 | Fujishiro et al. | |
| 2016/0242221 | A1 | 8/2016 | Jung et al. | |
| 2016/0373915 | A1 | 12/2016 | Kim et al. | |
| 2018/0035441 | A1 | 2/2018 | Chatterjee et al. | |

FOREIGN PATENT DOCUMENTS

| CN | 103327568 A | 9/2013 |
| WO | 2012/091418 A2 | 7/2012 |
| WO | 2015/053382 A1 | 4/2015 |
| WO | 2015-065881 A1 | 5/2015 |

OTHER PUBLICATIONS

ASUSTeK, Method of Resource Allocation for D2D Discovery, 3GPP TSG RAN WG1 Meeting #74bis, Guangzhou, China, Oct. 7-11, 2013, pp. 1-9, R1-134638.

Samsung, Direct Discovery Resource Allocation, 3GPP TSG RAN WG2 Meeting #84, San Francisco, USA, Nov. 11-15, 2013, pp. 1-5.
Samsung; Direct Discovery Resource Allocation; 3GPP TSG RAN WG2 Meeting #83-bis; R2-133214; Oct. 7-11, 2013; Ljubljana, Slovenia.
Samsung; UE state for D2D Direct Discovery; 3GPP TSG RAN WG2 Meeting #83-bis; R2-133215; Oct. 7-11, 2013; Ljubljana, Slovenia.
Intel Corporation; On Resource Allocation and System Operation for D2D Discovery; 3GPP TSG RAN WG1 Meeting #74bis; R1-134141; Oct. 7-11, 2013; Guangzhou, China.
3GPP; 3rd Generation Partnership Project; Technical Specification Group Services and System Aspects; Study on architecture enhancements to support Proximity-based Services (ProSe) (Release 12); 3GPP TR 23.703; V07.1; (Sep. 2013); Oct. 11, 2013; Valbonne, France.
Samsung; Discovery Resource Configuration Signaling; 3GPP TSG RAN WG2 Meeting #85; R2-140193; Feb. 10-14, 2014; Prague, Czech Republic.
Samsung; Signaling flows for Type 2B Resource Allocation; 3GPP TSG RAN WG2 Meeting #85bis; R2-141388; Mar. 31-Apr. 4, 2014; Valencia, Spain.
Design aspects for D2D discovery; Discussion and Decision; ETRI 3GPP TSG RAN WG1; R1-133180; Meeting #74 Aug. 2013, Barcelona, Spain.
3GPP TSG-RAN 2. Meeting #83bis. Intel Corporation, Resource allocation for D2D discovery. R2-133512, Internet URL: http://www.3gpp.org / ftp / tsg_ran/WG2_RL2/TSGR2_83bis/Docs / R2-133512.zip , Ljubljana, Slovenia, Oct. 7-11, 2013.
3GPP TSG-RAN2 Meeting # 83. Intel Corporation, Discussion on RAN2 Aspects of D2D Discovery [online], 3GPP TSG-RAN2 Meeting # 83 R2-132823, Internet URL: http: //www.3gpp.org/ftp/tsg_ran/WG2_RL2/TSGR2_83/Docs/R2-132823.zip. Barcelona, Spain, Aug. 19-23, 2013.
3GPP TSG RAN WG1 Meeting # 74bis. CATT, Further discussion on resource allocation for D2D discovery, R1-134116, Internet URL: http://www.3gpp.org/ftp/tsg_ran/WG1_RL1/TSGR1_74b/ Docs / R1-134116.zip. Guangzhou, China, Oct. 7-11, 2013.
Japan Examination Report dated Jul. 12, 2019, issued in Japanese Application No. 2016-552389.
Shines Office Action dated Sep. 17, 2018, issued in a counterpart Chinese application No. 201480072050.9.
Japanese Office Action dated Nov. 5, 2018, issued in a counterpart Japanese application No. 2016-552389.
HiSilicon; RAN2 considerations for Proximity Discovery; R2-132753;[online].
Indian Office Action dated Aug. 25, 2020, issued in Indian Application No. 1128/KOL/2014.
Japanese Decision on Grant dated Sep. 6, 2021, issued in Japanese Application No. 2020-080431.
Canadian Office Action dated Jan. 11, 2022, issued in Canadian Patent Application No. 2,929,354.

* cited by examiner

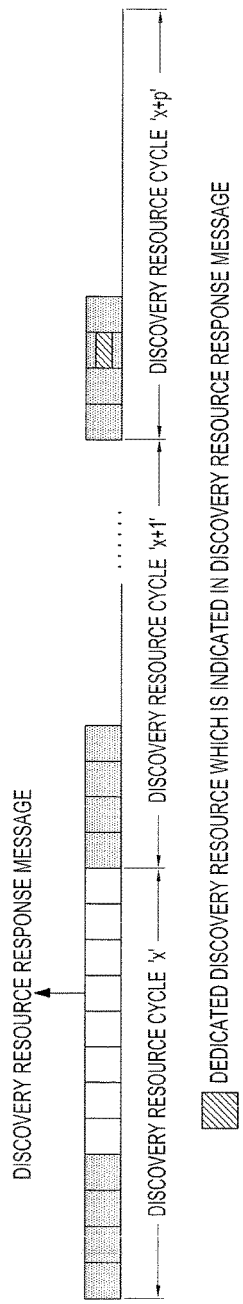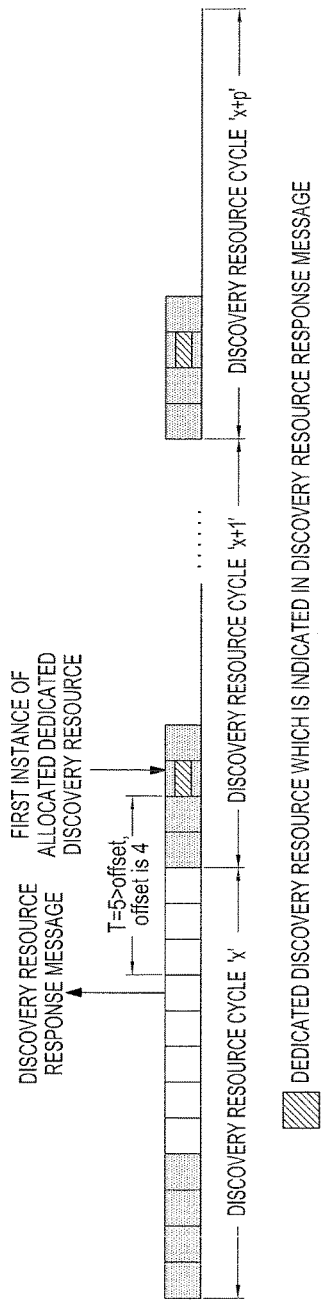

APPARATUS AND METHOD FOR ALLOCATING RESOURCE AND TRANSMITTING/RECEIVING RESOURCE ALLOCATION INFORMATION IN COMMUNICATION SYSTEM SUPPORTING DEVICE TO DEVICE SCHEME

CROSS-REFERENCE TO RELATED APPLICATION(S)

This application is a continuation application of prior application Ser. No. 15/033,817, filed on May 2, 2016, which has issued as U.S. Pat. No. 10,531,485 on Jan. 7, 2020 and is a U.S. National Stage application under 35 U.S.C. § 371 of an International Application filed on Nov. 3, 2014, and assigned application number PCT/KR2014/010418, which claimed the benefit of an Indian patent application filed on Nov. 1, 2013, in the Indian Patent Office and assigned Serial number 1253/KOL/2013, an Indian patent application filed on Feb. 6, 2014, in the Indian Patent Office and assigned Serial number 157/KOL/2014, an Indian patent application filed on Mar. 13, 2014, in the Indian Patent Office and assigned Serial number 310/KOL/2014, of an Indian patent application filed on Apr. 29, 2014, in the Indian Patent Office and assigned Serial number 498/KOL/2014, and of an Indian patent application filed on Sep. 24, 2014, in the Indian Patent Office and assigned Serial number 979/KOL/2014, the entire disclosures of which are hereby incorporated by reference.

TECHNICAL FIELD

The present disclosure relates to an apparatus and method for allocating resource and transmitting/receiving resource allocation information in a communication system supporting a device to device (D2D) scheme. More particularly, the present disclosure relates to an apparatus and method for allocating resource to a transmitting D2D user equipment (UE) (TX D2D UE) and transmitting/receiving information on a dedicated resource which is allocated to the TX D2D UE in a communication system supporting a D2D scheme.

BACKGROUND ART

A D2D discovery process is a process of determining whether a D2D-enabled UE is in proximity of other D2D-enabled UE. A discovering D2D-enabled UE determines whether other D2D-enabled UE is of interest to the discovering D2D-enabled UE based on the D2D discovery process. The other D2D-enabled UE is of interest to the discovering D2D-enabled UE if proximity of the other D2D-enabled UE needs to be known by one or more authorized applications on the discovering D2D-enabled UE. For example, a social networking application may be enabled to use a D2D discovery feature. The D2D discovery process enables a D2D-enabled UE of a given user of a social networking application to discover D2D-enabled UEs of friends of the given user of the social networking application, or to be discoverable by the D2D-enabled UEs of the friends of the given user of the social networking application. In another example, the D2D discovery process may enable the D2D-enabled UE of a given user of a search application to discover stores/restaurants, and the like of interest of the D2D-enabled UE of the given user of the search application in proximity of the D2D-enabled UE of the given user of the search application.

The D2D discovery process may be implemented in various forms, and this will be described below.

The D2D-enabled UE may discover other D2D-enabled UEs in proximity of the D2D-enabled UE using direct UE-to-UE signaling. The D2D discovery process which uses the direct UE-to-UE signaling is called a D2D direct discovery process.

Alternatively, a communication network determines proximity of two D2D-enabled UEs, and informs the two D2D-enabled UEs of the proximity of the two D2D-enabled UEs. The D2D discovery process in which the communication network determines proximity of D2D-enabled UEs, and informs the D2D-enabled UEs of the proximity of the D2D-enabled UEs is called a network assisted D2D discovery process.

In the D2D direct discovery process, the D2D UE transmits discovery information on the discovery resource.

A pool of resources (i.e. a discovery resource pool) is reserved by the network for D2D direct discovery process. A TX D2D UE randomly selects a resource from the discovery resource pool, and transmits discovery information using the selected discovery resource. A RX D2D UE monitors all of discovery resources included in the discovery resource pool in order to receive the discovery information. This scheme results in collision among discovery signals which are transmitted by a plurality of TX D2D UEs. So, if the network (i.e., a base station (or an eNB) or a centralized resource coordinator) allocates a dedicated discovery resource to a TX D2D UE, the collision among the discovery signals may be avoided.

One of issues in the dedicated discovery resource allocation is how the TX D2D UE obtains resources from network. In a conventional communication network a TX D2D UE transmits a buffer status report (BSR) using medium access control (MAC) control element to a network entity (e.g. a base station or an enhanced nodeB), wherein the BSR comprises of number of bytes which the TX D2D UE wants to transmit to the network. In response to BSR, the network entity transmits a physical downlink common control channel (PDCCH) carrying control information which indicates the allocated resources. The PDCCH is masked with a radio network terminal identifier assigned to the TX D2D UE. It will be noted that this approach is not suitable for dedicated discovery resource allocation as it requires a new BSR format for discovery as a network entity should know whether the TX D2D UE needs resources for discovery or for transmission to the network. Additionally, the TX D2D UE requires a new downlink control information (DCI) format as resources for discovery are different from resources used for communication with the network. It also requires a new radio network temporary identifier (RNTI) to be assigned to the TX D2D UE to differentiate a PDCCH for discovery from the PDCCH for communication with the network. So, there is a need for a new scheme to allocate dedicated discovery resources to the TX D2D UE.

Another issue in the dedicated discovery resource allocation is that the TX D2D UE may acquire a dedicated discovery resource for transmitting the discovery signal from the base station, and the RX D2D UE has to monitor all of the discovery resources which are allocated for discovery. The discovery information which is transmitted by the TX D2D UE may be received by several RX D2D UEs. Generally, the D2D TX UE does not know which RX D2D UEs will receive the discovery information which is transmitted by the D2D TX UE.

So, upon requesting a dedicated discovery resource to the base station, the TX D2D UE cannot indicate to the base station which RX D2D UEs will receive the discovery information which is transmitted by the TX D2D UE. While allocating a dedicated discovery resource to the TX D2D UE, the base station does not know RX D2D UEs. The RX D2D UEs do not know a cell specific UE identifier (ID) of the TX D2D UE in which the RX D2D UEs are interested.

So, there is also a need for a scheme of notifying information on a dedicated discovery resource which is used by the TX D2D UE to a RX D2D UE.

The above information is presented as background information only to assist with an understanding of the present disclosure. No determination has been made, and no assertion is made, as to whether any of the above might be applicable as prior art with regard to the present disclosure.

DISCLOSURE

Technical Problem

An aspect of the present disclosure is to address at least the above-mentioned problems and/or disadvantages and to provide at least the advantages described below. Accordingly, an aspect of the present disclosure is to provide an apparatus and method for allocating a resource in a communication system supporting a D2D scheme.

Another aspect of the present disclosure is to provide an apparatus and method for allocating a resource based on a state of a TX D2D UE in a communication system supporting a D2D scheme.

Another aspect of the present disclosure is to provide an apparatus and method for managing resource allocation information based on a D2D identifier (ID) of a TX D2D UE in a communication system supporting a D2D scheme.

Another aspect of the present disclosure is to provide an apparatus and method for transmitting/receiving resource allocation information in a communication system supporting a D2D scheme.

Another aspect of the present disclosure is to provide an apparatus and method for transmitting/receiving resource allocation information for a discovery resource which is allocated to a TX D2D UE in a communication system supporting a D2D scheme.

Another aspect of the present disclosure is to provide an apparatus and method for transmitting/receiving resource allocation information thereby a RX D2D UE reduces monitoring overhead for a discovery resource in a communication system supporting a D2D scheme.

Another aspect of the present disclosure is to provide an apparatus and method for transmitting/receiving resource allocation information thereby providing information on a RX D2D UE which receives discovery information through a discovery resource which is allocated to a TX D2D UE in a communication system supporting a D2D scheme.

Technical Solution

In accordance with an aspect of the present disclosure, a method for being allocated a discovery resource by a user equipment (UE) in a communication system supporting a device to device (D2D) scheme is provided. The method includes determining whether a discovery resource request message may be transmitted to a network entity; transmitting the discovery resource request message to the network entity based on the determining result; and receiving a discovery resource response message as a response message to the discovery resource request message from the network entity.

In accordance with another aspect of the present disclosure, a user equipment (UE) in a communication system supporting a device to device (D2D) scheme is provided. The UE includes a controller configured to determine whether a discovery resource request message may be transmitted to a network entity; a transmitter configured to perform a operation of transmitting the discovery resource request message to the network entity based on the determining result; and a receiver configured to receive a discovery resource response message as a response message to the discovery resource request message from the network entity.

Advantageous Effects

As is apparent from the foregoing description, an embodiment of the present disclosure enables to allocate a resource in a communication system supporting a D2D scheme.

An embodiment of the present disclosure enables to allocate a resource based on a state of a TX D2D UE in a communication system supporting a D2D scheme.

An embodiment of the present disclosure enables to manage resource allocation information based on a D2D identifier (ID) of a TX D2D UE in a communication system supporting a D2D scheme.

An embodiment of the present disclosure enables to transmit/receive resource allocation information in a communication system supporting a D2D scheme.

An embodiment of the present disclosure enables to transmit/receive resource allocation information for a discovery resource which is allocated to a TX D2D UE in a communication system supporting a D2D scheme.

An embodiment of the present disclosure enables to transmit/receive resource allocation information thereby a RX D2D UE reduces monitoring overhead for a discovery resource in a communication system supporting a D2D scheme.

An embodiment of the present disclosure enables to transmit/receive resource allocation information thereby providing information on a RX D2D UE which receives discovery information through a discovery resource which is allocated to a TX D2D UE in a communication system supporting a D2D scheme.

DESCRIPTION OF DRAWINGS

The above and other aspects, features and advantages of certain exemplary embodiments of the present disclosure will be more apparent from the following description taken in conjunction with the accompanying drawings, in which:

FIG. 2 schematically illustrates time from which a received discovery resource configuration in a discovery resource response message is applicable and used by a TX D2D UE 111 in FIG. 1 for a discovery information transmission according to an embodiment of the present disclosure;

FIG. 3 schematically illustrates time from which a received discovery resource configuration in a discovery resource response message is applicable and used by a TX D2D UE 111 for a discovery information transmission according to another embodiment of the present disclosure;

Throughout the drawings, it should be noted that like reference numbers are used to depict the same or similar elements, features, and structures.

MODE FOR INVENTION

Figure 1:
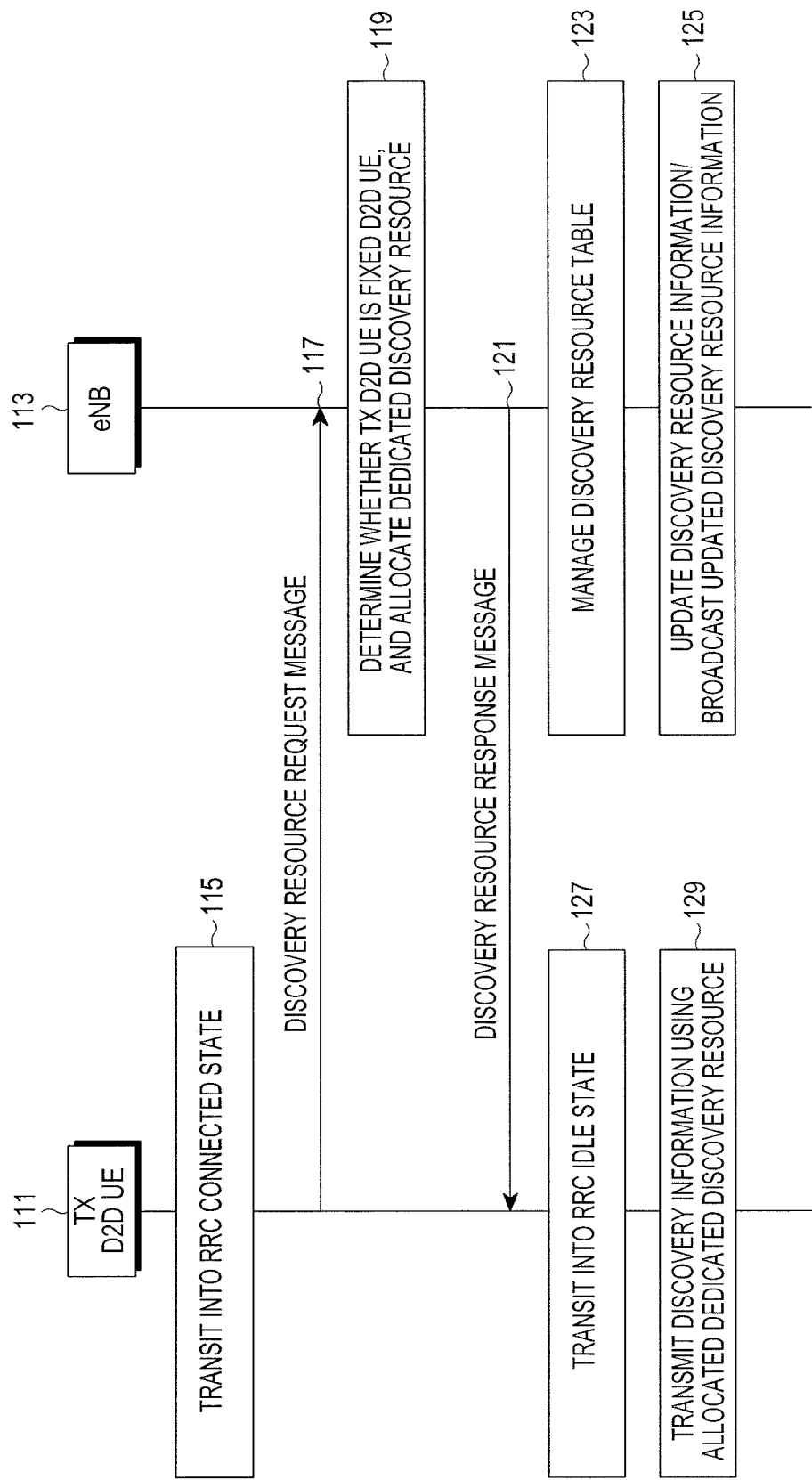
FIG. 1 schematically illustrates an example of a process of allocating a dedicated discovery resource to a TX D2D UE in a communication system supporting a D2D scheme according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a user equipment (UE) may be an electronic device.

An embodiment of the present disclosure proposes an apparatus and method for allocating a resource in a communication system supporting a device to device (D2D) scheme.

An embodiment of the present disclosure proposes an apparatus and method for allocating a resource based on a state of a transmitting D2D UE (TX D2D UE) in a communication system supporting a D2D scheme.

An embodiment of the present disclosure proposes an apparatus and method for managing resource allocation information based on a D2D identifier (ID) of a TX D2D UE in a communication system supporting a D2D scheme.

An embodiment of the present disclosure proposes an apparatus and method for transmitting/receiving resource allocation information in a communication system supporting a D2D scheme.

An embodiment of the present disclosure proposes an apparatus and method for transmitting/receiving resource allocation information for a discovery resource which is allocated to a TX D2D UE in a communication system supporting a D2D scheme.

An embodiment of the present disclosure proposes an apparatus and method for transmitting/receiving resource allocation information thereby a receiving D2D UE (RX D2D UE) reduces monitoring overhead for a discovery resource in a communication system supporting a D2D scheme.

An embodiment of the present disclosure proposes an apparatus and method for transmitting/receiving resource allocation information thereby providing information on a RX D2D UE which receives discovery information through a discovery resource which is allocated to a TX D2D UE in a communication system supporting a D2D scheme.

A method and apparatus proposed in an embodiment of the present disclosure may be applied to various communication systems such as an institute of electrical and electronics engineers (IEEE) 802.11ac communication system, an IEEE 802.16 communication system, a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, and the like, and an internet protocol television (IPTV) service, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rd generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, a mobile internet protocol (Mobile IP) system, and/or the like.

According to various embodiments of the present disclosure, a network entity may includes at least one a base station, a node B, an enhanced node B(eNB), an access point, and the like.

The present disclosure includes four implementation schemes, i.e., the first implementation scheme, the second implementation scheme, the third implementation scheme, and the fourth implementation scheme. In each of the first implementation scheme, the second implementation scheme, the third implementation scheme, and the fourth implementation scheme, a specific situation is considered, and this will be described below.

Firstly, a situation which is considered in the first implementation scheme will be briefly described.

In the first implementation scheme, it will be assumed that a TX D2D UE which wants to transmit discovery information is a stationary D2D UE which does not move, e.g., commercial establishments, restaurants, shops, and the like. The discovery information may include at least one discovery information element. It will be assumed that a RX D2D UE which wants to monitor the discovery information is a mobile D2D UE. It will be assumed that a dedicated discovery resource which is allocated to the TX D2D UE does not change.

Secondly, a situation which is considered in each of the second implementation scheme and the third implementation scheme will be briefly described.

In the second implementation scheme, it will be assumed that a TX D2D UE which wants to transmit discovery information is a stationary D2D UE. A RX D2D UE which wants to monitor the discovery information is a mobile D2D UE. A dedicated discovery resource which is allocated to the TX D2D UE is valid during preset time.

Thirdly, a situation which is considered in the third implementation scheme will be briefly described.

In the third implementation scheme, a TX D2D UE which wants to transmit discovery information may be a mobile D2D UE or a stationary D2D UE. A mobility state of a TX D2D UE is not used by the network in this scheme of dedicated discovery resource allocation. A RX D2D UE which wants to monitor the discovery information may be a mobile D2D UE or a stationary D2D UE.

Firstly, the first implementation scheme of the present disclosure will be described with reference to FIGS. 1 to 10.

An example of a process of allocating a dedicated discovery resource to a TX D2D UE in a communication system supporting a D2D scheme according to an embodiment of the present disclosure will be described with reference to FIG. 1.

FIG. 1 schematically illustrates an example of a process of allocating a dedicated discovery resource to a TX D2D UE in a communication system supporting a D2D scheme according to an embodiment of the present disclosure.

Referring to FIG. 1, the communication system includes a TX D2D UE 111 and an evolved node B (eNB) 113.

If the TX D2D UE 111 is not in RRC connected state and it wants to transmit discovery information the TX D2D UE 111 establishes a radio resource control (RRC) connection with the eNB 113, and transits into a RRC connected state at operation 115. In one embodiment the TX D2D UE 111 not in RRC connected state and interested in discovery information transmission, initiate RRC connection establishment if discovery information transmission is supported by cell on which the TX D2D UE is camped and common resources for discovery information transmissions are not broadcasted. The discovery information transmission is supported if SystemInformationBlockType19 is broadcasted by the cell. Alternately the discovery information transmission is supported or not in cell is determined by an indication in SystemInformationBlockType19 broadcasted by the cell. The TX D2D UE 111 transmits a discovery resource request message to the eNB 113 at operation 117. For example, the discovery resource request message may be a ProSe UE Information message. The discovery resource request message includes a D2D identifier (ID) of the TX D2D UE 111. The D2D ID may be a UE ID, an application user ID, an expression code, or an application ID+user ID. Unlike the description in FIG. 1, there may be a case that the discovery resource request message does not include the D2D ID of the TX D2D UE 111 at operation 117. For example, if there is no need of indicating information on the dedicated discovery resource which is allocated to the TX D2D UE 111 to a RX D2D UE, the discovery resource request message does not include the D2D ID for the TX D2D UE 111.

The TX D2D UE 111 may indicate to the eNB 113 through the discovery resource request message that the TX D2D UE 111 requests a discovery resource for transmitting the discovery information. That is, the discovery resource request message may include information indicating that the discovery resource for transmitting the discovery information is required.

The TX D2D UE 111 may indicate to the eNB 113 through the discovery resource request message how many discovery resources the TX D2D UE 111 needs or the number of discovery information elements or discovery messages which the TX D2D UE 111 will transmit. That is, the discovery resource request message may include information indicating the number of the discovery resources or information indicating the number of the discovery information elements or discovery messages.

The TX D2D UE 111 may indicate to the eNB 113 through the discovery resource request message a period that the TX D2D UE 111 will transmit discovery information. That is, the discovery resource request message may include information indicating a discovery information transmitting period.

The TX D2D UE 111 may indicate to the eNB 113 through the discovery resource request message how long the TX D2D UE 111 needs a related discovery resource for respective discovery information. That is, the discovery resource request message may include information indicating discovery resource maintain time.

The discovery resource request message may include a discovery resource request index. If the TX D2D UE 111 requests for resources for multiple discovery information transmissions in a discovery resource request message then, a discovery resource request index is allocated for each requested resource.

The discovery resource request message may include a priority level for each requested resource in discovery resource request.

The discovery resource request message may include a range class associated with discovery information to be transmitted. In one embodiment, a discovery service indicator may be defined. The discovery service indicator indicates a set of values for parameters such as a discovery period, a priority, a range class, duration, and the like. The discovery resource request message may include a discovery service indicator which corresponds to a discovery information transmission that the discovery resource is required. The discovery service indicator may be included in the discovery resource request message instead of individual parameters.

After receiving the discovery resource request message from the TX D2D UE 111, the eNB 113 determines whether the TX D2D UE 111 which transmits the discovery resource request message is a stationary D2D UE at operation 119. The eNB 113 may determine whether the TX D2D UE 111 which transmits the discovery resource request message is a stationary D2D UE based on UE capability which is exchanged between the TX D2D UE 111 and the network. The UE capability is exchanged TX D2D UE 111 and the network when the TX D2D UE 111 registers with the network or as and when it is requested by network. The eNB 113 may determine whether the TX D2D UE 111 which transmits the discovery resource request message is a stationary D2D UE based on a UEs subscription profile in the network.

Alternatively, the eNB 113 may determine whether the TX D2D UE 111 is a stationary D2D UE based on an indication from the TX D2D UE 111 included in the discovery resource request message.

Alternatively, only a stationary D2D UE may be configured to transmit the discovery resource request message. In this case, that the discovery resource request message is transmitted from the TX D2D UE 111 means that the TX D2D UE 111 is stationary.

Alternatively, the eNB 113 may determine whether the TX D2D UE 111 is stationary based on the D2D ID. The D2D ID may include a bit which indicates whether the TX D2D UE 111 is stationary. The D2D ID which is allocated to a stationary D2D UE is different from D2D IDs which are allocated to mobile D2D UEs. The eNB 113 may determine whether the TX D2D UE 111 is a stationary D2D UE using the D2D ID by checking a type of the D2D ID or enquiring with a D2D server. In FIG. 1, it will be assumed that the discovery resource request message includes the D2D ID of the TX D2D UE 111.

Upon determining that the TX D2D UE 111 is a stationary D2D UE, the eNB 113 allocates one or more dedicated discovery resources to the TX D2D UE 111 at operation 119. The dedicated discovery resource can be a dedicated discovery resource pool wherein the UE randomly selects resource for discovery information transmission. The dedicated discovery resource can be a dedicated discovery resource pool with one or more resource indexes indicating the resources assigned to the TX D2D UE 111 within the discovery resource pool. The eNB 113 manages a discovery resource table, and stores a mapping relation between the allocated dedicated discovery resource and the D2D ID of the TX D2D UE 111 to which the dedicated discovery resource is allocated at operation 123. It will be noted that a plurality of discovery resources may be mapped to the same D2D ID, so there may be a plurality of mapping relations for the same D2D ID in the discovery resource table.

Although not shown in FIG. 1, the eNB 113 performs an operation of checking whether the TX D2D UE 111 is a D2D UE which is authorized to request discovery resource. The eNB 113 performs an operation of checking whether the TX D2D UE 111 is the D2D UE which is authorized to request the discovery resource (or the type 2 discovery resource) based on a UE context which is received from a mobility management entity (MME). If the TX D2D UE 111 is authorized to request the discovery resource, the eNB 113 allocates one or more discovery resources to the TX D2D UE 111.

For example, the UE context includes at least one of 1) information indicating whether a D2D UE is authorized to request a discovery resource, 2) information indicating how many discovery resources may be allocated to a D2D UE, 3) information indicating a discovery resource mechanism which a D2D UE uses, and 4) information indicating whether a D2D UE is a stationary D2D UE. The discovery resource mechanism includes one of a type 1 discovery resource mechanism and a type 2 discovery resource mechanism. In type 1 (or UE autonomous resource selection) discovery resource mechanism UE randomly selects resources from a resource pool. Resources selected by multiple TX UEs can be same and hence may colliede in type 1 discovery resource mechanism. In type 2 (or scheduled resource allocation) discovery resources are allocated to UE by network. There is no collision in type 2 discovery resource mechanism.

If the eNB 113 determines that the TX D2D UE 111 is not authorized for ProSe direct discovery announcement, the eNB 113 rejects the discovery resource request message and indicates the same to TX D2D UE 111 in discovery resource response. The rejection can be explicitly indicated in the discovery resource response. Alternately, discovery resource response with no discovery resources can indicate the rejection of discovery resource request.

The eNB 113 transmits a discovery resource response message as a response message to the discovery resource request message to the TX D2D UE 111 at operation 121. The discovery resource response message includes information on the one or more dedicated discovery resources which are allocated to the TX D2D UE 111. For example, the discovery resource response message may be a RRC connection reconfiguration message.

The dedicated discovery resource information can be a dedicated discovery resource pool wherein the UE randomly selects resource for discovery information transmission. The dedicated discovery resource information can be a dedicated discovery resource pool with one or more resource indexes indicating the resources within the discovery resource pool assigned to the TX D2D UE 111. The resource index may comprise of a time index and a frequency index. The time index may indicate radio frame and/or subframe having the assigned discovery resource. The frequency index indicates the discovery physical channel index or physical radio block index of the assigned discovery resource. The information on the dedicated discovery resource may include a related dedicated discovery resource period. Alternately the discovery resource period is broadcasted by network and not signaled dedicatedly. The discovery resource period represents a period during which a related discovery resource is available.

The discovery resource period may be set to n*discovery resource cycle. Here, the n may be signaled through the discovery resource response message, or may be pre-defined. The eNB 113 may include a discovery resource allocation index for an allocated dedicated discovery resource into the discovery resource response message. The discovery resource allocation index may be used in order for the TX D2D UE 111 or the eNB 113 to request to release dedicated discovery resources. That is, if the discovery resource request message includes the discovery resource request index, the eNB 113 sets the discovery resource allocation index to the same as the discovery resource request index.

Alternatively, if the discovery resource request message does not include the discovery resource request index, the eNB 113 manages the discovery resource allocation index per UE, and includes the discovery resource allocation index into the discovery resource response message.

Alternatively, regardless of whether the discovery resource request index is included in the discovery resource request message, the eNB 113 manages the discovery resource allocation index per UE, and includes the discovery resource allocation index into the discovery resource response message.

Unlike the above description, the eNB 113 does not allocate a dedicated discovery resource to the TX D2D UE 111, and may provide a contention based resource pool (or a type 1 TX resource pool), or may not provide a dedicated discovery resource to the TX D2D UE 111.

Meanwhile, if the range class is received in the discovery resource request message, the eNB 113 sets power parameters for allocated discovery resources (a contention based pool or dedicated discovery resources) according to the range class. If the TX D2D UE 111 notifies a different range class for a different discovery information transmission, the eNB 113 sets different power parameters for each of allocated discovery resources (a contention based pool or dedicated discovery resources). If the range class is received in the discovery resource request message and if the eNB assigns Type 1 TX resource pool in discovery resource response then, the eNB assigns a TX resource pool corresponding to range class requested wherein the eNB maintains separate TX resource pool for each range class.

Alternatively, a range class associated with the TX D2D UE 111 may be determined by the eNB 113 from a UE context which is received from an MME, so the eNB 113 sets power parameters for discovery resources (a contention based pool or dedicated discovery resources) which are allocated to the TX D2D UE 111 according to the range class. If the eNB assigns Type 1 TX resource pool in discovery resource response then, the eNB assigns a TX resource pool corresponding to range class requested wherein the eNB maintains separate TX resource pool for each range class.

Alternately, if the range class is not received in the discovery resource request message or range class is not received from MME in UE's context and if the eNB assigns Type 1 TX resource pool in discovery resource response then, the eNB can assign multiple TX resource pools wherein the eNB maintains separate TX resource pool for each range class. TX D2D UE 111 will select the TX resource pool based on the range class. Alternately eNB may broadcast or send in discovery resource response mapping between range class and power parameter (e.g. max power) for each range class supported by network. The TX D2D UE will select the power parameters corresponding to its authorized range class or range class associated with discovery information which it wants to transmit. FIG. 2 schematically illustrates time from which a received discovery resource configuration in a discovery resource response message is applicable and used by a TX D2D UE 111 in FIG. 1 for a discovery information transmission according to an embodiment of the present disclosure.

Referring to FIG. 2, if an eNB transmits a discovery resource response message at a discovery resource cycle x, or a TX D2D UE receives a discovery resource response message at a discovery resource cycle x, the first instance of a dedicated discovery resource which is allocated to the TX D2D UE exists at the pth discovery resource cycle after the discovery resource cycle x, i.e., a discovery resource cycle x+p. The p may be fixed in the communication system, for example, the p may be set to 1 (p=1) which means that If discovery resources are included in the discovery resource response then the TX D2D UE 111, from the next discovery resource cycle use the resources indicated in the discovery resource response for discovery information transmission. Alternately p may be signaled in discovery resource response message.

FIG. 3 schematically illustrates time from which a received discovery resource configuration in a discovery resource response message is applicable and used by a TX D2D UE 111 for a discovery information transmission according to another embodiment of the present disclosure.

Referring to FIG. 3, if a difference between a sub-frame/frame in which a discovery resource response message is received and a sub-frame/frame which corresponds to a dedicated discovery resource which is allocated at the first discovery resource cycle after a discovery resource cycle x in which the discovery resource response message is received, i.e., a discovery resource cycle x+1 is less than a preset offset, the first instance of a dedicated discovery resource which is allocated to a TX D2D UE exists at a discovery resource cycle x+2. In this case, the offset is included in the discovery resource response message.

Figure 4:
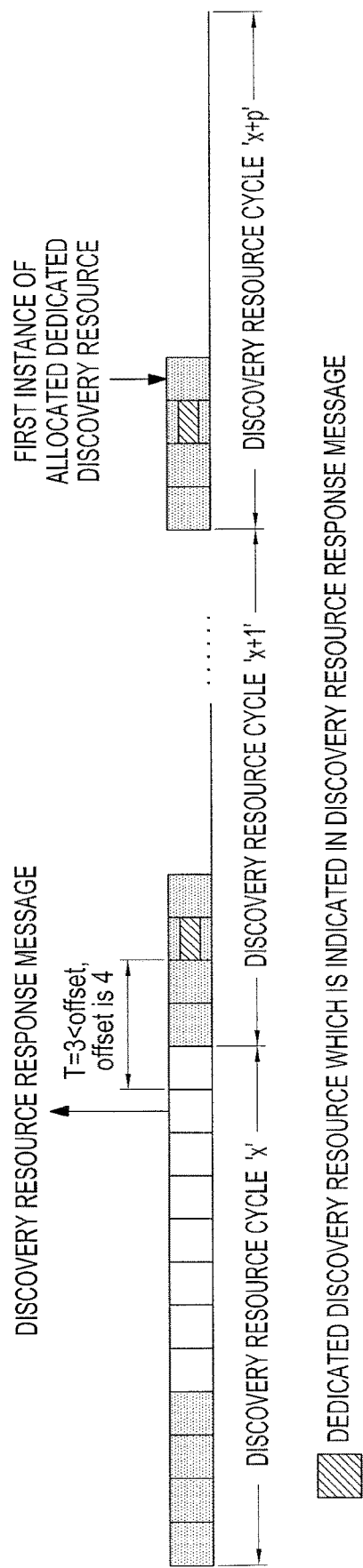
FIG. 4 schematically illustrates time from which a received discovery resource configuration in a discovery resource response message is applicable and used by a TX D2D UE 111 for a discovery information transmission according to still another embodiment of the present disclosure.

FIG. 4 schematically illustrates time from which a received discovery resource configuration in a discovery resource response message is applicable and used by a TX D2D UE 111 for a discovery information transmission according to another embodiment of the present disclosure.

Referring to FIG. 4, if a difference between a sub-frame/frame in which a discovery resource response message is received and a sub-frame/frame which corresponds to a dedicated discovery resource which is allocated at the first discovery resource cycle after a discovery resource cycle x in which the discovery resource response message is received, i.e., a discovery resource cycle x+1 is equal to or greater than a preset offset, the first instance of a dedicated discovery resource which is allocated to a TX D2D UE exists at the discovery resource cycle x+1. In this case, the offset is included in the discovery resource response message.

Referring to FIG. 1, the eNB 113 may indicate whether a dedicated discovery resource which is allocated to the TX D2D UE 111 is available in a RRC idle state. For example, the eNB 113 may include information indicating whether the allocated dedicated discovery resource is available in the RRC idle state into the discovery resources response message.

After allocating the dedicated discovery resource to the TX D2D UE 111, the eNB 113 updates the discovery resource information based on the information on the allocated dedicated discovery resource at operation 125. An operation of updating the discovery resource information may be optionally performed based on the information on the dedicated discovery resource which is allocated to the TX D2D UE 111. The eNB 113 broadcasts the updated discovery resource information through system information at operation 125.

After receiving the discovery resource response message from the eNB 113, the TX D2D UE 111 may release the RRC connection with the eNB 113, and transits from the RRC connected state into a RRC idle state at operation 127. The TX D2D UE 111 transmits discovery information using the dedicated discovery resource in the RRC idle state at operation 129. It will be noted that the eNB 113 manages information on the allocated dedicated discovery resource even though the TX D2D UE 111 releases the RRC connection.

After allocating the dedicated discovery resource to the TX D2D UE 111, the eNB 113 may determine whether the TX D2D UE 111 should exist in the RRC connected state or the RRC idle state. The eNB 113 may determine whether the TX D2D UE 111 should exist in the RRC connected state or the RRC idle state based on a mobility state of the TX D2D UE 111. If the RRC connection is released, the eNB 113 may indicate that the dedicated discovery resource which is allocated to the TX D2D UE 111 is available in the RRC idle state.

The dedicated discovery resource which is allocated to the TX D2D UE 111 may be released at one of the followings:

a) The TX D2D UE 111 is powered down.

b) The TX D2D UE 111 notifies to the eNB 113 that the TX D2D UE 111 does not need the allocated dedicated discovery resource any more For example, upon determining not to transmit discovery information any more, the TX D2D UE 111 may notify to the eNB 113 that the TX D2D UE 111 does not need the allocated dedicated discovery resource any more. The TX D2D UE 111 transmits a discovery resource release message to the eNB 113 or may indicate number of resources to zero in the discovery resource request message.

If a plurality of dedicated discovery resources are allocated to the TX D2D UE 111, and the TX D2D UE 111 wants to release a part of the plurality of dedicated discovery resources, the TX D2D UE 111 notifies the eNB 113 of the number of discovery resources which the TX D2D UE 111 wants to release or retain or a discovery resource allocation index for the discovery resource which the TX D2D UE 111 wants to release.

If the eNB 113 determines to release the dedicated discovery resources which are allocated to the TX D2D UE 111, i.e., an eNB initiated release case, or the eNB 113 receives a discovery resource release message from the TX D2D UE 111, the eNB 113 transmits a discovery resource release message or a RRC connection reconfiguration message to the TX D2D UE 111, releases a discovery resource which is allocated to the TX D2D UE 111, and transmits information on an old dedicated discovery resource which is allocated to the TX D2D UE 111 or information on the released dedicated discovery resource. Here, the eNB 113 may transmit the information on the old dedicated discovery resource which is allocated to the TX D2D UE 111 if only a part of the dedicated discovery resources which are allocated to the TX D2D UE 111 is released.

Upon receiving a resource release message or a RRC reconfiguration message from the TX D2D UE 111, the eNB 113 releases all dedicated discovery resources which are allocated to the TX D2D UE 111. If all dedicated discovery resources which are allocated to the TX D2D UE 111 are available only in a RRC connected state, or all dedicated all discovery resources should be released, the eNB 113 may transmit a RRC connection release message to release all dedicated discovery resources which are allocated to the TX D2D UE 111.

Dedicated discovery resource release may be indicated by the TX D2D UE 111 using a discovery resource request message. That is, the discovery resource request message may be used for requesting a dedicated discovery resource or releasing an allocated dedicated discovery resource.

Further, dedicated discovery resource release may be indicated by the eNB 113 using a discovery resource response message. The discovery resource response message may be used for allocating a dedicated discovery resource or releasing an allocated dedicated discovery resource.

If allocated dedicated discovery resources are available only in a RRC connected state, or there is a need for releasing all dedicated discovery resources, the TX D2D UE 111 may transmit a RRC connection release message to release all dedicated discovery resources.

Alternatively, after releasing a dedicated discovery resource which is allocated to the TX D2D UE 111, the eNB 113 updates information on the released dedicated discovery resource into the discovery resource information to remove information on the released dedicated discovery resource. The eNB 113 broadcasts the updated discovery resource information through system information.

Although FIG. 1 illustrates an example of a process of allocating a dedicated discovery resource to a TX D2D UE in a communication system supporting a D2D scheme according to an embodiment of the present disclosure, various changes could be made to FIG. 1. For example, although shown as a series of operations, various operations in FIG. 1 could overlap, occur in parallel, occur in a different order, or occur multiple times.

An example of a process of allocating a dedicated discovery resource to a TX D2D UE in a communication system supporting a D2D scheme according to an embodiment of the present disclosure has been described with FIG. 1, and another example of a process of allocating a dedicated discovery resource to a TX D2D UE in a communication system supporting a D2D scheme according to an embodiment of the present disclosure will be described with FIG. 5.

Figure 5:
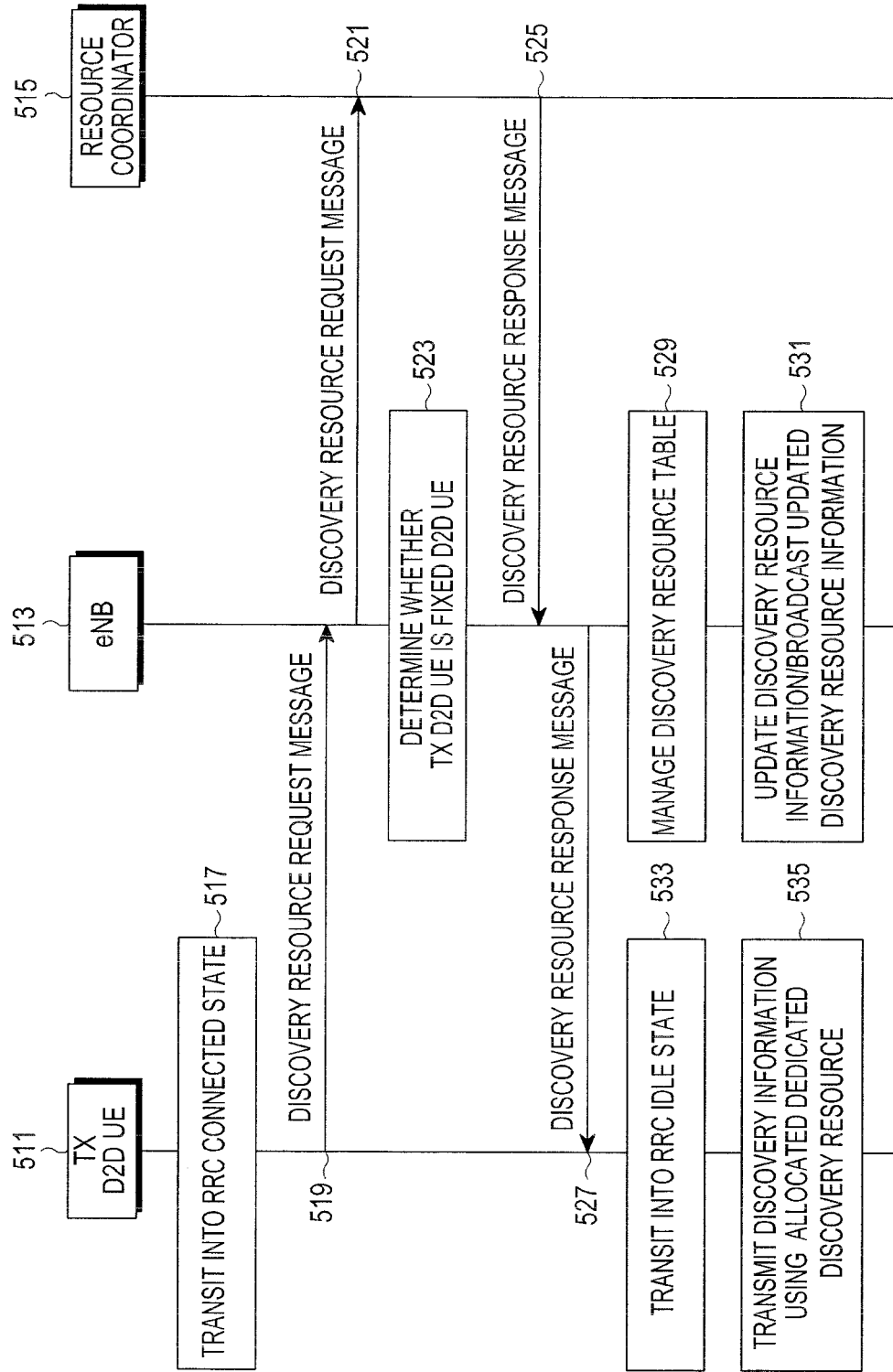
FIG. 5 schematically illustrates another example of a process of allocating a dedicated discovery resource to a TX D2D UE in a communication system supporting a D2D scheme according to an embodiment of the present disclosure.

FIG. 5 schematically illustrates another example of a process of allocating a dedicated discovery resource to a TX D2D UE in a communication system supporting a D2D scheme according to an embodiment of the present disclosure.

Prior to description of FIG. 5, an eNB may allocate a dedicated discovery resource to a TX D2D UE under a control of a resource coordinator instead of independently allocating the dedicated discovery resource to the TX D2D UE. If the dedicated discovery resource is allocated under the control of the resource coordinator, it will be guaranteed that a dedicated discovery resource which is allocated to a specific TX D2D UE at one cell is not allocated to other TX D2D UE at other cell. Here, collision between a discovery information transmission by the specific TX D2D UE at the one cell and a discovery information transmission by the other TX D2D UE at the other cell may be avoided by guaranteeing that the dedicated discovery resource which is allocated to the specific TX D2D UE at the one cell is not allocated to the other TX D2D UE at the other cell. The resource coordinator may manage a common dedicated discovery resource pool to manage a dedicated discovery resource allocation state of the eNB.

Referring to FIG. 5, the communication system includes a TX D2D UE 511, an eNB 513, and a resource coordinator 515.

The TX D2D UE 511 which wants to transmit discovery information establishes a RRC connection with the eNB 513, and transits into a RRC connected state at operation 517. The TX D2D UE 511 transmits a discovery resource request message to the eNB 513 at operation 519. The discovery resource request message includes a D2D ID of the TX D2D UE 511. The D2D ID may be a UE ID, an application user ID, an expression code, or an application ID+user ID. The discovery resource request message may be implemented in the manner described with reference to FIG. 1, and a description thereof will be omitted herein.

After receiving the discovery resource request message from the TX D2D UE 511, the eNB 513 transmits the discovery resource request message to the resource coordinator 515 at operation 521. The eNB 513 determines whether the TX D2D UE 511 is a stationary D2D UE at operation 523. Here, an operation of determining whether the TX D2D UE 511 is the stationary D2D UE may be implemented in the manner described with reference to FIG. 1, and a description thereof will be omitted herein.

After receiving the discovery resource request message from the eNB 513, the resource coordinator 515 determines a dedicated discovery resource which will be allocated to the TX D2D UE 511 based on a common dedicated discovery resource pool, and transmits a discovery resource response message including information on the determined dedicated discovery resource to the eNB 513 at operation 525. After receiving the discovery resource response message from the resource coordinator 515, the eNB 513 allocates a dedicated discovery resource to the TX D2D UE 511 based on the information on the dedicated discovery resource included in the discovery resource response message, and transmits a discovery resource response message including information on the allocated dedicated discovery resource to the TX D2D UE 511 at operation 527. The discovery resource response message may be implemented in the manner described with reference to FIG. 1, and a description thereof will be omitted herein.

The eNB 513 manages a discovery resource table, and stores a mapping relation between the allocated dedicated discovery resource and the D2D ID of the TX D2D UE 511 to which the dedicated discovery resource is allocated in the discovery resource table at operation 529. It will be noted that a plurality of discovery resources may be mapped to the same D2D ID, so there may be a plurality of mapping relations for the same D2D ID in the discovery resource table.

After allocating the dedicated discovery resource to the TX D2D UE 511, the eNB 513 updates discovery resource information based on the information on the allocated dedicated discovery resource at operation 531. An operation of updating the discovery resource information may be optionally performed based on the information on the dedicated discovery resource which is allocated to the TX D2D UE 511. The eNB 513 broadcasts the updated discovery resource information through system information at operation 531.

After receiving the discovery resource response message from the eNB 513, the TX D2D UE 511 may releases a RRC connection with the eNB 513, and transits from the RRC connected state to a RRC idle state at operation 533. The TX D2D UE 511 transmits discovery information in the RRC idle state using the dedicated discovery resource at operation 535. It will be noted that the eNB 513 manages information on the allocated dedicated discovery resource even though the TX D2D UE 511 releases the RRC connection.

An operation of determining whether the TX D2D UE 511 has to exist in the RRC connected state or the RRC idle state in the eNB 513 after the dedicated discovery resource is allocated to the TX D2D UE 511 is performed in the manner described with reference to FIG. 1, and a description thereof will be omitted herein.

The case that the dedicated discovery resource which is allocated to the TX D2D UE 511 is released has been described in FIG. 1, and a description thereof will be omitted herein.

Although FIG. 5 illustrates another example of a process of allocating a dedicated discovery resource to a TX D2D UE in a communication system supporting a D2D scheme according to an embodiment of the present disclosure, various changes could be made to FIG. 5. For example, although shown as a series of operations, various operations in FIG. 5 could overlap, occur in parallel, occur in a different order, or occur multiple times.

Another example of a process of allocating a dedicated discovery resource to a TX D2D UE in a communication system supporting a D2D scheme according to an embodiment of the present disclosure has been described with reference to FIG. 5, and still another example of a process of allocating a dedicated discovery resource to a TX D2D UE in a communication system supporting a D2D scheme according to an embodiment of the present disclosure will be described with reference to FIG. 6.

Figure 6:
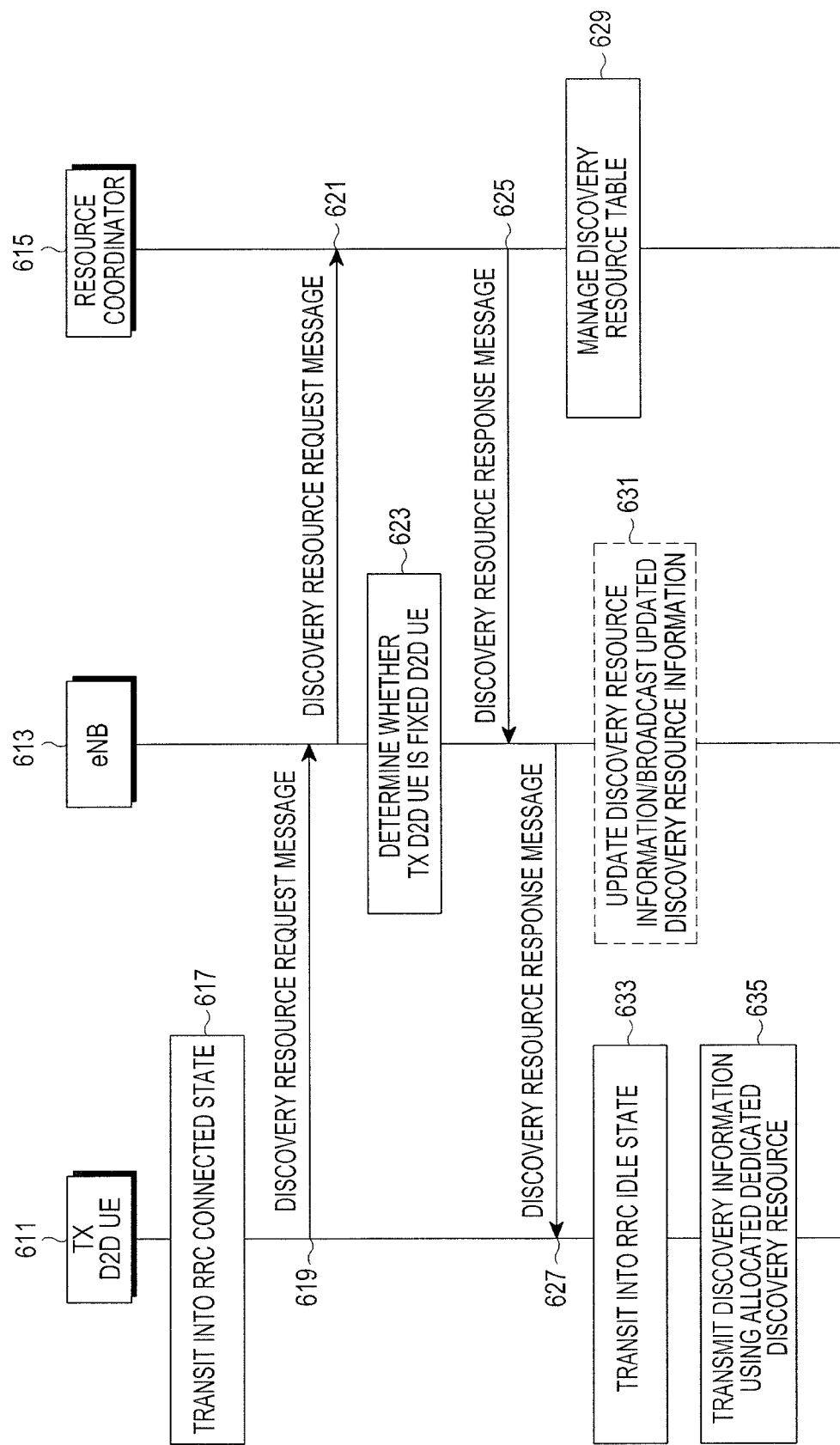
FIG. 6 schematically illustrates still another example of a process of allocating a dedicated discovery resource to a TX D2D UE in a communication system supporting a D2D scheme according to an embodiment of the present disclosure.

FIG. 6 schematically illustrates still another example of a process of allocating a dedicated discovery resource to a TX D2D UE in a communication system supporting a D2D scheme according to an embodiment of the present disclosure.

Referring to FIG. 6, the communication system includes a TX D2D UE 611, an eNB 613, and a resource coordinator 615.

The TX D2D UE 611 which wants to transmit discovery information establishes a RRC connection with the eNB 613, and transits into a RRC connected state at operation 617. The TX D2D UE 611 transmits a discovery resource request message to the eNB 613 at operation 619. The discovery resource request message includes a D2D ID of the TX D2D UE 611. The D2D ID may be a UE ID, an application user ID, an expression code, or an application ID+user ID. The discovery resource request message may be implemented in the manner described with reference to FIG. 1, and a description thereof will be omitted herein.

After receiving the discovery resource request message from the TX D2D UE 611, the eNB 613 transmits the discovery resource request message to the resource coordinator 615 at operation 621. The eNB 613 determines whether the TX D2D UE 611 is a stationary D2D UE at operation 623. Here, an operation of determining whether the TX D2D UE 611 is the stationary D2D UE may be implemented in the manner described with reference to FIG. 1, and a description thereof will be omitted herein.

After receiving the discovery resource request message from the eNB 613, the resource coordinator 615 determines a dedicated discovery resource which will be allocated to the TX D2D UE 611 based on a common dedicated discovery resource pool, and transmits a discovery resource response message including information on the determined dedicated discovery resource to the eNB 613 at operation 625. After receiving the discovery resource response message from the resource coordinator 615, the eNB 613 allocates a dedicated discovery resource to the TX D2D UE 611 based on the information on the dedicated discovery resource included in the discovery resource response message, and transmits a discovery resource response message including information on the allocated dedicated discovery resource to the TX D2D UE 611 at operation 627. The discovery resource response message may be implemented in the manner described with reference to FIG. 1, and a description thereof will be omitted herein.

The resource coordinator 615 manages a discovery resource table, and stores a mapping relation between the allocated dedicated discovery resource and a D2D ID of the TX D2D UE 611 to which the dedicated discovery resource is allocated at operation 629. It will be noted that a plurality of discovery resources may be mapped to the same D2D ID, so there may be a plurality of mapping relations for the same D2D ID in the discovery resource table.

After allocating the dedicated discovery resource to the TX D2D UE 611, the eNB 613 updates the discovery resource information based on the information on the allocated dedicated discovery resource at operation 631. An operation of updating the discovery resource information may be optionally performed based on the information on the dedicated discovery resource which is allocated to the TX D2D UE 611. The eNB 613 broadcasts the updated discovery resource information through system information at operation 631.

After receiving the discovery resource response message from the eNB 613, the TX D2D UE 611 releases a RRC connection with the eNB 613, and transits from the RRC connected state to a RRC idle state at operation 633. The TX D2D UE 611 transmits discovery information in the RRC idle state using the dedicated discovery resource at operation 635. It will be noted that the resource coordinator 615 manages information on the determined dedicated discovery resource even though the TX D2D UE 611 releases the RRC connection.

An operation of determining whether the TX D2D UE 611 has to exist in the RRC connected state or the RRC idle state in the eNB 613 after the dedicated discovery resource is allocated to the TX D2D UE 611 has been described in FIG. 1, and a description thereof will be omitted herein.

The case that the dedicated discovery resource which is allocated to the TX D2D UE 611 is released has been described in FIG. 1, and a description thereof will be omitted herein.

Although FIG. 6 illustrates still another example of a process of allocating a dedicated discovery resource to a TX D2D UE in a communication system supporting a D2D scheme according to an embodiment of the present disclosure, various changes could be made to FIG. 6. For example, although shown as a series of operations, various operations in FIG. 6 could overlap, occur in parallel, occur in a different order, or occur multiple times.

In FIGS. 5 and 6, an eNB coordinates with a resource coordinator to allocate a dedicated discovery resource to a TX D2D UE in order to avoid collision among discovery information transmissions, however, it will be understood by those of ordinary skill in the art that the eNB may coordinate with a neighbor eNB to allocate a dedicated discovery resource to a TX D2D UE in order to avoid collision among discovery information transmissions. That is, even though the neighbor eNB does not manage a common dedicated discovery resource pool, the eNB may allocate the dedicated discovery resource to the TX D2D UE in order to avoid collision among the discovery information transmissions by sharing information on the dedicated discovery resource which the eNB and the neighbor eNB directly allocate each other.

In FIGS. 1, 5, and 6, a TX D2D UE transmits a discovery resource request message to an eNB, and is allocated a dedicated discovery resource from the eNB, however, it will be understood by those of ordinary skill in the art that the TX D2D UE may transmit a discovery resource request message to a server instead of the eNB, and be allocated a dedicated discovery resource from the server. This will be described with reference to FIG. 7.

Figure 7:
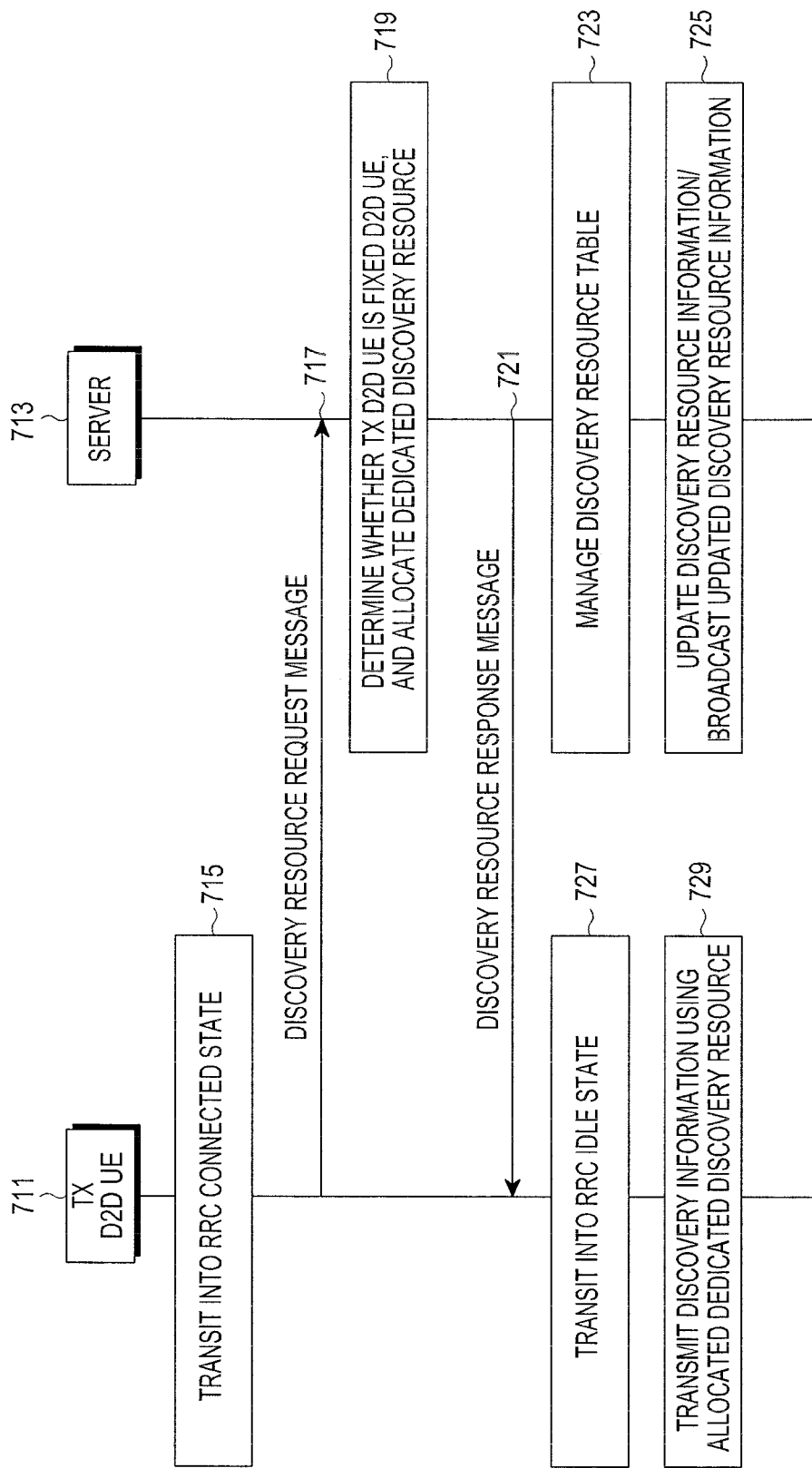
FIG. 7 schematically illustrates still another example of a process of allocating a dedicated discovery resource to a TX D2D UE in a communication system supporting a D2D scheme according to an embodiment of the present disclosure.

FIG. 7 schematically illustrates still another example of a process of allocating a dedicated discovery resource to a TX D2D UE in a communication system supporting a D2D scheme according to an embodiment of the present disclosure.

Referring to FIG. 7, the communication system includes a TX D2D UE 711 and a server 713.

The TX D2D UE 711 establishes a RRC connection with the server 713, and transits into a RRC connected state at operation 715. The TX D2D UE 711 transmits a discovery resource request message to the server 713 at operation 717. The discovery resource request message includes a D2D ID of the TX D2D UE 711. The D2D ID may be a UE ID, an application user ID, an expression code, or an application ID+user ID. The discovery resource request message may be implemented in the manner described with reference to FIG. 1, and a description thereof will be omitted herein.

After receiving the discovery resource request message from the TX D2D UE 711, the server 713 determines whether the TX D2D UE 711 is a stationary D2D UE at operation 719. An operation of determining whether the TX D2D UE 711 is the stationary D2D UE may be implemented in the manner described with reference to FIG. 1, and a description thereof will be omitted herein. Upon determining that the TX D2D UE 711 is the stationary D2D UE, the server 713 allocates a dedicated discovery resource to the TX D2D UE 711, and transmits a discovery resource response message including information on the allocated dedicated discovery resource to the TX D2D UE 711 at operation 721. The discovery resource response message may be implemented in the manner described with reference to FIG. 1, and a description thereof will be omitted herein.

The server 713 manages a discovery resource table, and stores a mapping relation between the allocated dedicated discovery resource and the D2D ID of the TX D2D UE 711 to which the dedicated discovery resource is allocated in the discovery resource table at operation 723. It will be noted that a plurality of discovery resources may be mapped to the same D2D ID, so there may be a plurality of mapping relations for the same D2D ID in the discovery resource table.

After allocating the dedicated discovery resource to the TX D2D UE 711, the server 713 updates discovery resource information based on the information on the allocated dedicated discovery resource at operation 725. An operation of updating the discovery resource information may be optionally performed based on the information on the dedicated discovery resource which is allocated to the TX D2D UE 711. The server 713 broadcasts the updated discovery resource information through system information at operation 725.

After receiving the discovery resource response message from the server 713, the TX D2D UE 711 releases a RRC connection with the server 713, and transits from the RRC connected state into a RRC idle state at operation 727. The TX D2D UE 711 transmits discovery information using the dedicated discovery resource in the RRC idle state at operation 729. It will be noted that the server 713 manages information on the allocated dedicated discovery resource even though the TX D2D UE 711 releases the RRC connection.

An operation of determining whether the TX D2D UE 711 has to exist in the RRC connected state or the RRC idle state in the server 713 after the dedicated discovery resource is allocated to the TX D2D UE 711 is performed in the manner described with reference to FIG. 1, and a description thereof will be omitted herein.

The case that the dedicated discovery resource which is allocated to the TX D2D UE 711 is released has been described in FIG. 1, and a description thereof will be omitted herein.

Although FIG. 7 illustrates still another example of a process of allocating a dedicated discovery resource to a TX D2D UE in a communication system supporting a D2D scheme according to an embodiment of the present disclosure, various changes could be made to FIG. 7. For example, although shown as a series of operations, various operations in FIG. 7 could overlap, occur in parallel, occur in a different order, or occur multiple times.

A process of allocating a dedicated discovery resource to a TX D2D UE in a communication system supporting a D2D scheme according to an embodiment of the present disclosure has been described with reference to FIGS. 1 to 7, and a process of providing information on a dedicated discovery resource to a RX D2D UE in a communication system supporting a D2D scheme according to an embodiment of the present disclosure will be described with reference to FIGS. 8 to 10.

Firstly, an example of a process of providing information on a dedicated discovery resource to a RX D2D UE in a communication system supporting a D2D scheme according to an embodiment of the present disclosure will be described with reference to FIG. 8.

Figure 8:
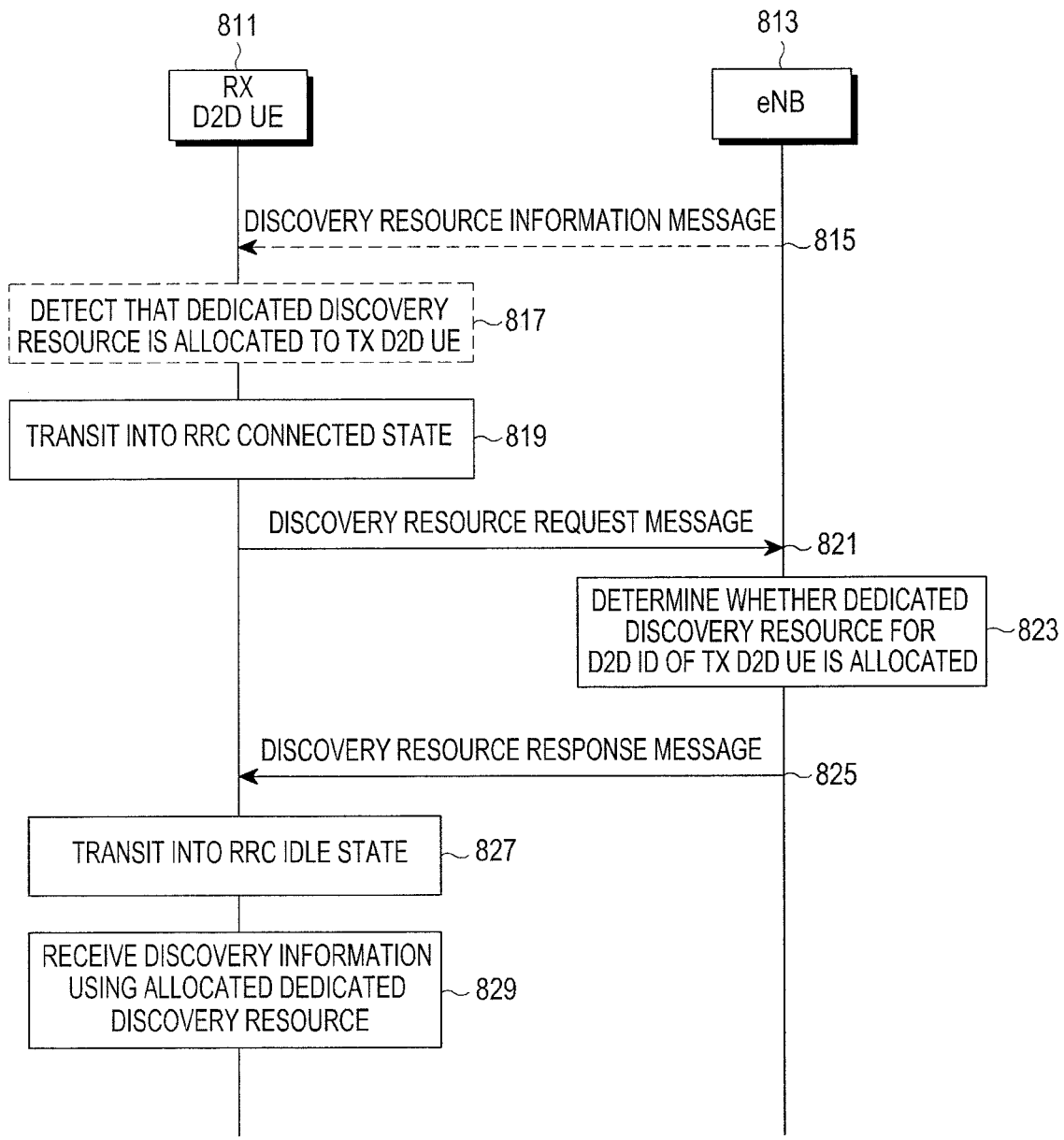
FIG. 8 schematically illustrates an example of a process of providing information on a dedicated discovery resource to a RX D2D UE in a communication system supporting a D2D scheme according to an embodiment of the present disclosure.

FIG. 8 schematically illustrates an example of a process of providing information on a dedicated discovery resource to a RX D2D UE in a communication system supporting a D2D scheme according to an embodiment of the present disclosure.

Referring to FIG. 8, the communication system includes a RX D2D UE 811 and an eNB 813.

The eNB 813 allocates a dedicated discovery resource to a TX D2D UE (not shown in FIG. 8), and broadcasts information on the allocated dedicated discovery resource at operation 815. For example, the information on the allocated dedicated discovery resource is broadcasted through system information. The operation 815 may be optionally performed by the eNB 813.

The RX D2D UE 811 which is interested in monitoring discovery information which is transmitted by the TX D2D UE establishes a RRC connection with the eNB 813, and transits into a RRC connected state at operation 819. The RX D2D UE 811 transmits a discovery resource request message to the eNB 813 at operation 821. The RX D2D UE 811 includes a D2D ID of the TX D2D UE which the RX D2D UE 811 wants to monitor into the discovery resource request message. The D2D ID may be a UE ID, an application user ID, an expression code, or an application ID+user ID. The RX D2D UE 811 may notify that the RX D2D UE 811 requests a dedicated discovery resource in which the RX D2D UE 811 receives discovery information which the TX D2D UE transmits. The RX D2D UE 811 may include a part of a D2D ID, e.g., an application ID, or a D2D category into the discovery resource request message.

A case that the RX D2D UE 811 establishes the RRC connection without detecting that the eNB 813 has allocated a dedicated discovery resource to an arbitrary TX D2D UE and transmits the discovery resource request message to the eNB 813 has been described above.

Alternatively, only upon detecting that the eNB 813 has allocated a dedicated discovery resource to an arbitrary TX D2D UE at operation 817, the RX D2D UE 811 may transmit the discovery resource request message at operation 819. The RX D2D UE 811 may detect whether the eNB 813 has allocated the dedicated discovery resource to the arbitrary TX D2D UE from resource allocation information which is broadcasted by the eNB 813. In this case, the operation 815 is not optional. The broadcasted resource allocation information includes information indicating whether an arbitrary dedicated discovery resource is allocated to the arbitrary TX D2D UE.

Upon receiving the discovery resource request message from the RX D2D UE 811, the eNB 813 checks a discovery resource table to determine whether a dedicated discovery resource is allocated for a D2D ID which is included in the discovery resource request message, i.e., a D2D ID of the TX D2D UE at operation 823. If the dedicated discovery resource is allocated to the TX D2D UE which corresponds to the D2D ID included in the discovery resource request message, the eNB 813 transmits a discovery resource response message including resource allocation information for the dedicated discovery resource which is allocated to the TX D2D UE to the RX D2D UE 811 at operation 825.

After receiving the discovery resource response message from the eNB 813, the RX D2D UE 811 may release the RRC connection with the eNB 813, and transits into a RRC idle state at operation 827. The RX D2D UE 811 receives discovery information which the TX D2D UE transmits through a dedicated discovery resource which corresponds to the resource allocation information included in the discovery resource response message in the RRC idle state at operation 829.

The RX D2D UE 811 does not need to retransmit the discovery resource request message to the same eNB, i.e., the eNB 813 in order to detect resource allocation information for the dedicated discovery resource which is allocated to the TX D2D UE of which the resource allocation information has been already acquired by the RX D2D UE 811.

The RX D2D UE 811 may transmit a discovery resource request message to a new eNB which is different from the eNB 813 if the RX D2D UE 811 moves into the new eNB, or may transmit a discovery resource request message to the eNB 813 if discovery resource information is updated.

Although not shown in FIG. 8, if the dedicated discovery resource is not allocated to the TX D2D UE which corresponds to the D2D ID included in the discovery resource request message, the eNB 813 may transmit information indicating that a dedicated discovery resource is not allocated to the TX D2D UE to the RX D2D UE 811. The RX D2D UE 811 releases the RRC connection with the eNB 813, and transits into the RRC idle state.

Although FIG. 8 illustrates an example of a process of providing information on a dedicated discovery resource to a RX D2D UE in a communication system supporting a D2D scheme according to an embodiment of the present disclosure, various changes could be made to FIG. 8. For example, although shown as a series of operations, various operations in FIG. 8 could overlap, occur in parallel, occur in a different order, or occur multiple times.

An example of a process of providing information on a dedicated discovery resource to a RX D2D UE in a communication system supporting a D2D scheme according to an embodiment of the present disclosure has been described with reference to FIG. 8, and another example of a process of providing information on a dedicated discovery resource to a RX D2D UE in a communication system supporting a D2D scheme according to an embodiment of the present disclosure will be described with reference to FIG. 9.

Figure 9:
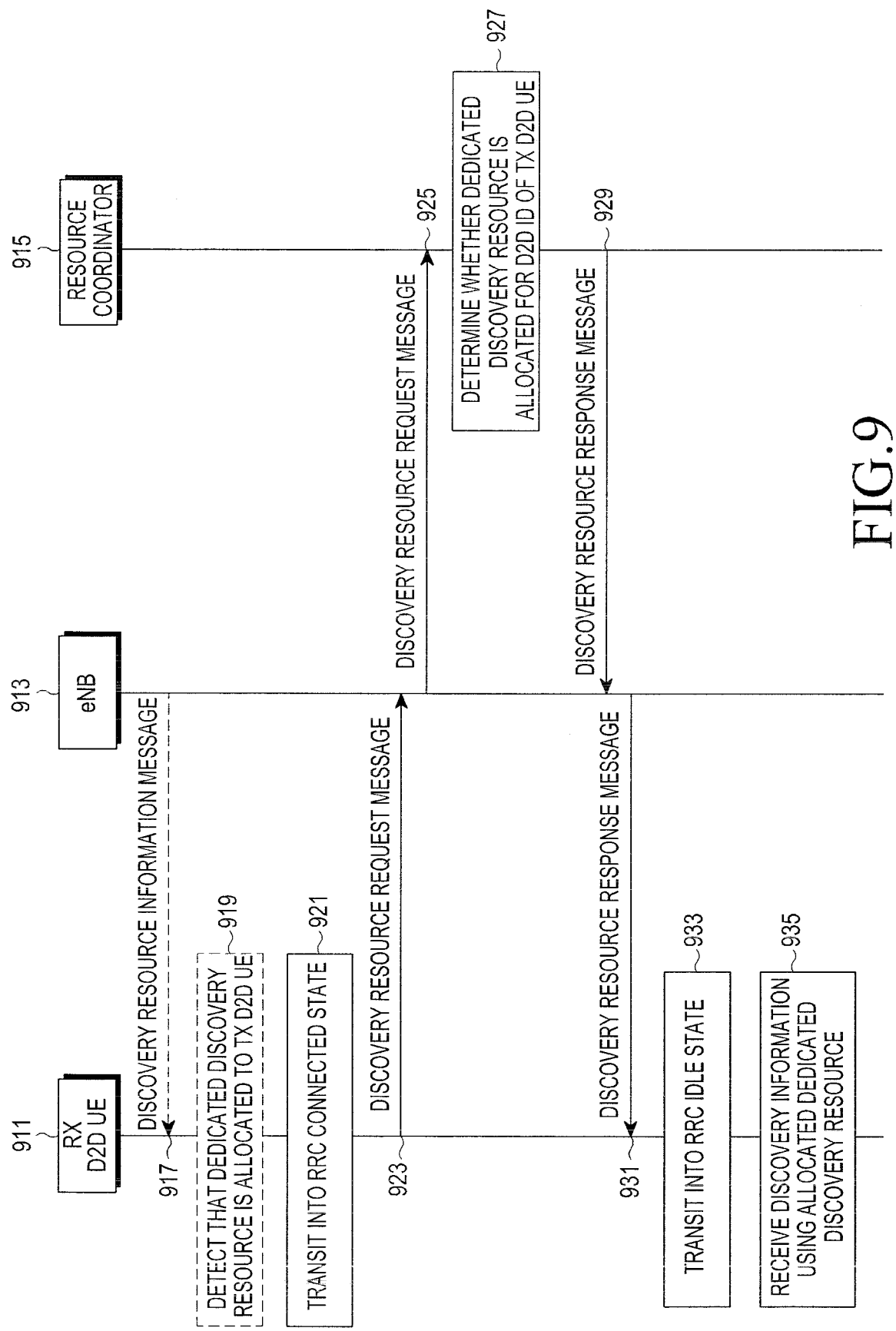
FIG. 9 schematically illustrates another example of a process of providing information on a dedicated discovery resource to a RX D2D UE in a communication system supporting a D2D scheme according to an embodiment of the present disclosure.

FIG. 9 schematically illustrates another example of a process of providing information on a dedicated discovery resource to a RX D2D UE in a communication system supporting a D2D scheme according to an embodiment of the present disclosure.

Referring to FIG. 9, the communication system includes a RX D2D UE 911, an eNB 913, and a resource coordinator 915.

The eNB 913 allocates a dedicated discovery resource to a TX D2D UE (not shown in FIG. 9), and broadcasts information on the allocated dedicated discovery resource at operation 917. For example, the information on the allocated dedicated discovery resource is broadcasted through system information. The operation 917 may be optionally performed by the eNB 913.

The RX D2D UE 911 which is interested in monitoring discovery information which is transmitted by the TX D2D UE establishes a RRC connection with the eNB 913, and transits into a RRC connected state at operation 921. The RX D2D UE 911 transmits a discovery resource request message to the eNB 913 at operation 923. The RX D2D UE 911 includes a D2D ID of the TX D2D UE which the RX D2D UE 911 wants to monitor into the discovery resource request message. The D2D ID may be a UE ID, an application user ID, an expression code, or an application ID+user ID. The RX D2D UE 911 may notify that the RX D2D UE 911 requests a dedicated discovery resource in which the RX D2D UE 911 receives discovery information which the TX D2D UE transmits. The RX D2D UE 911 may include a part of a D2D ID, e.g., an application ID, or a D2D category into the discovery resource request message.

A case that the RX D2D UE 911 establishes the RRC connection without detecting that the eNB 913 has allocated a dedicated discovery resource to an arbitrary TX D2D UE transmits the discovery resource request message to the eNB 913 has been described above.

Alternatively, only upon detecting that the eNB 913 has allocated a dedicated discovery resource to an arbitrary TX D2D UE at operation 919, the RX D2D UE 911 may transmit the discovery resource request message at operation 921. The RX D2D UE 911 may detect whether the eNB 913 has allocated the dedicated discovery resource to the arbitrary TX D2D UE from resource allocation information which is broadcasted by the eNB 913. In this case, the operation 917 is not optional. The broadcasted resource allocation information includes information indicating whether an arbitrary dedicated discovery resource is allocated to the arbitrary TX D2D UE.

Upon receiving the discovery resource request message from the RX D2D UE 911, the eNB 913 transmits the discovery resource request message to the resource coordinator 915 at operation 925. Upon receiving the discovery resource request message from the eNB 913, the resource coordinator 915 checks a discovery resource table to determine whether a dedicated discovery resource is allocated for a D2D ID which is included in the discovery resource request message, i.e., a D2D ID of the TX D2D UE at operation 927. If the dedicated discovery resource is allocated to the TX D2D UE which corresponds to the D2D ID included in the discovery resource request message, the resource coordinator 915 transmits a discovery resource response message including resource allocation information for the dedicated discovery resource which is allocated to the TX D2D UE to the eNB 913 at operation 929.

After receiving the discovery resource response message from the resource coordinator 915, the eNB 913 transmits the discovery resource response message to the RX D2D UE 911 at operation 931. After receiving the discovery resource response message from the eNB 913, the RX D2D UE 911 may release the RRC connection with the eNB 913, and transits into a RRC idle state at operation 933. The RX D2D UE 911 receives discovery information which the TX D2D UE transmits through a dedicated discovery resource corresponding to the resource allocation information included in the discovery resource response message in the RRC idle state at operation 935.

The RX D2D UE 911 does not need to retransmit the discovery resource request message to the same eNB, i.e., the eNB 913 in order to detect resource allocation information for the dedicated discovery resource which is allocated to the TX D2D UE of which the resource allocation information has been already acquired by the RX D2D UE 911.

The RX D2D UE 911 may transmit a discovery resource request message to a new eNB which is different from the eNB 913 if the RX D2D UE 911 moves into the new eNB, or may transmit a discovery resource request message to the eNB 913 if discovery resource information is updated.

Although not shown in FIG. 9, if the dedicated discovery resource is not allocated to the TX D2D UE which corresponds to the D2D ID included in the discovery resource request message, the resource coordinator 915 may transmit information indicating that a dedicated discovery resource is not allocated to the TX D2D UE to the RX D2D UE 911. The RX D2D UE 911 releases the RRC connection with the eNB 913, and transits into the RRC idle state.

Although FIG. 9 illustrates another example of a process of providing information on a dedicated discovery resource to a RX D2D UE in a communication system supporting a D2D scheme according to an embodiment of the present disclosure, various changes could be made to FIG. 9. For example, although shown as a series of operations, various operations in FIG. 9 could overlap, occur in parallel, occur in a different order, or occur multiple times.

Another example of a process of providing information on a dedicated discovery resource to a RX D2D UE in a communication system supporting a D2D scheme according to an embodiment of the present disclosure has been described with reference to FIG. 9, and still another example of a process of providing information on a dedicated discovery resource to a RX D2D UE in a communication system supporting a D2D scheme according to an embodiment of the present disclosure will be described with reference to FIG. 10.

Figure 10:
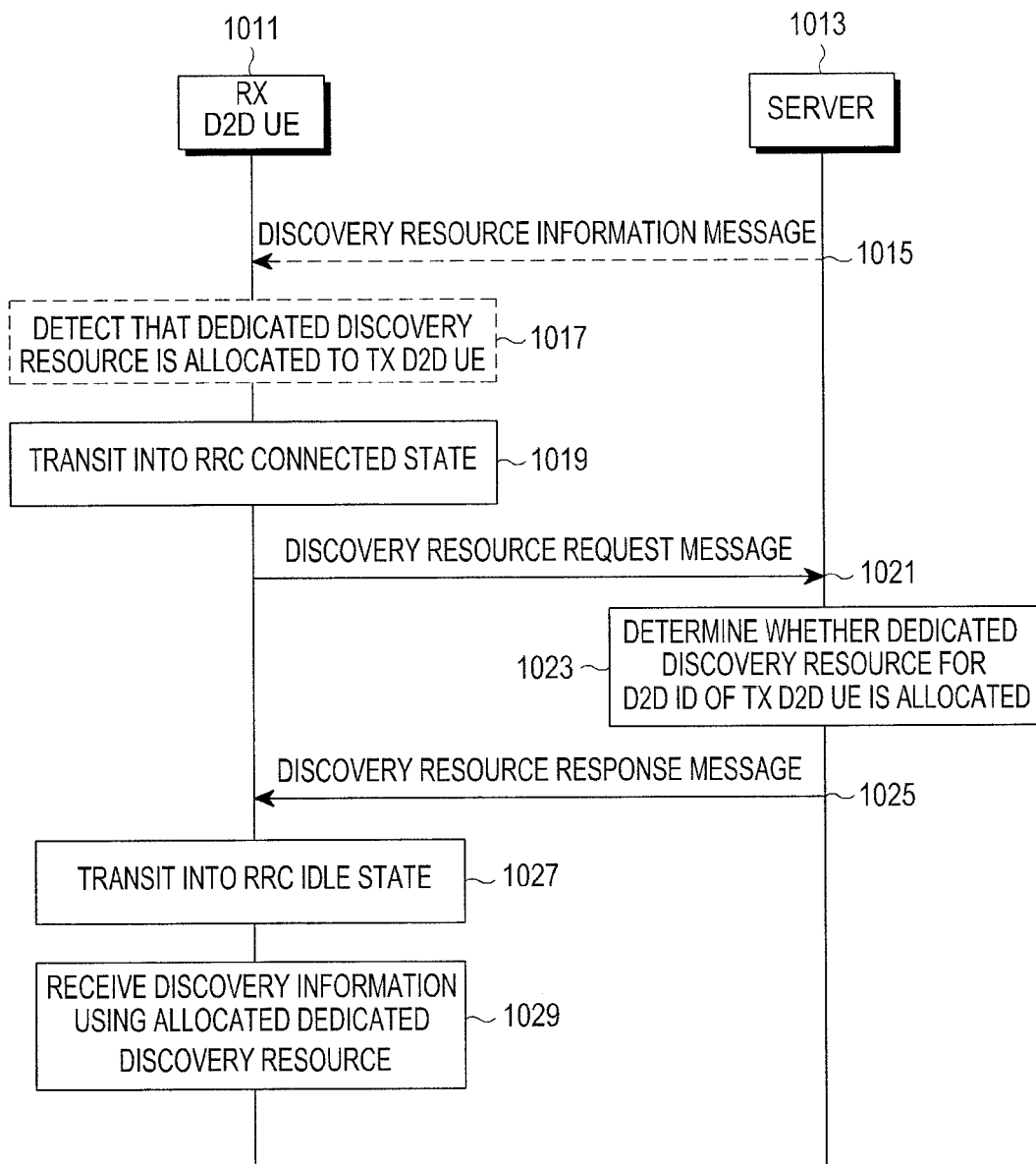
FIG. 10 schematically illustrates still another example of a process of providing information on a dedicated discovery resource to a RX D2D UE in a communication system supporting a D2D scheme according to an embodiment of the present disclosure.

FIG. 10 schematically illustrates still another example of a process of providing information on a dedicated discovery resource to a RX D2D UE in a communication system supporting a D2D scheme according to an embodiment of the present disclosure.

Referring to FIG. 10, the communication system includes a RX D2D UE 1011 and a server 1013.

The server 1013 allocates a dedicated discovery resource to a TX D2D UE (not shown in FIG. 10), and broadcasts information on the allocated dedicated discovery resource at operation 1015. For example, the information on the allocated dedicated discovery resource is broadcasted through system information. In this case, the operation 1015 is optional.

The RX D2D UE 1011 which is interested in monitoring discovery information which is transmitted by the TX D2D UE establishes a RRC connection with the server 1013, and transits into a RRC connected state at operation 1019. The RX D2D UE 1011 transmits a discovery resource request message to the server 1013 at operation 1021. The RX D2D UE 1011 includes a D2D ID of the TX D2D UE which the RX D2D UE 1011 wants to monitor into the discovery resource request message. The D2D ID may be a UE ID, an application user ID, an expression code, or an application ID+user ID. The RX D2D UE 1011 may notify that the RX D2D UE 1011 requests a dedicated discovery resource in which the RX D2D UE 1011 receives discovery information which the TX D2D UE transmits. The RX D2D UE 1011 may include a part of a D2D ID, e.g., an application ID, or a D2D category into the discovery resource request message.

A case that the RX D2D UE 1011 establishes the RRC connection without detecting that the eNB 1013 has allocated a dedicated discovery resource to an arbitrary TX D2D UE, and transmits the discovery resource request message to the server 1013 has been described above.

Alternatively, only upon detecting that the server 1013 has allocated a dedicated discovery resource to an arbitrary TX D2D UE at operation 1017, the RX D2D UE 1011 may transmit the discovery resource request message at operation 1019. The RX D2D UE 1011 may detect whether the server 1013 has allocated the dedicated discovery resource to the arbitrary TX D2D UE from resource allocation information which is broadcasted by the server 1013. In this case, the operation 1015 is not optional. The broadcasted resource allocation information includes information indicating whether an arbitrary dedicated discovery resource is allocated to the arbitrary TX D2D UE.

Upon receiving the discovery resource request message from the RX D2D UE 1011, the server 1013 checks a discovery resource table to determine whether a dedicated discovery resource is allocated for a D2D ID which is included in the discovery resource request message, i.e., a D2D ID of the TX D2D UE at operation 1023. If the dedicated discovery resource is allocated to the TX D2D UE which corresponds to the D2D ID included in the discovery resource request message, the server 1013 transmits a discovery resource response message including resource allocation information for the dedicated discovery resource which is allocated to the TX D2D UE to the RX D2D UE 1011 at operation 1025.

After receiving the discovery resource response message from the server 1013, the RX D2D UE 1011 may release the RRC connection with the server 1013, and transits into a RRC idle state at operation 1027. The RX D2D UE 1011 receives discovery information which the TX D2D UE transmits through a dedicated discovery resource corresponding to the resource allocation information included in the discovery resource response message in the RRC idle state at operation 1029.

The RX D2D UE 1011 does not need to retransmit the discovery resource request message to the same server, i.e., the server 1013 in order to detect resource allocation information for the dedicated discovery resource which is allocated to the TX D2D UE of which the resource allocation information has been already acquired by the RX D2D UE 1011.

The RX D2D UE 1011 may transmit a discovery resource request message to a new server which is different from the server 1013 if the RX D2D UE 2011 moves into the new server, or may transmit a discovery resource request message to the server 1013 if discovery resource information is updated.

Although not shown in FIG. 10, if the dedicated discovery resource is not allocated to the TX D2D UE which corresponds to the D2D ID included in the discovery resource request message, the server 1013 may transmit information indicating that a dedicated discovery resource is not allocated to the TX D2D UE to the RX D2D UE 1011. The RX D2D UE 1011 releases the RRC connection with the server 1013, and transits into the RRC idle state.

Although FIG. 10 illustrates still another example of a process of providing information on a dedicated discovery resource to a RX D2D UE in a communication system supporting a D2D scheme according to an embodiment of the present disclosure, various changes could be made to FIG. 10. For example, although shown as a series of operations, various operations in FIG. 10 could overlap, occur in parallel, occur in a different order, or occur multiple times.

The first implementation scheme of the present disclosure has been described with reference to FIGS. 1 to 10, and the second implementation scheme of the present disclosure will be described with reference to FIGS. 11 to 17.

Still another example of a process of allocating a dedicated discovery resource to a TX D2D UE in a communication system supporting a D2D scheme according to an embodiment of the present disclosure will be described with reference to FIG. 11.

Figure 11:
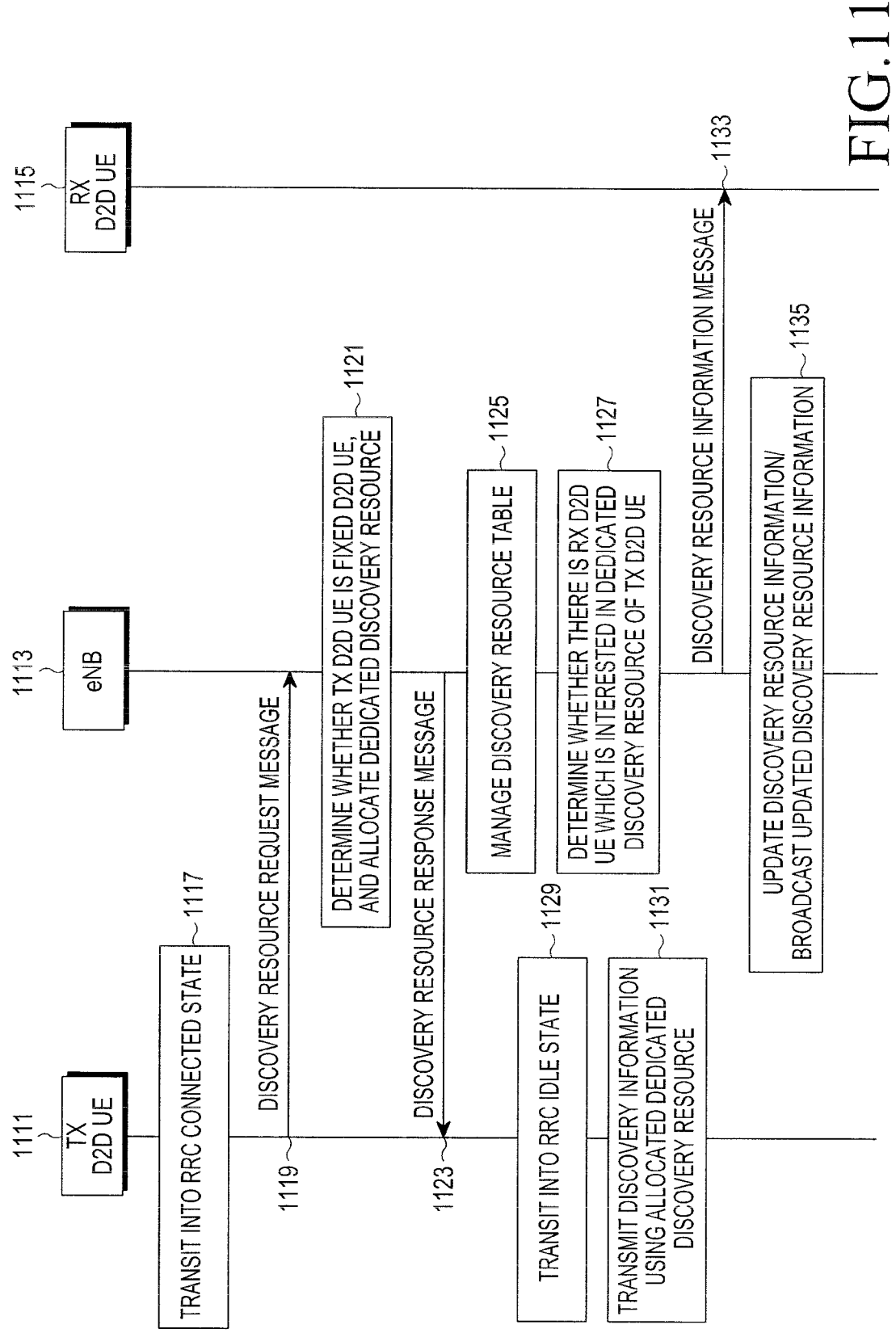
FIG. 11 schematically illustrates still another example of a process of allocating a dedicated discovery resource to a TX D2D UE in a communication system supporting a D2D scheme according to an embodiment of the present disclosure.

FIG. 11 schematically illustrates still another example of a process of allocating a dedicated discovery resource to a TX D2D UE in a communication system supporting a D2D scheme according to an embodiment of the present disclosure.

Referring to FIG. 11, the communication system includes a TX D2D UE 1111, an eNB 1113, and a RX D2D UE 1115.

If the TX D2D UE 1111 is not in a RRC connected state, and the TX D2D UE 1111 wants to transmit discovery information, the TX D2D UE 1111 establishes a RRC connection with the eNB 1113, and transits into a RRC connected state at operation 1117. In one embodiment of the present disclosure, if the TX D2D UE 1111 is not in RRC connected state and interested in a discovery information transmission, the TX D2D UE 1111 initiates RRC connection establishment if the discovery information transmission is supported by a cell on which the TX D2D UE 1111 is camped and common resources for discovery information transmissions are not broadcasted. The discovery information transmission is supported if SystemInformationBlockType19 is broadcasted by the cell. Alternately, whether the discovery information transmission is supported or not in the cell is determined by an indication in SystemInformationBlockType19 broadcasted by the cell. The TX D2D UE 1111 transmits a discovery resource request message to the eNB 1113 at operation 1119. For example, the discovery resource request message may be a ProSe UE Information message. The discovery resource request message includes a D2D ID of the TX D2D UE 1111. The D2D ID may be a UE ID, an application user ID, an expression code, or an application ID+user ID. Unlike the description in FIG. 11, there may be a case that the discovery resource request message does not include the D2D ID of the TX D2D UE 1111. For example, if there is no need of indicating information on the dedicated discovery resource which is allocated to the TX D2D UE 1111 to a RX D2D UE, the discovery resource request message does not include the D2D ID for the TX D2D UE 1111.

The TX D2D UE 1111 may indicate to the eNB 1113 through the discovery resource request message that the TX D2D UE 1111 requests a discovery resource for transmitting the discovery information. That is, the discovery resource request message may include information indicating that the discovery resource for transmitting the discovery information is requested.

The TX D2D UE 1111 may indicate to the eNB 1113 through the discovery resource request message how many discovery resources the TX D2D UE 1111 requests or the number of discovery information elements or discovery messages which the TX D2D UE 1111 will transmit. That is, the discovery resource request message may include information indicating the number of the discovery resources or information indicating the number of the discovery information elements.

The TX D2D UE 1111 may indicate to the eNB 1113 through the discovery resource request message a period that the TX D2D UE 1111 will transmit discovery information. That is, the discovery resource request message may include information indicating a discovery information transmitting period.

The TX D2D UE 1111 may indicate to the eNB 1113 through the discovery resource request message how long the TX D2D UE 1111 requests a related discovery resource for respective discovery information. That is, the discovery resource request message may include information indicating discovery resource maintain time.

The discovery resource request message may include a discovery resource request index. If the TX D2D UE 1111 requests for resources for multiple discovery information transmissions in a discovery resource request message, a discovery resource request index is allocated for each requested resource.

The discovery resource request message may include a priority level for each requested resource in discovery resource request.

The discovery resource request message may include, a range class associated with discovery information to be announced. In one embodiment of the present disclosure, a discovery service indicator may be defined. The discovery service indicator indicates a set of values for parameters such as a discovery period, a priority, a range class, duration, and the like. The discovery resource request message may include a discovery service indicator which corresponds to a discovery information transmission for which the discovery resource is requested. The discovery service indicator may be included in the discovery resource request message instead of individual parameters.

After receiving the discovery resource request message from the TX D2D UE 1111, the eNB 1113 determines whether the TX D2D UE 1111 which transmits the discovery resource request message is a stationary D2D UE at operation 1121. The eNB 1113 may determine whether the TX D2D UE 1111 which transmits the discovery resource request message is a stationary D2D UE based on UE capability which is exchanged between the TX D2D UE 1111 and the network. The UE capability is exchanged between the TX D2D UE 1111 and the network when the TX D2D UE 1111 registers with the network or as and when it is requested by network. The eNB 1113 may determine whether the TX D2D UE 1111 which transmits the discovery resource request message is a stationary D2D UE based on a UEs subscription profile in the network.

Alternatively, the eNB 1113 may determine whether the TX D2D UE 1111 is a stationary D2D UE based on indication from the TX D2D UE 1111 included in the discovery resource request message.

Alternatively, only a stationary D2D UE may be configured to transmit the discovery resource request message. In this case, that the discovery resource request message is transmitted from the TX D2D UE 1111 means that the TX D2D UE 1111 is stationary.

Alternatively, the eNB 1113 may determine whether the TX D2D UE 1111 is stationary based on the D2D ID. The D2D ID may include a bit which indicates whether the TX D2D UE 1111 is stationary. The D2D ID which is allocated to a stationary D2D UE is different from D2D IDs which are allocated to mobile D2D UEs. The eNB 1113 may determine whether the TX D2D UE 1111 is a stationary D2D UE using the D2D ID by checking a type of the D2D ID or enquiring with a D2D server.

Although not shown in FIG. 11, the eNB 1113 performs an operation of checking whether the TX D2D UE 1111 is a D2D UE which is authorized to request discovery resource. The eNB 1113 performs the operation of checking whether the TX D2D UE 1111 is the D2D UE which is authorized to request the discovery resource (or the type 2 discovery resource) based on a UE context which is received from an MME. If the TX D2D UE 1111 is authorized to request the discovery resource, the eNB 1113 allocates a discovery resource to the TX D2D UE 1111.

For example, the UE context includes at least one of (1) information indicating whether a D2D UE is authorized to request a discovery resource, (2) information indicating how many discovery resources may be allocated to a D2D UE, (3) information indicating a discovery resource mechanism which a D2D UE uses, and (4) information indicating whether a D2D UE is a stationary D2D UE. The discovery resource mechanism includes one of a type 1 discovery resource mechanism and a type 2 discovery resource mechanism. In type 1 (or UE autonomous resource selection) discovery resource mechanism, a D2D UE randomly selects resources from a resource pool. Resources selected by multiple TX UEs can be same, and hence may collide in the type 1 discovery resource mechanism. In type 2 (or scheduled resource allocation) discovery resource mechanism, discovery resources are allocated to a D2D UE by a network. There is no collision in the type 2 discovery resource mechanism.

If the eNB 1113 determines that the TX D2D UE 1111 is not authorized for ProSe direct discovery announcement, the eNB 1113 rejects the discovery resource request message, and indicates the same to TX D2D UE 1111 in a discovery resource response message. The rejection can be explicitly indicated in the discovery resource response message. Alternately, a discovery resource response message with no information on discovery resources can indicate the rejection of discovery resource request message. Upon determining that the TX D2D UE 1111 is a stationary D2D UE, the eNB 1113 allocates one or more dedicated discovery resources to the TX D2D UE 1111 at operation 1121. The dedicated discovery resource can be a dedicated discovery resource pool, the TX D2D UE 1111 randomly selects resource for a discovery information transmission. The dedicated discovery resource pool can be a dedicated discovery resource pool with a resource index indicating the resource within the discovery resource pool. The eNB 1113 manages a discovery resource table, and stores a mapping relation between the allocated dedicated discovery resource and the D2D ID of the TX D2D UE 1111 to which the dedicated discovery resource is allocated at operation 1125. It will be noted that a plurality of discovery resources may be mapped to the same D2D ID, so there may be a plurality of mapping relations for the same D2D ID in the discovery resource table.

The eNB 1113 transmits a discovery resource response message as a response message to the discovery resource request message to the TX D2D UE 1111 at operation 1123. The discovery resource response message includes information on the dedicated discovery resource which is allocated to the TX D2D UE 1111. For example, the discovery resource response message may be a RRC connection reconfiguration message.

The dedicated discovery resource information can be a dedicated discovery resource pool, and the D2D UE randomly selects resource for a discovery information transmission. The dedicated discovery resource information can be a dedicated discovery resource pool with one or more resource indexes indicating the resources within the discovery resource pool assigned to the TX D2D UE 1111. The resource index may include a time index and a frequency index. The time index may indicate radio frame and/or subframe having the assigned discovery resource. The frequency index indicates the discovery physical channel index or physical radio block index of the assigned discovery resource. The information on the dedicated discovery resource may include a related dedicated discovery resource period. Alternately, the discovery resource period is broadcasted by a network and not signaled dedicatedly. The discovery resource period represents a period during which a related discovery resource is available. The discovery resource period may be set to n*discovery resource cycle. Here, the n may be signaled through the discovery resource response message, or may be pre-defined.

The eNB 1113 may include a discovery resource allocation index for an allocated dedicated discovery resource into the discovery resource response message. The discovery resource allocation index may be used in order for the TX D2D UE 1111 or the eNB 1113 to request to release dedicated discovery resources. That is, if the discovery resource request message includes the discovery resource request index, the eNB 1113 sets the discovery resource allocation index to the same as the discovery resource request index.

Alternatively, if the discovery resource request message does not include the discovery resource request index, the eNB 1113 manages the discovery resource allocation index per D2D UE, and includes the discovery resource allocation index into the discovery resource response message.

Alternatively, regardless of whether the discovery resource request index is included in the discovery resource request message, the eNB 1113 manages the discovery resource allocation index per D2D UE, and includes the discovery resource allocation index into the discovery resource response message.

Unlike the above description, the eNB 1113 does not allocate a dedicated discovery resource to the TX D2D UE 1111, and may provide a contention based resource pool (or a type 1 TX resource pool) to the TX D2D UE 1111, or may not provide a dedicated discovery resource to the TX D2D UE 1111.

Meanwhile, if the range class is received in the discovery resource request message, the eNB 1113 sets power parameters for assigned discovery resources (a contention based pool or dedicated discovery resources) according to the range class. If the TX D2D UE 1111 has informed a different range class for a different discovery information transmission, the eNB 1113 sets different power parameters for each of assigned discovery resources (the contention based pool or the dedicated discovery resources). If the range class is received in the discovery resource request message, and the eNB 1113 assigns Type 1 TX resource pool in discovery resource response message, the eNB 1113 assigns a TX resource pool corresponding to range class requested, and the eNB 1113 maintains a separate TX resource pool for each range class.

Alternatively, a range class associated with the TX D2D UE 1111 may be determined by the eNB 1113 from a UE context which is received from an MME, so the eNB 1113 sets power parameters for discovery resources (the contention based pool or the dedicated discovery resources) which are allocated to the TX D2D UE 1111 according to the range class. If the eNB 1113 assigns a Type 1 TX resource pool in discovery resource response, the eNB 1113 assigns a TX resource pool corresponding to a range class requested, and the eNB 1113 maintains a separate TX resource pool for each range class.

Alternately, If the range class is not received in the discovery resource request message, or the range class is not received from an MME in a UE's context, and the eNB 1113 may assigns a Type 1 TX resource pool in a discovery resource response message, the eNB 1113 assigns multiple TX resource pools, and maintains a separate TX resource pool for each range class. The TX D2D UE 1111 will select the TX resource pool based on the range class. Alternately, the eNB 1113 may broadcast or transmit in a discovery resource response mapping between a range class and a power parameter (e.g. max power) for each range class supported by a network. The TX D2D UE 1111 will select the power parameters corresponding to an authorized range class of the TX D2D UE 1111 or a range class associated with discovery information which the TX D2D UE 1111 wants to transmit.

The discovery resource response message includes a time period by which the discovery resource is allocated. For example, the discovery resource response message may indicate that discovery resources are available during x transmissions, and a period among the x transmissions is n*discovery resource cycle.

If a dedicated discovery resource is used in only a RRC connected state, a time period is not defined, and the allocated resources are valid until allocated discovery resources are released by explicit signaling by a D2D UE or an eNB or a RRC connection is released.

The time from which the received discovery resource configuration in discovery resource response is applicable and used by TX D2D UE 1111 for discovery information transmission is determined as follows.

In the first scheme, if an eNB transmits a discovery resource response message at a discovery resource cycle x, or a TX D2D UE receives the discovery resource response message at the discovery resource cycle x, the first instance of a dedicated discovery resource which is allocated to the TX D2D UE exists at the pth discovery resource cycle after the discovery resource cycle x, i.e., a discovery resource cycle x+p. The p may be fixed in the communication system, for example, the p may be set to 1 (p=1) which means that the TX D2D UE 111, from the next discovery resource cycle use the resources indicated in the discovery resource response for discovery information transmission if discovery resources are included in the discovery resource response message. Alternately, the p may be signaled in the discovery resource response message.

The first scheme has been described in FIG. 2, and a description thereof will be omitted herein.

In the second scheme, if a difference between a sub-frame/frame in which a discovery resource response message is received and a sub-frame/frame which corresponds to a dedicated discovery resource which is allocated at the first discovery resource cycle after a discovery resource cycle x in which the discovery resource response message is received, i.e., a discovery resource cycle x+1 is less than a preset offset, the first instance of a dedicated discovery resource which is allocated to a TX D2D UE exists at a discovery resource cycle x+2. In this case, the offset is included in the discovery resource response message.

The second scheme has been described in FIG. 3, and a description thereof will be omitted herein.

In the third scheme, if a difference between a sub-frame/frame in which a discovery resource response message is received and a sub-frame/frame which corresponds to a dedicated discovery resource which is allocated at the first discovery resource cycle after a discovery resource cycle x in which the discovery resource response message is received, i.e., a discovery resource cycle x+1 is equal to or greater than a preset offset, the first instance of a dedicated discovery resource which is allocated to a TX D2D UE exists at the discovery resource cycle x+1. In this case, the offset is included in the discovery resource response message.

The third scheme has been described in FIG. 4, and a description thereof will be omitted herein.

Meanwhile, the eNB 1113 may indicate whether a dedicated discovery resource which is allocated to the TX D2D UE 111 is available in a RRC idle state. For example, the eNB 1113 may include information indicating whether the allocated dedicated discovery resource is available in the RRC idle state into the discovery resources response message.

If the information on the dedicated discovery resource is indicated to a RX D2D UE, the eNB 1113 allocates a dedicated discovery resource to the TX D2D UE 1111, and determines whether there is a RX D2D UE which is interested in the dedicated discovery resource of the TX D2D UE 1111 at operation 1127. The eNB 1113 maintains a discovery resource table which includes a mapping relation between a RX D2D UE connection ID, e.g., a cell-radio network temporary identifier (C-RNTI) and a D2D ID of a TX D2D UE in which a RX D2D UE is interested at operation 1127. The discovery resource table is maintained based on discovery resource requests from RX D2D UEs to the eNB 1113. If there is the RX D2D UE which is interested in the dedicated discovery resource of the TX D2D UE 1111, the eNB 1113 transmits a discovery resource information message including information on the dedicated discovery resource to the RX D2D UE, i.e., the RX D2D UE 1115 at operation 1133. The eNB 1113 may include the D2D ID of the TX D2D UE 1111 which corresponds to the dedicated discovery resource included in the discovery resource information message into the discovery resource information message.

After allocating the new dedicated discovery resource to the TX D2D UE 1111, the eNB 1113 updates information on the dedicated discovery resource into discovery resource information at operation 1135. The eNB 1113 broadcasts the updated discovery resource information through system information at operation 1135.

After receiving the discovery resource response message from the eNB 1113, the TX D2D UE 1111 may release the RRC connection with the eNB 1113, and may transit into the RRC idle state at operation 1129. The TX D2D UE 1111 transmits discovery information using the dedicated discovery resource in the RRC idle state at operation 1131. If the dedicated discovery resource is available during a specific period, the TX D2D UE 1111 establishes a RRC connection with the eNB 1113, and requests dedicated discovery resources to the eNB 1113 again. It will be noted that the eNB 1113 maintains information on the allocated dedicated discovery resource even though the TX D2D UE 1111 releases the RRC connection. The eNB 1113 releases the allocated dedicated discovery resources after the available period.

After allocating the dedicated discovery resource to the TX D2D UE 1111, the eNB 1113 may determine whether the TX D2D UE 1111 has to exist in the RRC connected state or the RRC idle state. The eNB 1113 may determine whether the TX D2D UE 1111 has to exist in the RRC connected state or the RRC idle state based on a mobility state of the TX D2D UE 1111. If the RRC connection is released, the eNB 1113 may indicate that the dedicated discovery resource which is allocated to the TX D2D UE 1111 is available in the RRC idle state.

The dedicated discovery resource which is allocated to the TX D2D UE 1111 may be released at one of the following cases.

a) The TX D2D UE 1111 is powered down.

b) The TX D2D UE 1111 notifies to the eNB 1113 that the TX D2D UE 1111 does not need the allocated dedicated discovery resource any more.

c) A period during which the allocated dedicated discovery resource is available is terminated.

For example, upon determining that the TX D2D UE 1111 does not transmit discovery information any more, the TX D2D UE 1111 may notify to the eNB 1113 that the TX D2D UE 1111 does not need the allocated dedicated discovery resource any more. The TX D2D UE 1111 transmits a discovery resource release message to the eNB 1113 or may indicate number of resources to zero in the discovery resource request message.

If a plurality of dedicated discovery resources are allocated to the TX D2D UE 1111, and the TX D2D UE 1111 wants to release a part of the plurality of dedicated discovery resources, the TX D2D UE 1111 notifies the eNB 1113 of the number of discovery resources which the TX D2D UE 1111 wants to release or retain or discovery resource allocation indexes for the discovery resources which the TX D2D UE 1111 wants to release.

In a case that the eNB 1113 determines to release the dedicated discovery resources which are allocated to the TX D2D UE 1111, i.e., an eNB initiated release case, or a case that the eNB 1113 receives a discovery resource release message from the TX D2D UE 1111, the eNB 1113 transmits a discovery resource release message or a RRC connection reconfiguration message to the TX D2D UE 1111, releases a discovery resource which is allocated to the TX D2D UE 1111, and transmits information on an old dedicated discovery resource which is allocated to the TX D2D UE 1111 or information on the released dedicated discovery resource. Here, the eNB 1113 may transmit the information on the old dedicated discovery resources which are allocated to the TX D2D UE 1111 if only a part of the dedicated discovery resources which are allocated to the TX D2D UE 1111 is released.

Upon receiving a resource release message or a RRC reconfiguration message from the TX D2D UE 1111, the eNB 1113 releases all dedicated discovery resources which are allocated to the TX D2D UE 1111. If all dedicated discovery resources which are allocated to the TX D2D UE 1111 are available only in a RRC connected state, or all dedicated discovery resources should be released, the eNB 1113 may transmit a RRC connection release message to release all dedicated discovery resources which are allocated to the TX D2D UE 1111.

Dedicated discovery resource release may be indicated by the TX D2D UE 1111 using a discovery resource request message. That is, the discovery resource request message may be used for requesting a dedicated discovery resource or releasing an allocated dedicated discovery resource.

Further, dedicated discovery resource release may be indicated by the eNB 1113 using a discovery resource response message. The discovery resource response message may be used for allocating a dedicated discovery resource or releasing an allocated dedicated discovery resource.

If allocated dedicated discovery resources are available only in a RRC connected state, or there is a need for releasing all dedicated discovery resources, the TX D2D UE 1111 may transmit a RRC connection release message to release all dedicated discovery resources.

Alternatively, after releasing a dedicated discovery resource which is allocated to the TX D2D UE 1111, the eNB 1113 updates information on the released dedicated discovery resource into the discovery resource information to remove information on the released dedicated discovery resource. The eNB 1113 broadcasts the updated discovery resource information through system information.

Although FIG. 11 illustrates still another example of a process of allocating a dedicated discovery resource to a TX D2D UE in a communication system supporting a D2D scheme according to an embodiment of the present disclosure, various changes could be made to FIG. 11. For example, although shown as a series of operations, various operations in FIG. 11 could overlap, occur in parallel, occur in a different order, or occur multiple times.

Still another example of a process of allocating a dedicated discovery resource to a TX D2D UE in a communication system supporting a D2D scheme according to an embodiment of the present disclosure has been described with reference to FIG. 11, and still another example of a process of allocating a dedicated discovery resource to a TX D2D UE in a communication system supporting a D2D scheme according to an embodiment of the present disclosure will be described with reference to FIG. 12.

Figure 12:
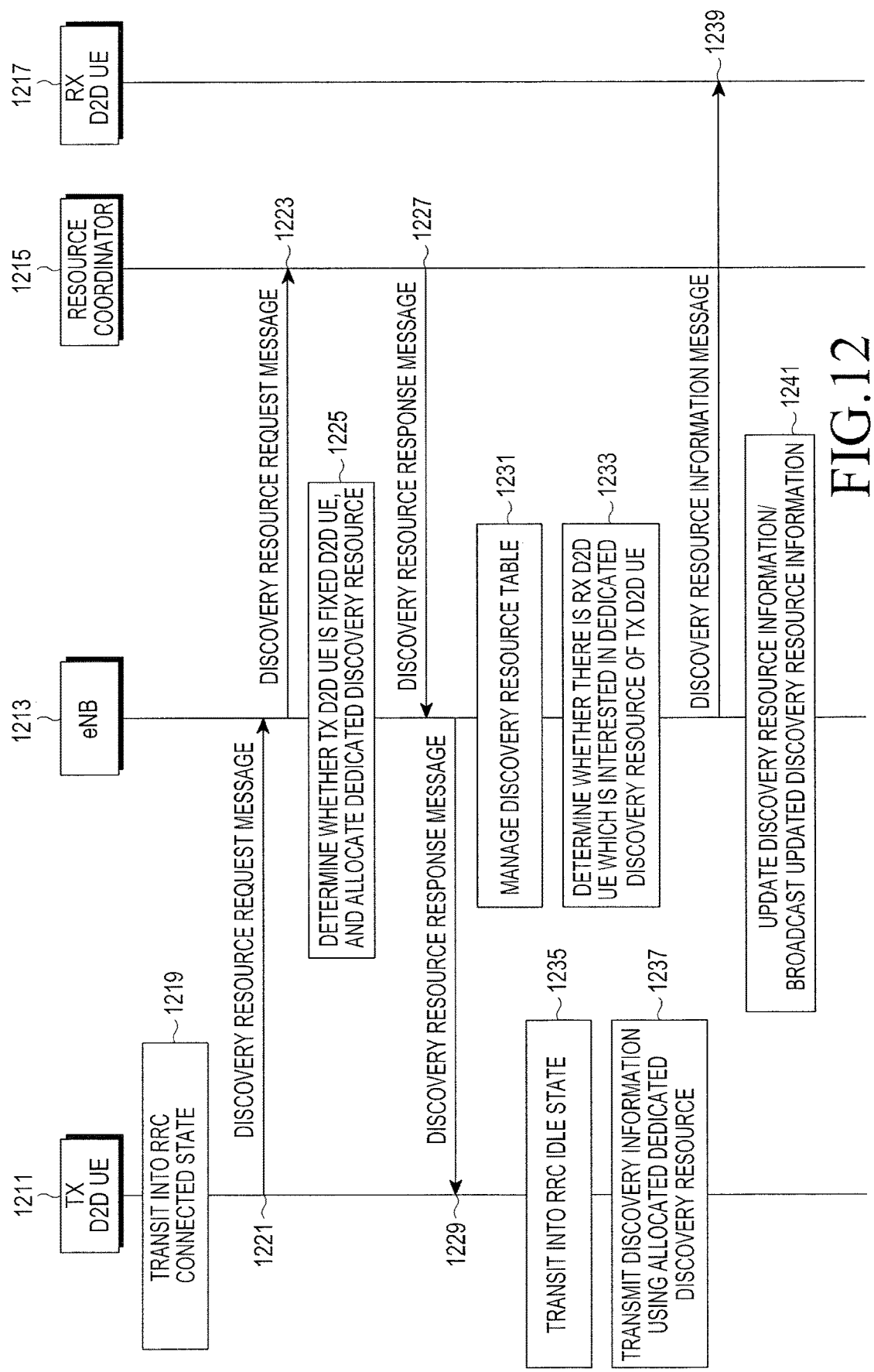
FIG. 12 schematically illustrates still another example of a process of allocating a dedicated discovery resource to a TX D2D UE in a communication system supporting a D2D scheme according to an embodiment of the present disclosure.

FIG. 12 schematically illustrates still another example of a process of allocating a dedicated discovery resource to a TX D2D UE in a communication system supporting a D2D scheme according to an embodiment of the present disclosure.

Prior to description of FIG. 12, an eNB may allocate a dedicated discovery resource to a TX D2D UE under a control of a resource coordinator instead of independently allocating the dedicated discovery resource to the TX D2D UE. If the dedicated discovery resource is allocated under the control of the resource coordinator, it will be guaranteed that a dedicated discovery resource which is allocated to a specific TX D2D UE at one cell is not allocated to other TX D2D UE at other cell. Here, collision between a discovery information transmission by the specific TX D2D UE at the one cell and a discovery information transmission by the other TX D2D UE at the other cell may be avoided by guaranteeing that the dedicated discovery resource which is allocated to the specific TX D2D UE at the one cell is not allocated to the other TX D2D UE at the other cell. The resource coordinator may manage a common dedicated discovery resource pool to manage a dedicated discovery resource allocation state of the eNB.

Referring to FIG. 12, the communication system includes a TX D2D UE 1211, an eNB 1213, a resource coordinator 1215, and a RX D2D UE 1217.

The TX D2D UE 1211 which wants to transmit discovery information establishes a RRC connection with the eNB 1213, and transits into a RRC connected state at operation 1219. The TX D2D UE 1211 transmits a discovery resource request message to the eNB 1213 at operation 1221. The discovery resource request message includes a D2D ID of the TX D2D UE 1211. The D2D ID may be a UE ID, an application user ID, an expression code, or an application ID+user ID. The discovery resource request message may be implemented in the manner described with reference to FIG. 11, and a description thereof will be omitted herein.

After receiving the discovery resource request message from the TX D2D UE 1211, the eNB 1213 transmits the discovery resource request message to the resource coordinator 1215 at operation 1223. After transmitting the discovery resource request message to the resource coordinator 1215, the eNB 1213 determines whether the TX D2D UE 1211 which transmits the discovery resource request message is a stationary D2D UE at operation 1225. Here, an operation of determining whether the TX D2D UE 1211 which transmits the discovery resource request message is the stationary D2D UE may be implemented in the manner described with reference to FIG. 11, and a description thereof will be omitted herein.

After receiving the discovery resource request message from the eNB 1213, the resource coordinator 1215 determines a dedicated discovery resource which will be allocated to the TX D2D UE 1211 based on a common dedicated discovery resource pool, and transmits a discovery resource response message including information on the determined dedicated discovery resource to the eNB 1213 at operation 1227. An operation of allocating to the dedicated discovery resource to the TX D2D UE 1211 has been described in the first implementation scheme of the present disclosure, i.e., an operation of a resource coordinator 515 in FIG. 5, an operation of a resource coordinator 615 in FIG. 6, and an operation of a resource coordinator 925 in FIG. 9, so detailed description will be omitted herein.

After receiving the discovery resource response message from the resource coordinator 1215, the eNB 1213 allocates a dedicated discovery resource to the TX D2D UE 1211 based on the information on the dedicated discovery resource included in the discovery resource response message, and transmits a discovery resource response message including information on the allocated dedicated discovery resource to the TX D2D UE 1211 at operation 1229. The discovery resource response message may be implemented in the manner described with reference to FIG. 11, and a description thereof will be omitted herein.

The eNB 1213 manages a discovery resource table, and stores a mapping relation between the allocated dedicated discovery resource and the D2D ID of the TX D2D UE 1211 to which the dedicated discovery resource is allocated in the discovery resource table at operation 1231. It will be noted that a plurality of discovery resources may be mapped to the same D2D ID, so there may be a plurality of mapping relations for the same D2D ID in the discovery resource table.

The eNB 1213 may indicate whether the allocated dedicated discovery resources are available in a RRC idle state. For example, the eNB 1213 may include information indicating whether the allocated dedicated discovery resources are available in the RRC idle state into the discovery resource response message.

If the information on the dedicated discovery resource is indicated to a RX D2D UE, the eNB 1213 allocates a dedicated discovery resource to the TX D2D UE 1211, and determines whether there is a RX D2D UE which is interested in the dedicated discovery resource of the TX D2D UE 1211 at operation 1233. The eNB 1213 maintains a discovery resource table which includes a mapping relation between a RX D2D UE connection ID, e.g., a C-RNTI and a D2D ID of a TX D2D UE in which a RX D2D UE is interested at operation 1233. The discovery resource table is maintained based on discovery resource requests from RX D2D UEs to the eNB 1213. If there is the RX D2D UE which is interested in the dedicated discovery resource of the TX D2D UE 1211, the eNB 1213 transmits a discovery resource information message including information on the dedicated discovery resource to the RX D2D UE, i.e., the RX D2D UE 1217 at operation 1239. The eNB 1213 may include the D2D ID of the TX D2D UE 1211 which corresponds to the dedicated discovery resource included in the discovery resource information message into the discovery resource information message.

After allocating the new dedicated discovery resource to the TX D2D UE 1211, the eNB 1213 updates information on the dedicated discovery resource into discovery resource information at operation 1241. The eNB 1213 broadcasts the updated discovery resource information through system information at operation 1241.

After receiving the discovery resource response message from the eNB 1213, the TX D2D UE 1211 releases the RRC connection with the eNB 1213, and transits into a RRC idle state at operation 1235. The TX D2D UE 1211 transmits discovery information using the allocated dedicated discovery resource in the RRC idle state at operation 1237. If the dedicated discovery resource is available during a specific period, the TX D2D UE 1211 establishes a RRC connection with the eNB 1213, and requests dedicated discovery resources to the eNB 1213 again. It will be noted that the eNB 1213 maintains information on the allocated dedicated discovery resource even though the TX D2D UE 1211 releases the RRC connection. The eNB 1213 releases the allocated dedicated discovery resources after the available period.

After allocating the dedicated discovery resource to the TX D2D UE 1211, the eNB 1213 may determine whether the TX D2D UE 1211 has to exist in the RRC connected state or the RRC idle state. An operation of determining whether the TX D2D UE 1211 has to exist in the RRC connected state or the RRC idle state in the eNB 1213 after the dedicated discovery resource is allocated to the TX D2D UE 1211 may be implemented in the manner described with reference to FIG. 11, and a description thereof will be omitted herein.

The case that the dedicated discovery resource which is allocated to the TX D2D UE 1211 is released has been described in FIG. 11, and a description thereof will be omitted herein.

Although FIG. 12 illustrates still another example of a process of allocating a dedicated discovery resource to a TX D2D UE in a communication system supporting a D2D scheme according to an embodiment of the present disclosure, various changes could be made to FIG. 12. For example, although shown as a series of operations, various operations in FIG. 12 could overlap, occur in parallel, occur in a different order, or occur multiple times.

Still another example of a process of allocating a dedicated discovery resource to a TX D2D UE in a communication system supporting a D2D scheme according to an embodiment of the present disclosure has been described with reference to FIG. 12, and still another example of a process of allocating a dedicated discovery resource to a TX D2D UE in a communication system supporting a D2D scheme according to an embodiment of the present disclosure will be described with reference to FIG. 13.

Figure 13:
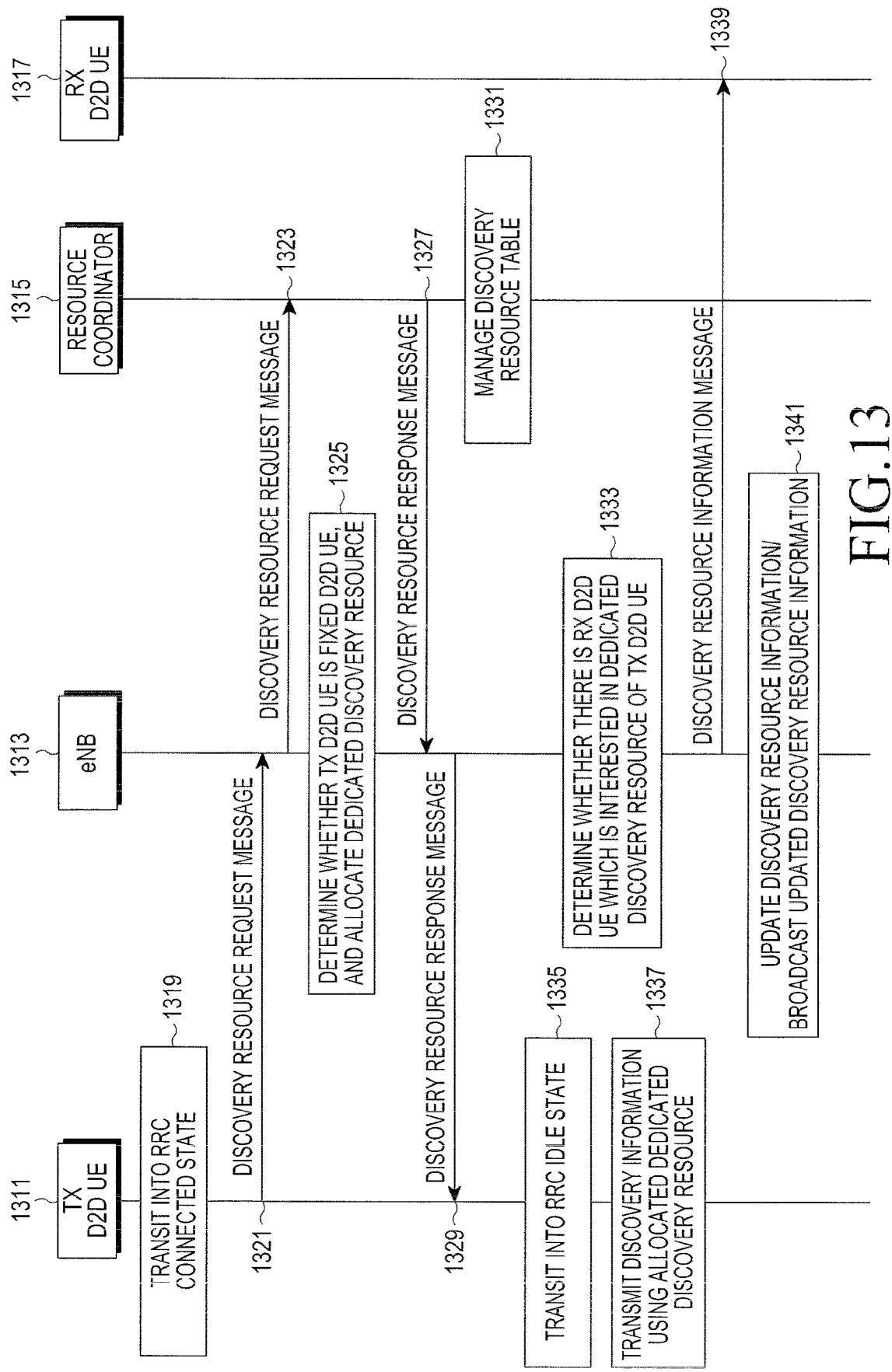
FIG. 13 schematically illustrates still another example of a process of allocating a dedicated discovery resource to a TX D2D UE in a communication system supporting a D2D scheme according to an embodiment of the present disclosure.

FIG. 13 schematically illustrates still another example of a process of allocating a dedicated discovery resource to a TX D2D UE in a communication system supporting a D2D scheme according to an embodiment of the present disclosure.

Referring to FIG. 13, the communication system includes a TX D2D UE 1311, an eNB 1313, a resource coordinator 1315, and a RX D2D UE 1317.

The TX D2D UE 1311 establishes a RRC connection with the eNB 1313, and transits into a RRC connected state at operation 1319. The TX D2D UE 1311 transmits a discovery resource request message to the eNB 1313 at operation 1321. The discovery resource request message includes a D2D ID of the TX D2D UE 1311. The D2D ID may be a UE ID, an application user ID, an expression code, or an application ID+user ID. The discovery resource request message may be implemented in the manner described with reference to FIG. 11, and a description thereof will be omitted herein.

After receiving the discovery resource request message from the TX D2D UE 1311, the eNB 1313 transmits the discovery resource request message to the resource coordinator 1315 at operation 1323. After transmitting the discovery resource request message to the resource coordinator 1315, the eNB 1313 determines whether the TX D2D UE 1311 which transmits the discovery resource request message is a stationary D2D UE at operation 1325. Here, an operation of determining whether the TX D2D UE 1311 which transmits the discovery resource request message is the stationary D2D UE may be implemented in the manner described with reference to FIG. 11, and a description thereof will be omitted herein.

After receiving the discovery resource request message from the eNB 1313, the resource coordinator 1315 determines a dedicated discovery resource which will be allocated to the TX D2D UE 1311 based on a common dedicated discovery resource pool, and transmits a discovery resource response message including information on the determined dedicated discovery resource to the eNB 1313 at operation 1327. An operation of allocating to the dedicated discovery resource to the TX D2D UE 1311 has been described in the first implementation scheme of the present disclosure, i.e., an operation of a resource coordinator 515 in FIG. 5, an operation of a resource coordinator 615 in FIG. 6, and an operation of a resource coordinator 925 in FIG. 9, so detailed description will be omitted herein.

After receiving the discovery resource response message from the resource coordinator 1315, the eNB 1313 allocates a dedicated discovery resource to the TX D2D UE 1311 based on the information on the dedicated discovery resource included in the discovery resource response message, and transmits a discovery resource response message including information on the allocated dedicated discovery resource to the TX D2D UE 1311 at operation 1329. The discovery resource response message may be implemented in the manner described with reference to FIG. 11, and a description thereof will be omitted herein.

The resource coordinator 1315 manages a discovery resource table, and stores a mapping relation between the allocated dedicated discovery resource and the D2D ID of the TX D2D UE 1311 to which the dedicated discovery resource is allocated in the discovery resource table at operation 1331. It will be noted that a plurality of discovery resources may be mapped to the same D2D ID, so there may be a plurality of mapping relations for the same D2D ID in the discovery resource table.

The eNB 1313 may indicate whether the allocated dedicated discovery resources are available in a RRC idle state. For example, the eNB 1313 may include information indicating whether the allocated dedicated discovery resources are available in the RRC idle state into the discovery resource response message.

If the information on the dedicated discovery resource is indicated to a RX D2D UE, the eNB 1313 allocates a dedicated discovery resource to the TX D2D UE 1311, and determines whether there is a RX D2D UE which is interested in the dedicated discovery resource of the TX D2D UE 1311 at operation 1333. The eNB 1313 maintains a discovery resource table which includes a mapping relation between a RX D2D UE connection ID, e.g., a C-RNTI and a D2D ID of a TX D2D UE in which a RX D2D UE is interested at operation 1333. The discovery resource table is maintained based on discovery resource requests from RX D2D UEs to the eNB 1313. If there is the RX D2D UE which is interested in the dedicated discovery resource of the TX D2D UE 1311, the eNB 1313 transmits a discovery resource information message including information on the dedicated discovery resource to the RX D2D UE, i.e., the RX D2D UE 1317 at operation 1339. The eNB 1313 may include the D2D ID of the TX D2D UE 1311 which corresponds to the dedicated discovery resource included in the discovery resource information message into the discovery resource information message.

After allocating the new dedicated discovery resource to the TX D2D UE 1311, the eNB 1313 updates information on the dedicated discovery resource into discovery resource information at operation 1341. The eNB 1313 broadcasts the updated discovery resource information through system information at operation 1341.

After receiving the discovery resource response message from the eNB 1313, the TX D2D UE 1311 releases the RRC connection with the eNB 1313, and transits into a RRC idle state at operation 1335. The TX D2D UE 1311 transmits discovery information using the allocated dedicated discovery resource in the RRC idle state at operation 1337. If the dedicated discovery resource is available during a specific period, the TX D2D UE 1311 establishes a RRC connection with the eNB 1313, and requests dedicated discovery resources to the eNB 1213 again. It will be noted that the eNB 1313 maintains information on the allocated dedicated discovery resource even though the TX D2D UE 1311 releases the RRC connection. The eNB 1313 releases the allocated dedicated discovery resources after the available period.

After allocating the dedicated discovery resource to the TX D2D UE 1311, the eNB 1313 may determine whether the TX D2D UE 1311 has to exist in the RRC connected state or the RRC idle state. An operation of determining whether the TX D2D UE 1311 has to exist in the RRC connected state or the RRC idle state in the eNB 1313 after the dedicated discovery resource is allocated to the TX D2D UE 1311 may be implemented in the manner described with reference to FIG. 11, and a description thereof will be omitted herein.

The case that the dedicated discovery resource which is allocated to the TX D2D UE 1311 is released has been described in FIG. 11, and a description thereof will be omitted herein.

Although FIG. 13 illustrates still another example of a process of allocating a dedicated discovery resource to a TX D2D UE in a communication system supporting a D2D scheme according to an embodiment of the present disclosure, various changes could be made to FIG. 13. For example, although shown as a series of operations, various operations in FIG. 13 could overlap, occur in parallel, occur in a different order, or occur multiple times.

Still another example of a process of allocating a dedicated discovery resource to a TX D2D UE in a communication system supporting a D2D scheme according to an embodiment of the present disclosure has been described with reference to FIG. 13, and still another example of a process of allocating a dedicated discovery resource to a TX D2D UE in a communication system supporting a D2D scheme according to an embodiment of the present disclosure will be described with reference to FIG. 14.

Figure 14:
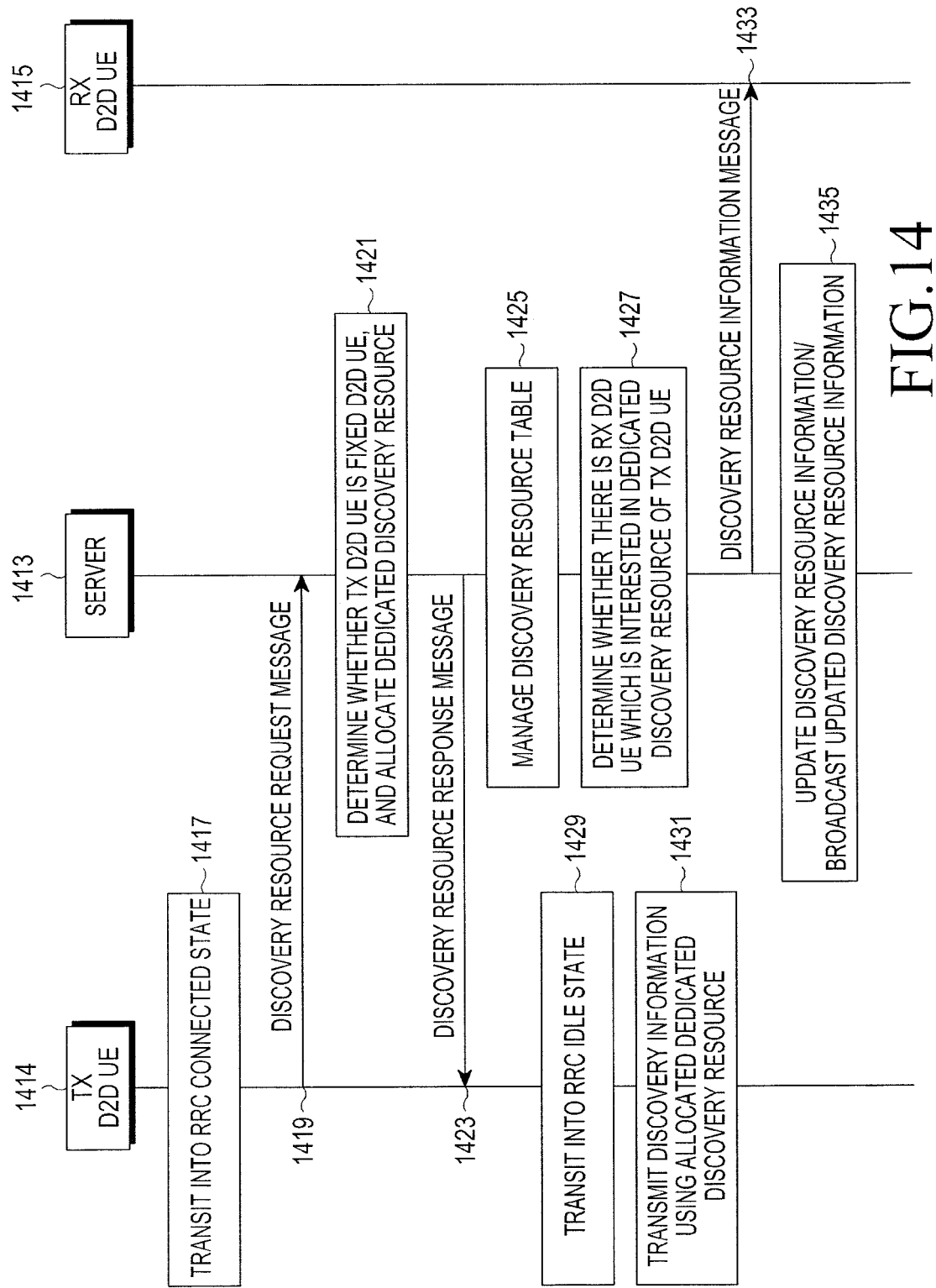
FIG. 14 schematically illustrates still another example of a process of allocating a dedicated discovery resource to a TX D2D UE in a communication system supporting a D2D scheme according to an embodiment of the present disclosure.

FIG. 14 schematically illustrates still another example of a process of allocating a dedicated discovery resource to a TX D2D UE in a communication system supporting a D2D scheme according to an embodiment of the present disclosure.

Referring to FIG. 14, the communication system includes a TX D2D UE 1411, a server 1413, and a RX D2D UE 1415.

The TX D2D UE 1411 establishes a RRC connection with the server 1413, and transits into a RRC connected state at operation 1417. The TX D2D UE 1411 transmits a discovery resource request message to the server 1413 at operation 1419. The discovery resource request message includes a D2D ID of the TX D2D UE 1411. The D2D ID may be a UE ID, an application user ID, an expression code, or an application ID+user ID. The discovery resource request message may be implemented in the manner described with reference to FIG. 11, and a description thereof will be omitted herein.

After receiving the discovery resource request message from the TX D2D UE 1411, the server 1413 determines whether the TX D2D UE 1411 which transmits the discovery resource request message is a stationary D2D UE at operation 1421. An operation of determining whether the TX D2D UE 1411 which transmits the discovery resource request message is the stationary D2D UE may be implemented in the manner described with reference to FIG. 11, and a description thereof will be omitted herein.

Upon determining that the TX D2D UE 1411 is a stationary D2D UE, the server 1413 allocates a dedicated discovery resource to the TX D2D UE 1411 at operation 1421. The server 1413 manages a discovery resource table, and stores a mapping relation between the allocated dedicated discovery resource and the D2D ID of the TX D2D UE 1411 to which the dedicated discovery resource is allocated at operation 1425. It will be noted that a plurality of discovery resources may be mapped to the same D2D ID, so there may be a plurality of mapping relations for the same D2D ID in the discovery resource table.

The server 1413 transmits a discovery resource response message as a response message to the discovery resource request message to the TX D2D UE 1411 at operation 1423. The discovery resource response message may be implemented in the manner described with reference to FIG. 11, and a description thereof will be omitted herein.

If the information on the dedicated discovery resource is indicated to a RX D2D UE, the server 1413 allocates a dedicated discovery resource to the TX D2D UE 1411, and determines whether there is a RX D2D UE which is interested in the dedicated discovery resource of the TX D2D UE 1411 at operation 1427. The server 1413 maintains a discovery resource table which includes a mapping relation between a RX D2D UE connection ID, e.g., a C-RNTI and a D2D ID of a TX D2D UE in which a RX D2D UE is interested at operation 1427. The discovery resource table is maintained based on discovery resource requests from RX D2D UEs to the server 1413. If there is the RX D2D UE which is interested in the dedicated discovery resource of the TX D2D UE 1411, the server 1413 transmits a discovery resource information message including information on the dedicated discovery resource to the RX D2D UE, i.e., the RX D2D UE 1415 at operation 1433. The server 1413 may include the D2D ID of the TX D2D UE 1411 which corresponds to the dedicated discovery resource included in the discovery resource information message into the discovery resource information message.

After allocating the new dedicated discovery resource to the TX D2D UE 1411, the server 1413 updates information on the dedicated discovery resource into discovery resource information at operation 1435. The server 1413 broadcasts the updated discovery resource information through system information at operation 1435.

After receiving the discovery resource response message from the server 1413, the TX D2D UE 1411 releases the RRC connection with the server 1413, and may transit into a RRC idle state at operation 1429. The TX D2D UE 1411 transmits discovery information using the dedicated discovery resource in the RRC idle state at operation 1431. If the dedicated discovery resource is available during a specific period, the TX D2D UE 1411 establishes a RRC connection with the server 1413, and requests dedicated discovery resources to the server 1413 again. It will be noted that the server 1413 maintains information on the allocated dedicated discovery resource even though the TX D2D UE 1411 releases the RRC connection. The server 1413 releases the allocated dedicated discovery resources after the available period.

After allocating the dedicated discovery resource to the TX D2D UE 1411, the server 1413 may determine whether the TX D2D UE 1411 has to exist in the RRC connected state or the RRC idle state. The server 1413 may determine whether the TX D2D UE 1411 has to exist in the RRC connected state or the RRC idle state based on a mobility state of the TX D2D UE 1411. An operation of determining whether the TX D2D UE 1411 has to exist in the RRC connected state or the RRC idle state based on the mobility state of the TX D2D UE 1411 may be implemented in the manner described with reference to FIG. 11, and a description thereof will be omitted herein.

The case that the dedicated discovery resource which is allocated to the TX D2D UE 1411 is released has been described in FIG. 11, and a description thereof will be omitted herein.

Although FIG. 14 illustrates still another example of a process of allocating a dedicated discovery resource to a TX D2D UE in a communication system supporting a D2D scheme according to an embodiment of the present disclosure, various changes could be made to FIG. 14. For example, although shown as a series of operations, various operations in FIG. 14 could overlap, occur in parallel, occur in a different order, or occur multiple times.

Still another example of a process of allocating a dedicated discovery resource to a TX D2D UE in a communication system supporting a D2D scheme according to an embodiment of the present disclosure has been described with reference to FIG. 14, and still another example of a process of providing information on a dedicated discovery resource to a RX D2D UE in a communication system supporting a D2D scheme according to an embodiment of the present disclosure will be described with reference to FIG. 15.

Figure 15:
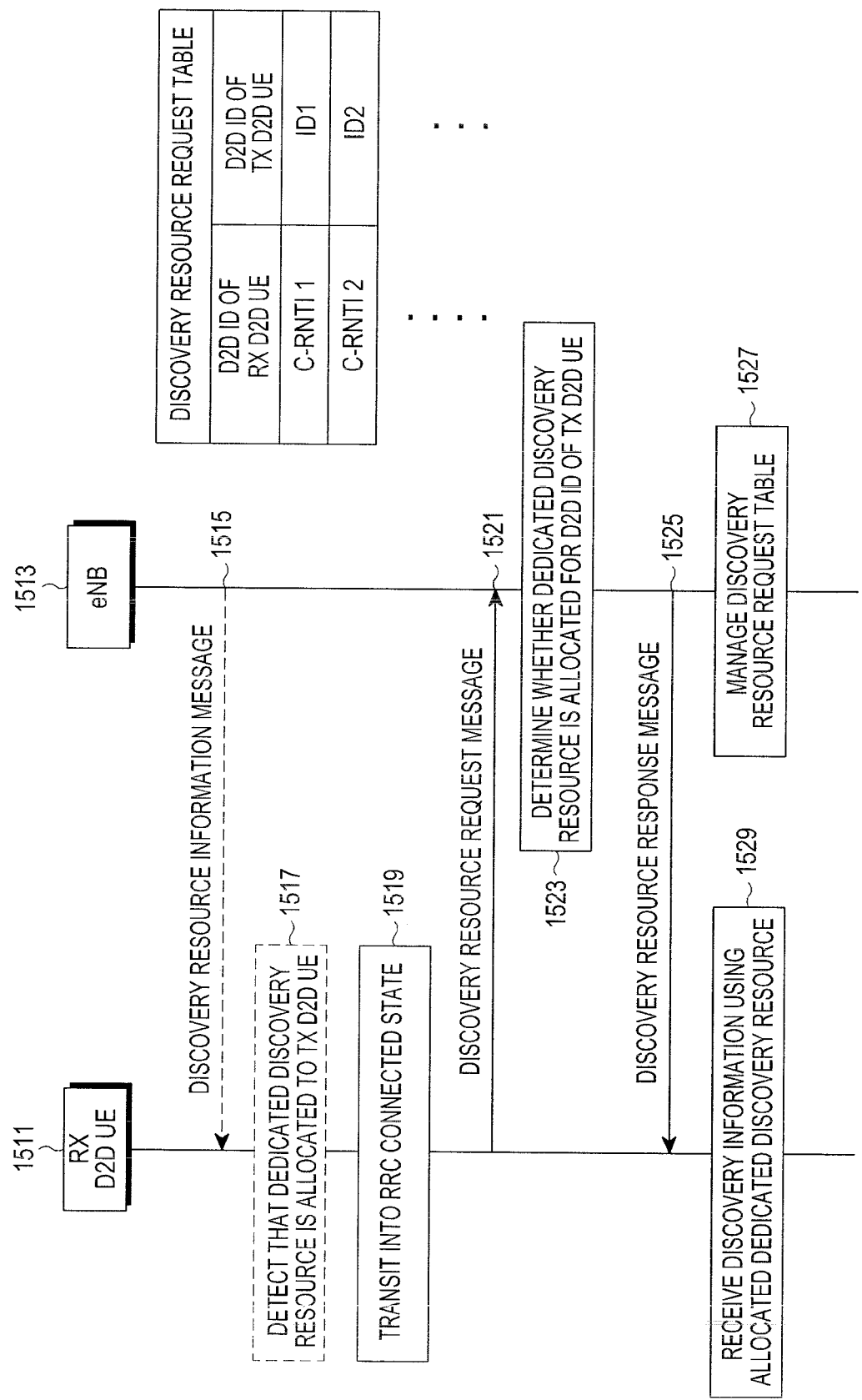
FIG. 15 schematically illustrates still another example of a process of providing information on a dedicated discovery resource to a RX D2D UE in a communication system supporting a D2D scheme according to an embodiment of the present disclosure.

FIG. 15 schematically illustrates still another example of a process of providing information on a dedicated discovery resource to a RX D2D UE in a communication system supporting a D2D scheme according to an embodiment of the present disclosure.

Referring to FIG. 15, the communication system includes a RX D2D UE 1511 and an eNB 1513.

The eNB 1513 allocates a dedicated discovery resource to a TX D2D UE (not shown in FIG. 15), and broadcasts information on the allocated dedicated discovery resource at operation 1515. For example, the information on the allocated dedicated discovery resource is broadcasted through system information. The operation 1515 may be optionally performed by the eNB 1513.

The RX D2D UE 1511 which is interested in monitoring discovery information which is transmitted by a TX D2D UE establishes a RRC connection with the eNB 1513, and transits into a RRC connected state at operation 1519. The RX D2D UE 1511 transmits a discovery resource request message to the eNB 1513 at operation 1521. The RX D2D UE 1511 includes a D2D ID of the TX D2D UE which the RX D2D UE 1511 wants to monitor into the discovery resource request message. The D2D ID may be a UE ID, an application user ID, an expression code, or an application ID+user ID. The RX D2D UE 1511 may notify that the RX D2D UE 1511 requests a dedicated discovery resource in which the RX D2D UE 1511 receives discovery information which the TX D2D UE transmits. The RX D2D UE 1511 may include a part of a D2D ID, e.g., an application ID, or a D2D category into the discovery resource request message.

A case that the RX D2D UE 1511 establishes the RRC connection with the eNB 1513 transmits the discovery resource request message to the eNB 1513 has been described above.

Alternatively, only upon detecting that the eNB 1513 has allocated a dedicated discovery resource to an arbitrary TX D2D UE at operation 1517, the RX D2D UE 1511 may transmit the discovery resource request message at operation 1519. The RX D2D UE 1511 may detect whether the eNB 1513 has allocated the dedicated discovery resource to the arbitrary TX D2D UE from resource allocation information which is broadcasted by the eNB 1513. In this case, the operation 1515 is not optional. The broadcasted resource allocation information includes information indicating whether an arbitrary dedicated discovery resource is allocated to the arbitrary TX D2D UE.

Upon receiving the discovery resource request message from the RX D2D UE 1511, the eNB 1513 checks a discovery resource table to determine whether a dedicated discovery resource is allocated for a D2D ID which is included in the discovery resource request message, i.e., a D2D ID of a TX D2D UE at operation 1523. If the dedicated discovery resource is allocated to a TX D2D UE which corresponds to the D2D ID included in the discovery resource request message, the eNB 1513 transmits a discovery resource response message including resource allocation information for the dedicated discovery resource which is allocated to the TX D2D UE to the RX D2D UE 1511 at operation 1525.

After receiving the discovery resource response message from the eNB 1513, the RX D2D UE 1511 does not release the RRC connection with the eNB 1513 and exists in the RRC connected state. The RX D2D UE 1511 receives discovery information which the TX D2D UE transmits through a dedicated discovery resource corresponding to the resource allocation information included in the discovery resource response message in the RRC connected state at operation 1529.

The RX D2D UE 1511 does not need to transmit the discovery resource request message to the same eNB, i.e., the eNB 1513 again in order to detect resource allocation information for the dedicated discovery resource which is allocated to the TX D2D UE of which the resource allocation information has been already acquired by the RX D2D UE 1511.

The RX D2D UE 1511 may transmit a discovery resource request message to a new eNB which is different from the eNB 1513 if the RX D2D UE 1511 moves into the new eNB, or may transmit a discovery resource request message to the eNB 1513 if discovery resource information is updated.

Although not shown in FIG. 15, if the dedicated discovery resource is not allocated to the TX D2D UE which corresponds to the D2D ID included in the discovery resource request message, the eNB 1513 may transmit information indicating that a dedicated discovery resource is not allocated to the TX D2D UE to the RX D2D UE 1511. The RX D2D UE 1511 releases the RRC connection with the eNB 1513, and transits into a RRC idle state.

The eNB 1513 manages a discovery resource request table, and the discovery resource request table stores a mapping relation between a D2D ID of a RX D2D UE and a D2D ID of a TX D2D UE for whose dedicated discovery resource information is requested by the RX D2D UE at operation 1527. The eNB 1513 adds an entry into the discovery resource request table upon receiving the discovery resource request message from the RX D2D UE 1511. Here, entries included in the discovery resource request table are removed if a RRC connection between a related RX D2D UE and the eNB 1513 is released, or a related RX D2D UE hands over to other eNB which is different from the eNB 1513, or a related RX D2D UE is powered down.

Although FIG. 15 illustrates still another example of a process of providing information on a dedicated discovery resource to a RX D2D UE in a communication system supporting a D2D scheme according to an embodiment of the present disclosure, various changes could be made to FIG. 15. For example, although shown as a series of operations, various operations in FIG. 15 could overlap, occur in parallel, occur in a different order, or occur multiple times.

Still another example of a process of providing information on a dedicated discovery resource to a RX D2D UE in a communication system supporting a D2D scheme according to an embodiment of the present disclosure has been described with reference to FIG. 15, and still another example of a process of providing information on a dedicated discovery resource to a RX D2D UE in a communication system supporting a D2D scheme according to an embodiment of the present disclosure will be described with reference to FIG. 16.

Figure 16:
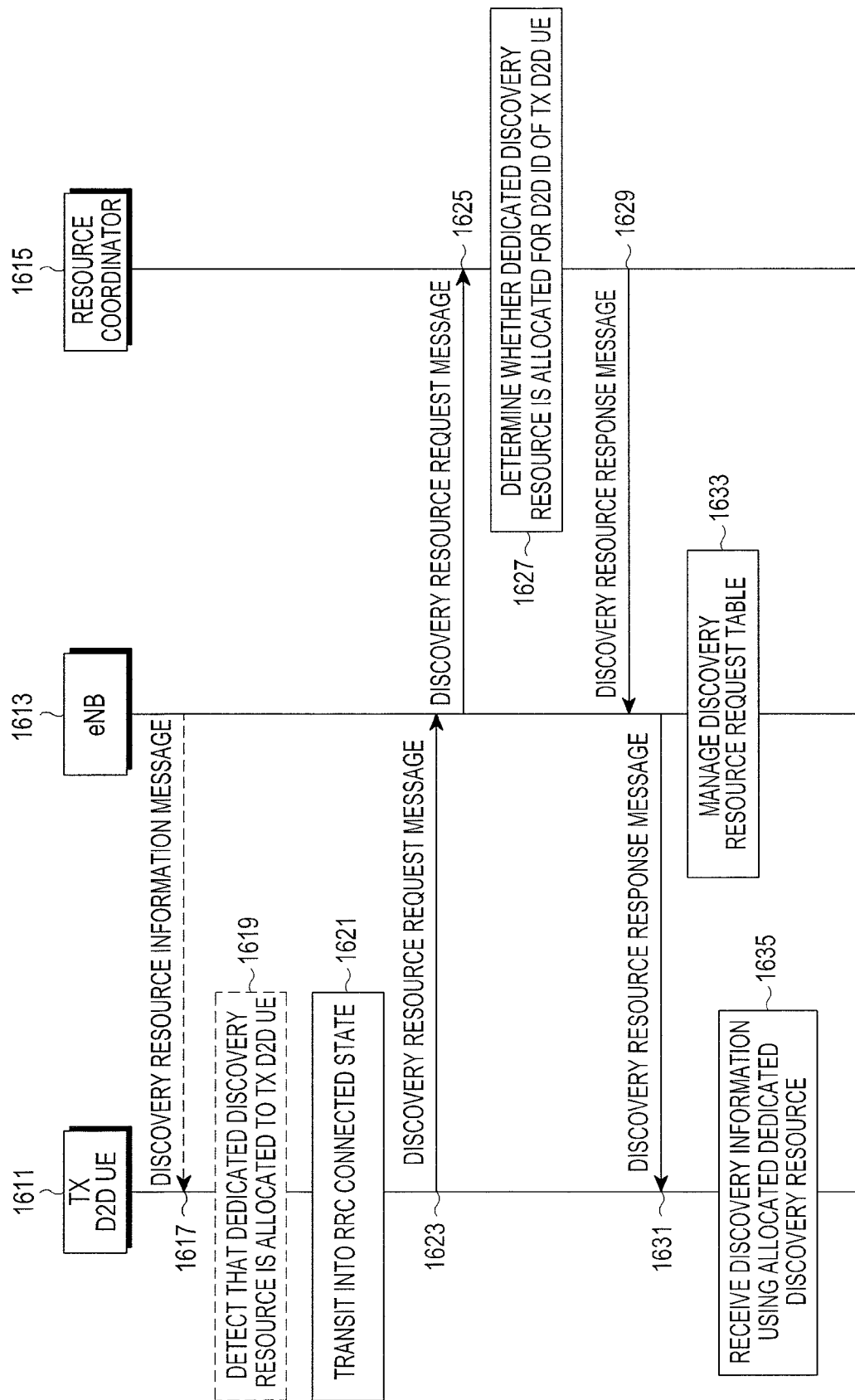
FIG. 16 schematically illustrates still another example of a process of providing information on a dedicated discovery resource to a RX D2D UE in a communication system supporting a D2D scheme according to an embodiment of the present disclosure.

FIG. 16 schematically illustrates still another example of a process of providing information on a dedicated discovery resource to a RX D2D UE in a communication system supporting a D2D scheme according to an embodiment of the present disclosure.

Referring to FIG. 16, the communication system includes a RX D2D UE 1611, an eNB 1613, and a resource coordinator 1615.

The eNB 1613 allocates a dedicated discovery resource to a TX D2D UE (not shown in FIG. 16), and broadcasts information on the allocated dedicated discovery resource at operation 1615. For example, the information on the allocated dedicated discovery resource is broadcasted through system information. The operation 1615 may be optionally performed by the eNB 1513

The RX D2D UE 1611 which is interested in monitoring discovery information which is transmitted by a TX D2D UE establishes a RRC connection with the eNB 1613, and transits into a RRC connected state at operation 1621. The RX D2D UE 1611 transmits a discovery resource request message to the eNB 1613 at operation 1623. The RX D2D UE 1611 includes a D2D ID of the TX D2D UE which the RX D2D UE 1611 wants to monitor into the discovery resource request message. The D2D ID may be a UE ID, an application user ID, an expression code, or an application ID+user ID. The RX D2D UE 1611 may notify that the RX D2D UE 1611 requests a dedicated discovery resource in which the RX D2D UE 1611 receives discovery information which the TX D2D UE transmits. The RX D2D UE 1611 may include a part of a D2D ID, e.g., an application ID, or a D2D category into the discovery resource request message.

A case that the RX D2D UE 1611 establishes the RRC connection with the eNB 1613 transmits the discovery resource request message to the eNB 1613 has been described above.

Alternatively, only upon detecting that the eNB 1613 has allocated a dedicated discovery resource to an arbitrary TX D2D UE at operation 1619, the RX D2D UE 1611 may transmit the discovery resource request message at operation 1621. The RX D2D UE 1611 may detect whether the eNB 1613 has allocated the dedicated discovery resource to the arbitrary TX D2D UE from resource allocation information which is broadcasted by the eNB 1613. In this case, the operation 1615 is not optional. The broadcasted resource allocation information includes information indicating whether an arbitrary dedicated discovery resource is allocated to the arbitrary TX D2D UE.

Upon receiving the discovery resource request message from the RX D2D UE 1611, the eNB 1613 transmits the discovery resource request message to the resource coordinator 1615 at operation 1625. After receiving the discovery resource request message from the eNB 1613, the resource coordinator 1615 checks a discovery resource table to determine whether a dedicated discovery resource is allocated for a D2D ID which is included in the discovery resource request message, i.e., a D2D ID of a TX D2D UE at operation 1627. If the dedicated discovery resource is allocated to a TX D2D UE which corresponds to the D2D ID included in the discovery resource request message, the resource coordinator 1615 transmits a discovery resource response message including resource allocation information for the dedicated discovery resource which is allocated to the TX D2D UE to the eNB 1613 at operation 1629.

After receiving the discovery resource response message from the resource coordinator 1615, the eNB 1613 transmits the discovery resource response message to the RX D2D UE 1611 at operation 1631. After receiving the discovery resource response message from the eNB 1613, the RX D2D UE 1611 does not release the RRC connection with the eNB

1613 and exists in the RRC connected state. The RX D2D UE 1611 receives discovery information which the TX D2D UE transmits through a dedicated discovery resource corresponding to the resource allocation information included in the discovery resource response message in the RRC connected state at operation 1635.

The RX D2D UE 1611 does not need to transmit the discovery resource request message to the same eNB, i.e., the eNB 1613 again in order to detect resource allocation information for the dedicated discovery resource which is allocated to the TX D2D UE of which the resource allocation information has been already acquired by the RX D2D UE 1611.

The RX D2D UE 1611 may transmit a discovery resource request message to a new eNB which is different from the eNB 1613 if the RX D2D UE 1611 moves into the new eNB, or may transmit a discovery resource request message to the eNB 1613 if discovery resource information is updated.

Although not shown in FIG. 16, if the dedicated discovery resource is not allocated to the TX D2D UE which corresponds to the D2D ID included in the discovery resource request message, the eNB 1613 may transmit information indicating that a dedicated discovery resource is not allocated to the TX D2D UE to the RX D2D UE 1611. The RX D2D UE 1611 releases the RRC connection with the eNB 1613, and transits into a RRC idle state.

The eNB 1613 manages a discovery resource request table, and the discovery resource request table stores a mapping relation between a D2D ID of a RX D2D UE and a D2D ID of a TX D2D UE whose dedicated discovery resource information is requested by the RX D2D UE at operation 1633. The eNB 1613 adds an entry into the discovery resource request table upon receiving the discovery resource request message from the RX D2D UE 1611. Here, entries included in the discovery resource request table are removed if a RRC connection between a related RX D2D UE and the eNB 1613 is released, or a related RX D2D UE hands over to other eNB which is different from the eNB 1613, or a related RX D2D UE is powered down.

Although FIG. 16 illustrates still another example of a process of providing information on a dedicated discovery resource to a RX D2D UE in a communication system supporting a D2D scheme according to an embodiment of the present disclosure, various changes could be made to FIG. 16. For example, although shown as a series of operations, various operations in FIG. 16 could overlap, occur in parallel, occur in a different order, or occur multiple times.

Still another example of a process of providing information on a dedicated discovery resource to a RX D2D UE in a communication system supporting a D2D scheme according to an embodiment of the present disclosure has been described with reference to FIG. 16, and still another example of a process of providing information on a dedicated discovery resource to a RX D2D UE in a communication system supporting a D2D scheme according to an embodiment of the present disclosure will be described with reference to FIG. 17.

Figure 17:
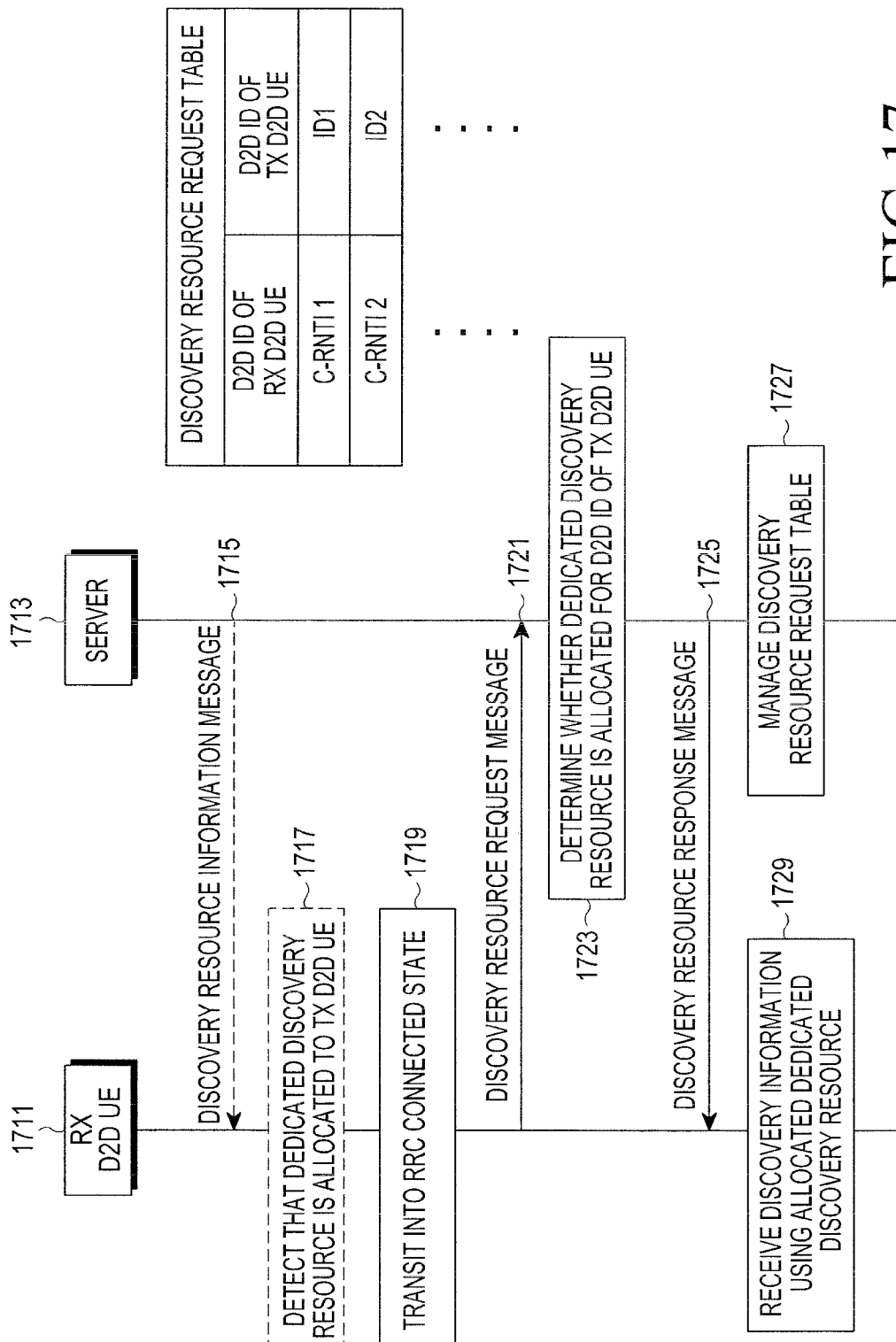
FIG. 17 schematically illustrates still another example of a process of providing information on a dedicated discovery resource to a RX D2D UE in a communication system supporting a D2D scheme according to an embodiment of the present disclosure.

FIG. 17 schematically illustrates still another example of a process of providing information on a dedicated discovery resource to a RX D2D UE in a communication system supporting a D2D scheme according to an embodiment of the present disclosure.

Referring to FIG. 17, the communication system includes a RX D2D UE 1711 and a server 1713.

The server 1713 allocates a dedicated discovery resource to a TX D2D UE (not shown in FIG. 17), and broadcasts information on the allocated dedicated discovery resource at operation 1715. For example, the information on the allocated dedicated discovery resource is broadcasted through system information. The operation 1715 may be optionally performed by the server 1713.

The RX D2D UE 1711 which is interested in monitoring discovery information which is transmitted by a TX D2D UE establishes a RRC connection with the server 1713, and transits into a RRC connected state at operation 1719. The RX D2D UE 1711 transmits a discovery resource request message to the server 1713 at operation 1721. The RX D2D UE 1711 includes a D2D ID of the TX D2D UE which the RX D2D UE 1711 wants to monitor into the discovery resource request message. The D2D ID may be a UE ID, an application user ID, an expression code, or an application ID+user ID. The RX D2D UE 1711 may notify that the RX D2D UE 1711 requests a dedicated discovery resource in which the RX D2D UE 1711 receives discovery information which the TX D2D UE transmits. The RX D2D UE 1711 may include a part of a D2D ID, e.g., an application ID, or a D2D category into the discovery resource request message.

A case that the RX D2D UE 1711 establishes the RRC connection with the server 1713 transmits the discovery resource request message to the server 1713 has been described above.

Alternatively, only upon detecting that the server 1713 has allocated a dedicated discovery resource to an arbitrary TX D2D UE at operation 1717, the RX D2D UE 1711 may transmit the discovery resource request message at operation 1719. The RX D2D UE 1711 may detect whether the server 1713 has allocated the dedicated discovery resource to the arbitrary TX D2D UE from resource allocation information which is broadcasted by the server 1713. The operation 1715 is not optional in this case. The broadcasted resource allocation information includes information indicating whether an arbitrary dedicated discovery resource is allocated to the arbitrary TX D2D UE.

Upon receiving the discovery resource request message from the RX D2D UE 1711, the server 1713 checks a discovery resource table to determine whether a dedicated discovery resource is allocated for a D2D ID which is included in the discovery resource request message, i.e., a D2D ID of a TX D2D UE at operation 1723. If the dedicated discovery resource is allocated to a TX D2D UE which corresponds to the D2D ID included in the discovery resource request message, the server 1713 transmits a discovery resource response message including resource allocation information for the dedicated discovery resource which is allocated to the TX D2D UE to the RX D2D UE 1711 at operation 1725.

After receiving the discovery resource response message from the server 1713, the RX D2D UE 1711 does not release the RRC connection with the server 1713 and exists in the RRC connected state. The RX D2D UE 1711 receives discovery information which the TX D2D UE transmits through a dedicated discovery resource corresponding to the resource allocation information included in the discovery resource response message in the RRC connected state at operation 1729.

The RX D2D UE 1711 does not need to transmit the discovery resource request message to the same server, i.e., the server 1713 again in order to detect resource allocation information for the dedicated discovery resource which is allocated to the TX D2D UE of which the resource allocation information has been already acquired by the RX D2D UE 1711.

The RX D2D UE 1711 may transmit a discovery resource request message to a new server which is different from the server 1713 if the RX D2D UE 1711 moves into the new server, or may transmit a discovery resource request message to the server 1713 if discovery resource information is updated.

Although not shown in FIG. 17, if the dedicated discovery resource is not allocated to the TX D2D UE which corresponds to the D2D ID included in the discovery resource request message, the server 1713 may transmit information indicating that a dedicated discovery resource is not allocated to the TX D2D UE to the RX D2D UE 1711. The RX D2D UE 1711 releases the RRC connection with the server 1713, and transits into a RRC idle state.

The server 1713 manages a discovery resource request table, and the discovery resource request table stores a mapping relation between a D2D ID of a RX D2D UE and a D2D ID of a TX D2D UE for information on dedicated discovery resource which is requested by the RX D2D UE at operation 1727. The server 1713 adds an entry into the discovery resource request table upon receiving the discovery resource request message from the RX D2D UE 1711. Here, entries included in the discovery resource request table are removed if a RRC connection between a related RX D2D UE and the server 1713 is released, or a related RX D2D UE hands over to other server which is different from the server 1713, or a related RX D2D UE is powered down.

The second implementation scheme of the present disclosure has been described with reference to FIGS. 11 to 17, and the third implementation scheme of the present disclosure will be described with reference to FIGS. 18 to 26.

Still another example of a process of allocating a dedicated discovery resource to a TX D2D UE in a communication system supporting a D2D scheme according to an embodiment of the present disclosure will be described with reference to FIG. 18.

Figure 18:
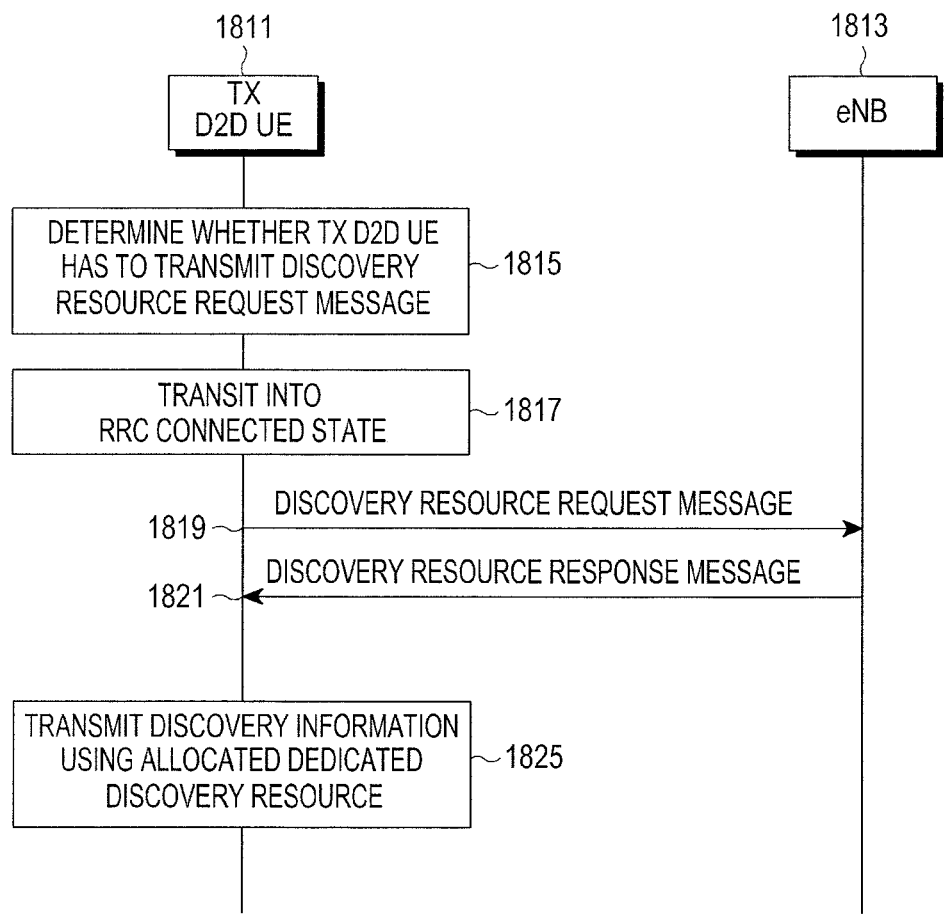
FIG. 18 schematically illustrates still another example of a process of allocating a dedicated discovery resource to a TX D2D UE in a communication system supporting a D2D scheme according to an embodiment of the present disclosure.

FIG. 18 schematically illustrates still another example of a process of allocating a dedicated discovery resource to a TX D2D UE in a communication system supporting a D2D scheme according to an embodiment of the present disclosure.

Referring to FIG. 18, the communication system includes a TX D2D UE 1811, an eNB 1813, and a RX D2D UE 1815. Although not shown in FIG. 18, before executing an operation of FIG. 18, the TX D2D UE 1811 determines whether a cell to which the TX D2D UE 1811 is camped supports a discovery service or not. For example, this can be determined by checking if an SIB carrying discovery information is broadcasted or not by the eNB 1813 in the camped cell.

The TX D2D UE 1811 which is interested in a discovery information transmission determines whether the TX D2D UE 1811 has to transmit a discovery resource request message to the eNB 1813 at operation 1815. The determination to transmit the discovery resource request message by the TX D2D UE 1811 is performed using one or more of the following schemes.

In the first scheme, the eNB 1811 broadcasts whether to support a UE autonomous resource selection (i.e. Type 1) and/or a scheduled discovery resource allocation (i.e. Type 2). The eNB 1811 indicates whether the type 1 and/or the type 2 discovery resource allocation is supported by the network using system information, e.g., a D2D system information block (SIB). Here, a type 1 resource denotes a common discovery resource, and a type 2 resource denotes a dedicated discovery resource. If the network supports a type 2 discovery resource allocation mechanism, the TXD2D UE 1811 which wants to transmit discovery information requests discovery resources to the eNB 1811.

In the second scheme, the network may support both a type 1 discovery resource allocation mechanism and the type 2 discovery resource allocation mechanism, the network may pre-configure a specific D2D UE to use a type 2 discovery resource based on subscription information, e.g., information indicating that a related D2D UE is a high quality D2D UE which requests high quality or a related D2D UE is a stationary D2D UE. In this scheme, the TX D2D UE 1811 which wants to transmit the discovery information and has been pre-configured to use type 2 discovery resources requests discovery resources to the eNB 1811.

In the third scheme, if a D2D UE is pre-configured to use any of type 1 discovery resource and a type 2 discovery resource, and the network supports a type 1 discovery resource allocation mechanism and a type 2 discovery resource allocation mechanism, whether the type 1 discovery resource or the type 2 discovery resource is used may be determined in a D2D UE implementation.

For example, the TX D2D UE 1811 may always use the type 2 discovery resource. In another example, the TX D2D UE 1811 may request the type 2 discovery resource if higher layers in the TX D2D UE 1811 indicate that the type 2 discovery resource is used for transmitting specific discovery information. In still another example, upon detecting that the type 1 discovery resource is used by other D2D UEs, the TX D2D UE 1811 requests type 2 discovery resources.

In the fourth scheme, the eNB 1813 signals a DL received signal power threshold value in a unicast or broadcast manner. If DL received signal power of a DL signal from the eNB 1813 which is measured by the TX D2D UE 1811 is greater than the DL received signal power threshold value, the TX D2D UE 1811 uses a type 2 discovery resource.

In the fifth scheme, the TX D2D UE 1811 transmits requests for discovery resources to the eNB 1813 if the TX D2D UE 1811 is in a RRC connected state and did not transmit a discovery resource request since the TX D2D UE 1811 transits into the RRC connected state, or the TX D2D UE 1811 is in a RRC Idle and common discovery TX resources are not broadcasted by the eNB 1813, or if the number of discovery resources required by the TX D2D UE 1811 has changed since the last time that the TX D2D UE 1811 has transmitted a discovery resource request or if after the last time the TX D2D UE 1811 transmitted a discovery resource request message, the TX D2D UE 1811 was connected to a cell not supporting discovery.

At operation 1815, if the TX D2D UE 1811 determines that the TX D2D UE 1811 has to transmit the discovery resource request message to the eNB 1911 for discovery resources, and the TX D2D UE 1811 is not in a RRC connected state the TX D2D UE 1811 establishes a RRC connection with the eNB 1813, and transits into the RRC connected state at operation 1817. In one embodiment of the present disclosure, the TX D2D UE 1811 which is not in the RRC connected state and interested in a discovery information transmission, initiate a RRC connection establishment process if the discovery information transmission is supported by a cell on which the TX D2D UE 1811 is camped and common resources for discovery information transmissions are not broadcasted. The discovery information transmission is supported if SIB carrying discovery information (e.g. SystemInformationBlockType19) is broadcasted by the cell. Alternately, whether to support the discovery information transmission in cell is determined by an indication in SIB carrying discovery information (e.g. SystemInformationBlockType19) broadcasted by the cell. The TX D2D UE

1811 transmits a discovery resource request message to the eNB 1813 at operation 1819. For example, the discovery resource request message may be a ProSe UE Information message.

The TX D2D UE 1811 indicates to the eNB 1813 through the discovery resource request message how many discovery resources the TX D2D UE 1811 requests or the number of discovery information elements or discovery messages which the TX D2D UE 1811 will transmit. That is, the discovery resource request message may include information indicating the number of the discovery resources or information indicating the number of the discovery information elements or discovery messages. The TX D2D UE 1811 may indicate to the eNB 1813 through the discovery resource request message a period that the TX D2D UE 1811 will transmit discovery information. That is, the discovery resource request message may include information indicating a discovery information transmitting period.

The TX D2D UE 1811 may indicate to the eNB 1813 through the discovery resource request message how long the TX D2D UE 1811 requests a related discovery resource for respective discovery information. That is, the discovery resource request message may include information indicating discovery resource maintain time.

The discovery resource request message may include a discovery resource request index. If the TX D2D UE 1811 requests for resources for multiple discovery information transmissions in a discovery resource request message then, a discovery resource request index is allocated for each requested resource.

The discovery resource request message may include a priority level for each requested resource in discovery resource request.

The TX D2D UE 1811 may indicate a desired resource type (a contention based type or a dedicated type) of the TX D2D UE 1811 in the discovery resource request message. If the requests for resources for multiple discovery information transmissions are included in a discovery resource request message, the desired resource type is included for each resource request.

The discovery resource request message may include, a range class associated with discovery information to be announced. In one embodiment of the present disclosure, a discovery service indicator may be defined. The discovery service indicator indicates a set of values for parameters such as a discovery period, a priority, a range class, duration, and the like. The discovery resource request message may include a discovery service indicator corresponding to discovery information transmission for which the discovery resource is requested. The discovery service indicator may be included in the discovery resource request message instead of individual parameters.

Although not shown in FIG. 18, the eNB 1813 performs an operation of checking whether the TX D2D UE 2511 is a D2D UE which is authorized to request a discovery resource. The eNB 1813 performs the operation of checking whether the TX D2D UE 1811 is the D2D UE which is permitted to request the discovery resource based on a UE context which is received from an MME. If the TX D2D UE 1811 is authorized to request the discovery resource the eNB 1813 allocates a discovery resource to the TX D2D UE 1811.

For example, the UE context includes at least one of (1) information indicating whether a D2D UE is permitted to request a discovery resource, (2) information indicating how many discovery resources may be allocated to a D2D UE, (3) information indicating a discovery resource mechanism which a D2D UE uses, and (4) information indicating whether a D2D UE is a stationary D2D UE. The discovery resource mechanism includes one of a type 1 discovery resource mechanism and a type 2 discovery resource mechanism. In a type 1 (or UE autonomous resource selection) discovery resource mechanism, a TX D2D UE randomly selects resources from a resource pool. Resources selected by multiple TX D2D UEs can be same, and hence may collide in type 1 discovery resource mechanism. In a type 2 (or scheduled resource allocation) discovery resource mechanism, discovery resources are allocated to a TX D2D UE by a network. There is no collision in type 2 discovery resource mechanism.

If the eNB 1813 determines that the TX D2D UE 1811 is not authorized for ProSe direct discovery announcement, the eNB 1813 rejects the discovery resource request message and indicates the same to the TX D2D UE 1811 in a discovery resource response. The rejection can be explicitly indicated in the discovery resource response. Alternately, a discovery resource response message with no discovery resources can indicate the rejection of discovery resource request message.

After receiving the discovery resource request message from the TX D2D UE 1811 and checking that TX D2D UE 1811 is authorized to request discovery resources, the eNB 1813 allocates one or more dedicated discovery resources to the TX D2D UE 1811 at operation 1821. The dedicated discovery resource can be a dedicated discovery resource pool, wherein the TX D2D UE 1811 randomly selects resource for discovery information transmission. The dedicated discovery resource can be a dedicated discovery resource pool with one or more resource indexes indicating the assigned resources within the discovery resource pool.

The eNB 1813 transmits a discovery resource response message as a response message to the discovery resource request message to the TX D2D UE 1811 at operation 1821. For example, the discovery resource response message may be a RRC connection reconfiguration message. The discovery resource response message includes information on the dedicated discovery resource which is allocated to the TX D2D UE 1811.

The dedicated discovery resource information can be a dedicated discovery resource pool wherein the TX D2D UE 1811 randomly selects resource for discovery information transmission. The dedicated discovery resource information can be a dedicated discovery resource pool with one or more resource indexes indicating the resources within the discovery resource pool assigned to the TX D2D UE 1811. The resource index may include a time index and a frequency index. The time index may indicate radio frame and/or subframe having the assigned discovery resource. The frequency index indicates the discovery physical channel index or physical radio block index of the assigned discovery resource. The information on the dedicated discovery resource may include a related dedicated discovery resource period. Alternately the discovery resource period is broadcasted by a network and not signaled dedicatedly. The dedicated discovery resource period represents a period during which a related discovery resource is available. The dedicated discovery resource period may be set to n*discovery resource cycle. Here, the n may be signaled through the discovery resource response message, or may be pre-defined.

The eNB 1813 may include a discovery resource allocation index for an allocated dedicated discovery resource into the discovery resource response message. The discovery resource allocation index may be used in order for the TX D2D UE 1811 or the eNB 1813 to request to release dedicated discovery resources. That is, if the discovery resource request message includes the discovery resource request index, the eNB 1813 sets the discovery resource allocation index to the same as the discovery resource request index.

Alternatively, if the discovery resource request message does not include the discovery resource request index, the eNB 1813 manages the discovery resource allocation index per D2D UE, and includes the discovery resource allocation index into the discovery resource response message.

Alternatively, regardless of whether the discovery resource request index is included in the discovery resource request message, the eNB 1813 manages the discovery resource allocation index per D2D UE, and includes the discovery resource allocation index into the discovery resource response message.

Meanwhile, if the range class is received in the discovery resource request message, the eNB 1813 sets power parameters for assigned discovery resources (a contention based pool or dedicated discovery resources) according to the range class. If the TX D2D UE 1811 has informed a different range class for a different discovery information transmission, the eNB 1813 sets different power parameters for each of the assigned discovery resources (the contention based pool or the dedicated discovery resources). If the range class is received in the discovery resource request message and if the eNB 1813 assigns Type 1 TX resource pool in discovery resource response then, the eNB 1813 assigns a TX resource pool corresponding to range class requested, wherein the eNB 1813 maintains a separate TX resource pool for each range class.

Alternatively, a range class associated with the TX D2D UE 1811 may be determined by the eNB 1813 from a UE context which is received from an MME, so the eNB 1813 sets power parameters for discovery resources (a contention based pool or dedicated discovery resources) which are allocated to the TX D2D UE 1811 according to the range class. If the eNB 1813 assigns Type 1 TX resource pool in discovery resource response, the eNB 1813 assigns a TX resource pool corresponding to range class requested, wherein the eNB 1813 maintains a separate TX resource pool for each range class.

If the range class is not received in the discovery resource request message or the range class is not received from an MME in a UE's context, and if the eNB 1813 assigns a Type 1 TX resource pool in discovery resource response, the eNB 1813 may assign multiple TX resource pools, wherein the eNB 1813 maintains a separate TX resource pool for each range class. The TX D2D UE 1811 will select the TX resource pool based on the range class. Alternately, the eNB 1813 may broadcast or transmit in discovery resource response mapping between a range class and a power parameter (e.g. max power) for each range class supported by a network. The TX D2D UE 1811 will select the power parameters corresponding to an authorized range class of the TX D2D UE 1811 or a range class associated with discovery information which the TX D2D UE 1811 wants to transmit.

The eNB 1813 may configure the TX D2D UE 1811 to transmit the discovery resource request messages regardless of a type of the allocated discovery resources. If a type 1 resource is allocated through a discovery resource response message to the discovery resource request message, the TX D2D UE 1811 will transmit discovery resource request messages to the eNB 1813 for adding discovery resources. The eNB 1813 may indicate the number of discovery resources which the TX D2D UE 1811 may use from the allocated type 1 TX resource pool. If the TX D2D UE 1811 requires more allowed discovery resources, the D2D UE 1811 transmits the discovery resource request message.

The discovery resource request message may include information on previous discovery resource request messages. For example, the TX D2D UE 1811 transmits a discovery resource request message for one discovery resource to acquire one discovery resource. Thereafter, the TX D2D UE 1811 may need additional discovery resource. In this case, there may be two options.

The first option will be described below.

The TX D2D UE 1811 transmits a discovery resource request message including only information on additional discovery resource request. That is, the TX D2D UE 1811 transmits a discovery resource request message including only information on one additional discovery resource request which is required at a related timing point.

The second option will be described below.

The TX D2D UE 1811 transmits a discovery resource request message including information on a plurality of discovery resources, e.g., two discovery resources, i.e., one additional discovery resource and one new discovery resource to the eNB 1813. The eNB 1813 does not need to track received discovery resource request messages, so the eNB 1813 forms cumulative request information which helps the eNB 1813 and will be forwarded to a target eNB (not shown in FIG. 18) if the TX D2D UE 1811 hands over to the target eNB.

The discovery response message may indicate time for which the allocated discovery resources are available. Alternatively, the discovery response message may indicate time after which the allocated discovery resources will expire. For example, the discovery resource response message may indicate that discovery resources are available for x transmissions, and a period between the transmissions is n*discovery resource cycle.

If a dedicated discovery response is used only in a RRC connected state, dedicated discovery resources are released by the TX D2D UE 1811 or the eNB 1813 through explicit signaling, or no time period is defined until a RRC connection is released, and allocated discovery resources are available.

The time from which the received discovery resource configuration in discovery resource response is applicable and used by TX D2D UE 1811 for discovery information transmission is determined as follows.

In the first scheme, if an eNB transmits a discovery resource response message at a discovery resource cycle x, or a TX D2D UE receives the discovery resource response message at the discovery resource cycle x, the first instance of a dedicated discovery resource which is allocated to the TX D2D UE exists at the pth discovery resource cycle after the discovery resource cycle x, i.e., a discovery resource cycle x+p. The p may be fixed in the communication system, for example, the p may be set to 1 (p=1) which means that if discovery resources are included in the discovery resource response then the TX D2D UE 1811, from the next discovery resource cycle use the resources indicated in the discovery resource response for discovery information transmission. Alternately p may be signaled in discovery resource response message.

The first scheme has been performed in the manner described with reference to FIG. 2, and a description thereof will be omitted herein.

In the second scheme, if a difference between a sub-frame/frame in which a discovery resource response message is received and a sub-frame/frame which corresponds to a dedicated discovery resource which is allocated at the first discovery resource cycle after a discovery resource cycle x in which the discovery resource response message is received, i.e., a discovery resource cycle x+1 is less than a preset offset, the first instance of a dedicated discovery resource which is allocated to a TX D2D UE exists at a discovery resource cycle x+2. In this case, the offset is included in the discovery resource response message.

The second scheme has been performed in the manner described with reference to FIG. 3, and a description thereof will be omitted herein.

In the third scheme, if a difference between a sub-frame/frame in which a discovery resource response message is received and a sub-frame/frame which corresponds to a dedicated discovery resource which is allocated at the first discovery resource cycle after a discovery resource cycle x in which the discovery resource response message is received, i.e., a discovery resource cycle x+1 is equal to or greater than a preset offset, the first instance of a dedicated discovery resource which is allocated to a TX D2D UE exists at the discovery resource cycle x+1. In this case, the offset is included in the discovery resource response message.

The third scheme has been performed in the manner described with reference to FIG. 4, and a description thereof will be omitted herein.

Further, the eNB 1813 may indicate whether a dedicated discovery resource which is allocated to the TX D2D UE 1811 is available in a RRC idle state.

The TX D2D UE 1811 transmits discovery information using the dedicated discovery resource in the RRC idle state at operation 1825. If the dedicated discovery resource is available during a specific period, the TX D2D UE 1811 establishes a RRC connection with the eNB 1813, and requests dedicated discovery resources to the eNB 1813 again. It will be noted that the eNB 1813 maintains information on the allocated dedicated discovery resource even though the TX D2D UE 1811 releases the RRC connection. The eNB 1813 releases the allocated dedicated discovery resources after the available period. Alternately after receiving the discovery resource response message from the eNB with assigned discovery resources the TX D2D UE 1811 transmits discovery information using the assigned discovery resources in the RRC connected state at operation 1825.

A case that a TX D2D UE selects a new cell in a RRC idle state, establishes a RRC connection with a new eNB, and requests a dedicated discovery resource to the new eNB may occur. Here, the new eNB is called a target eNB. In this case, the TX D2D UE may indicate information on an old eNB which has allocated a dedicated discovery resource which the TX D2D UE uses in the RRC idle state to the target eNB. So, the target eNB may communicate with a source eNB to acquire a UEs context, and requests to the source eNB to release dedicated discovery resources which the source eNB has allocated to the TX D2D UE.

Alternatively, the TX D2D UE may exist in a RRC connected state without transiting into other state, and request dedicated discovery resources if necessary. Further, an eNB may update information on discovery resources for the TX D2D UE if necessary.

An operation of handling the dedicated resource allocation when a TX D2D UE hands over from the source eNB to a target eNB will be described below.

(1) Dedicated Discovery Resource Handling Operation #1

A source eNB does not transmit information on a dedicated discovery resource which is allocated to a TX D2D UE which will hand over to a target eNB. After receiving a handover success indication from the target eNB, the source eNB releases the dedicated discovery resource which is allocated to the TX D2D UE. In an embodiment of the present disclosure, the handover success indication from the target eNB may be a UE context release message. After successfully handing over to the target eNB, the TX D2D UE requests discovery resources by transmitting discovery resource request to the target eNB. This will be described below.

An example of a process of handling the dedicated resource allocation when TX D2D UE hands over from the source eNB to a target eNB in a communication system supporting a D2D scheme according to an embodiment of the present disclosure will be described with reference to FIG. 19.

Figure 19:
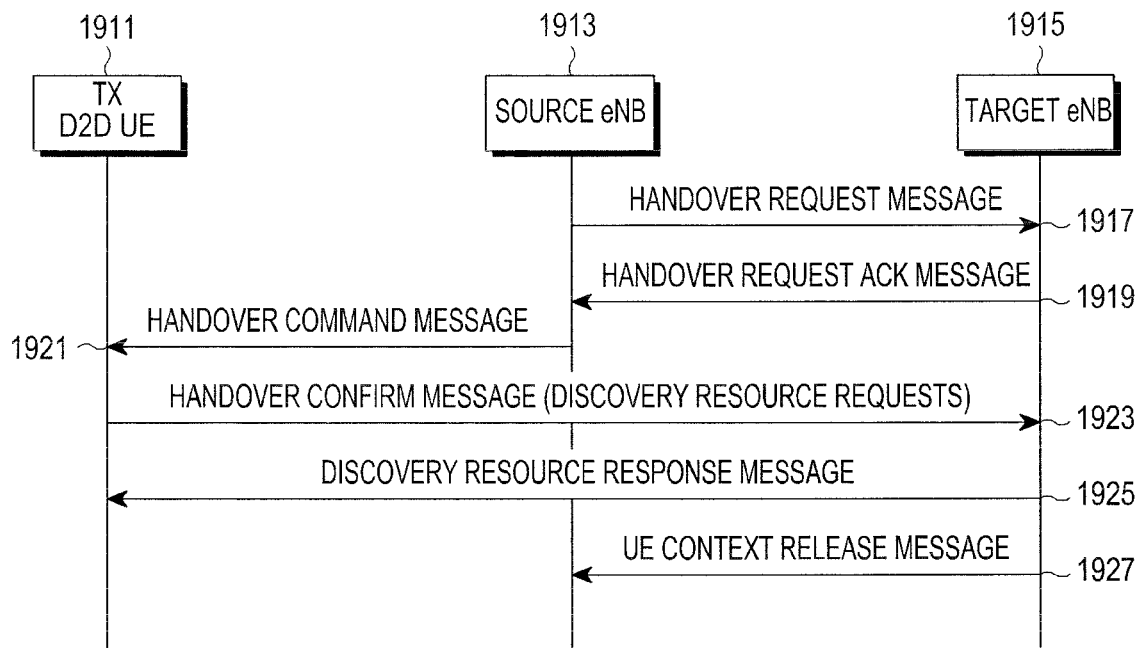
FIG. 19 schematically illustrates an example of a process of handling the dedicated resource allocation when a TX D2D UE hands over from the source eNB to a target eNB in a communication system supporting a D2D scheme according to an embodiment of the present disclosure.

FIG. 19 schematically illustrates an example of a process of handling dedicated resource allocation when TX D2D UE hands over from the source eNB to a target eNB in a communication system supporting a D2D scheme according to an embodiment of the present disclosure.

Referring to FIG. 19, the communication system includes a TX D2D UE 1911, a source eNB 1913, and a target eNB 1915.

The source eNB 1913 transmits a handover request message for the TX D2D UE 1911 to the target eNB 1915 at operation 1917. After receiving the handover request message from the source eNB 1913, the target eNB 1915 transmits a handover request acknowledgement (ACK) message as a response message to the handover request message to the source eNB 1913 at operation 1919. After receiving the handover request ACK message from the target eNB 1915, the source eNB 1913 transmits a handover command message to the TX D2D UE 1911 at operation 1921.

After receiving the handover command message from the source eNB 1913, the TX D2D UE 1911 transmits a handover confirm message to the target eNB 1915 at operation 1923. In FIG. 19, the handover confirm message includes the request for discovery resources. After receiving the handover confirm message, the target eNB 1915 may know that the handover confirm message includes request for discovery resources, and transmits a discovery resource response message to the TX D2D UE 1911 at operation 1925. The target eNB 1915 transmits a UE context release message to the source eNB 1913 at operation 1927. After receiving the UE context release message from the target eNB 1915, the source eNB 1913 releases a dedicated discovery resource which is allocated to the TX D2D UE 1911.

Although FIG. 19 illustrates an example of a process of handling dedicated resource allocation when a TX D2D UE hands over from the source eNB to a target eNB in a communication system supporting a D2D scheme according to an embodiment of the present disclosure, various changes could be made to FIG. 19. For example, although shown as a series of operations, various operations in FIG. 19 could overlap, occur in parallel, occur in a different order, or occur multiple times.

An example of a process of handling dedicated resource allocation when a TX D2D UE hands over from the source eNB to a target eNB in a communication system supporting a D2D scheme according to an embodiment of the present disclosure has been described with reference to FIG. 19, and another example of a process of releasing a dedicated discovery resource which is allocated from a source eNB if a TX D2D UE hands over from the source eNB to a target eNB in a communication system supporting a D2D scheme according to an embodiment of the present disclosure will be described with reference to FIG. 20.

Figure 20:
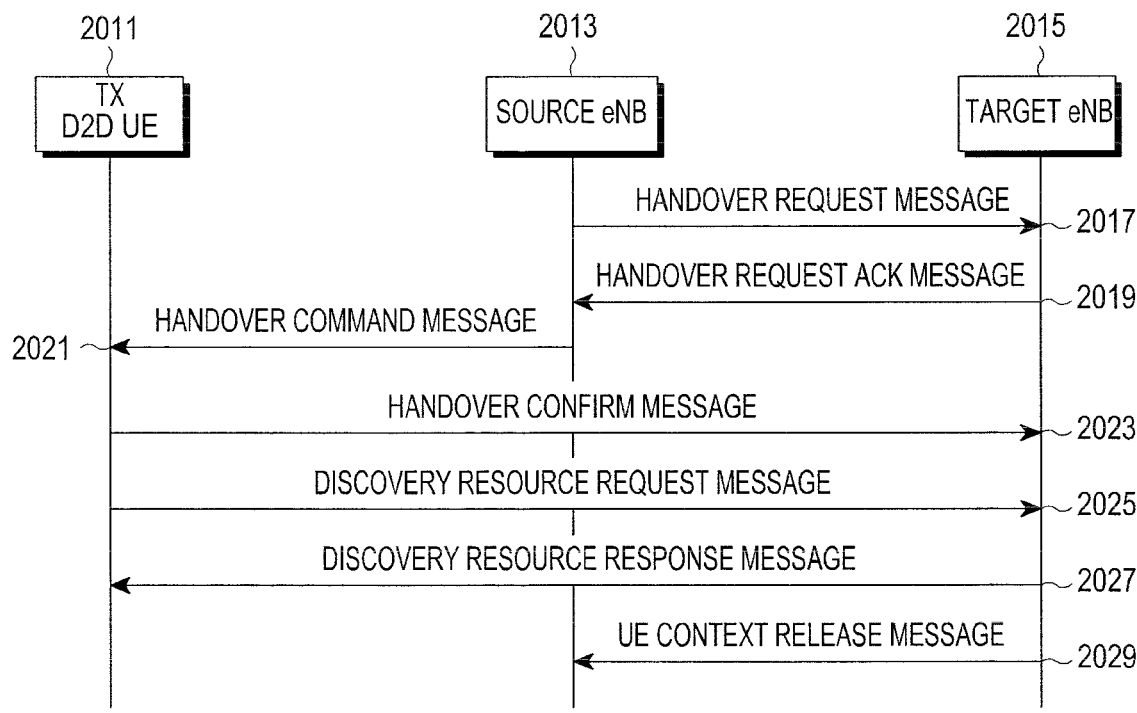
FIG. 20 schematically illustrates another example of a process of handling the dedicated resource allocation when a TX D2D UE hands over from the source eNB to a target eNB in a communication system supporting a D2D scheme according to an embodiment of the present disclosure.

FIG. 20 schematically illustrates another example of a process handling dedicated resource allocation when if a TX D2D UE hands over from the source eNB to a target eNB in a communication system supporting a D2D scheme according to an embodiment of the present disclosure.

Referring to FIG. 20, the communication system includes a TX D2D UE 2011, a source eNB 2013, and a target eNB 2015.

The source eNB 2013 transmits a handover request message for the TX D2D UE 2011 to the target eNB 2015 at operation 2017. After receiving the handover request message from the source eNB 2013, the target eNB 2015 transmits a handover request ACK message as a response message to the handover request message to the source eNB 2013 at operation 2019. After receiving the handover request ACK message from the target eNB 2015, the source eNB 2013 transmits a handover command message to the TX D2D UE 2011 at operation 2021.

After receiving the handover command message from the source eNB 2013, the TX D2D UE 2011 transmits a handover confirm message to the target eNB 2015 at operation 2023. The TX D2D UE 2011 transmits a discovery resource request message to the target eNB 2015 at operation 2025. After receiving the discovery resource request message from the TX D2D UE 2011, the target eNB 2015 transmits a discovery resource response message to the TX D2D UE 2011 at operation 2027. The target eNB 2015 transmits a UE context release message to the source eNB 2013 at operation 2029. After receiving the UE context release message from the target eNB 2015, the source eNB 2013 releases a dedicated discovery resource which is allocated to the TX D2D UE 2011.

(2) Dedicated Discovery Resource Handling Operation #2

A source eNB transmits information on a dedicated discovery resource which is allocated to a TX D2D UE which will hand over to a target eNB. For example, the information on the dedicated discovery resource which is allocated to the TX D2D UE is transmitted through a handover request message. If the target eNB supports a D2D discovery service, the target eNB may allocate a new dedicated discovery resource to the TX D2D UE or may modify a part of dedicated discovery resources which are already allocated. For example, the target eNB may transmit information on the dedicated discovery resource to the TX D2D UE to the source eNB through a handover request ACK message. The source eNB transmits information on the TX D2D UE, i.e., information on a dedicated discovery resource which is allocated to the TX D2D UE to the TX D2D UE through one of a RRC reconfiguration message, a discovery resource response message, and a handover command message. This will be described below.

Still another example of a process of handling dedicated resource allocation when a TX D2D UE hands over from the source eNB to a target eNB in a communication system supporting a D2D scheme according to an embodiment of the present disclosure will be described with reference to FIG. 21.

Figure 21:
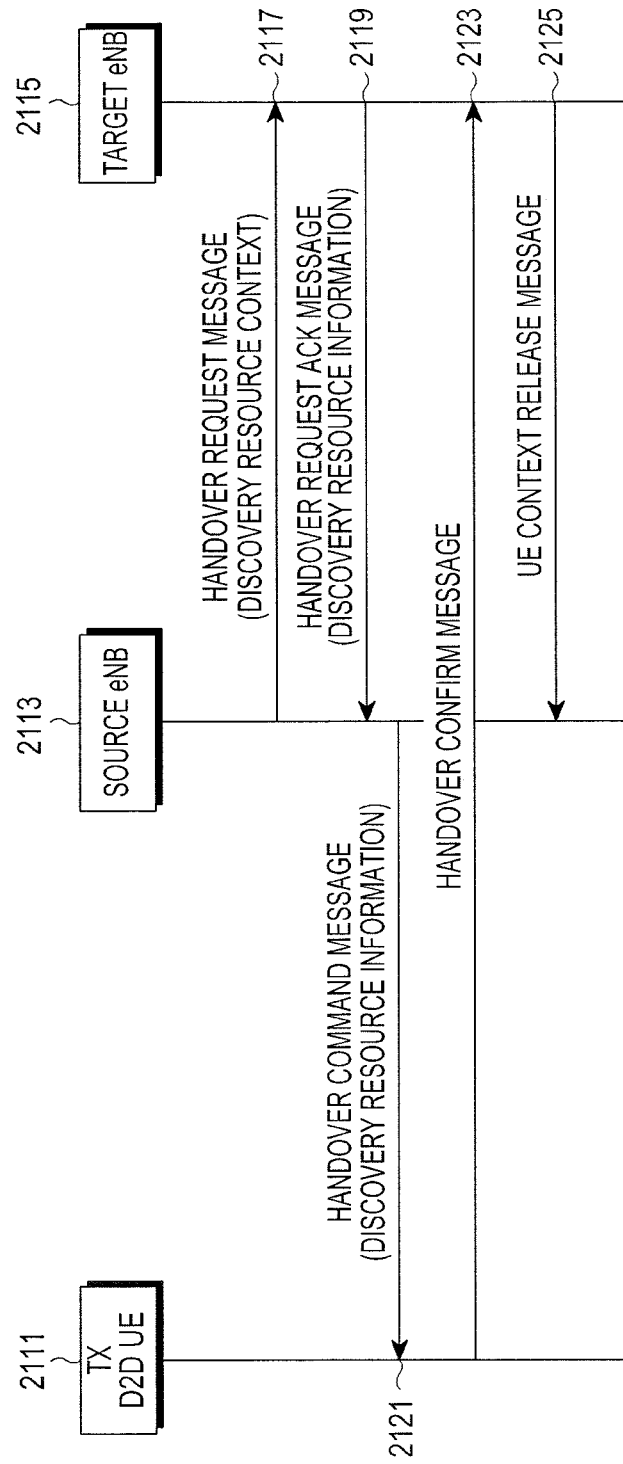
FIG. 21 schematically illustrates still another example of a process of handling the dedicated resource allocation when a TX D2D UE hands over from the source eNB to a target eNB in a communication system supporting a D2D scheme according to an embodiment of the present disclosure.

FIG. 21 schematically illustrates still another example of a handling dedicated resource allocation when if a TX D2D UE hands over from the source eNB to a target eNB in a communication system supporting a D2D scheme according to an embodiment of the present disclosure.

Referring to FIG. 21, the communication system includes a TX D2D UE 2111, a source eNB 2113, and a target eNB 2115.

The source eNB 2113 transmits a handover request message for the TX D2D UE 2111 to the target eNB 2115 at operation 2117. The handover request message includes a discovery resource context information i.e. information of dedicated discovery resources which are allocated to the TX D2D UE 2111. After receiving the handover request message from the source eNB 2113, the target eNB 2115 transmits a handover request ACK message as a response message to the handover request message to the source eNB 2113 at operation 2119. The handover request ACK message includes discovery resource information.

After receiving the handover request ACK message from the target eNB 2115, the source eNB 2113 transmits a handover command message to the TX D2D UE 2111 at operation 2121. After receiving the handover command message from the source eNB 2113, the TX D2D UE 2111 transmits a handover confirm message to the target eNB 2115 at operation 2123. After receiving the handover confirm message from the TX D2D UE 2111, the target eNB 2115 transmits a UE context release message to the TX D2D UE 2111 at operation 2125. After receiving the UE context release message from the target eNB 2115, the source eNB 2113 releases a dedicated discovery resource which is allocated to the TX D2D UE 2111.

Although FIG. 21 illustrates still another example of a process handling dedicated resource allocation when a TX D2D UE hands over from the source eNB to a target eNB in a communication system supporting a D2D scheme according to an embodiment of the present disclosure, various changes could be made to FIG. 21. For example, although shown as a series of operations, various operations in FIG. 21 could overlap, occur in parallel, occur in a different order, or occur multiple times.

Still another example of a process of handling the dedicated resource allocation when a TX D2D UE hands over from the source eNB to a target eNB in a communication system supporting a D2D scheme according to an embodiment of the present disclosure has been described with reference to FIG. 21, and still another example of a process of releasing a dedicated discovery resource which is allocated from a source eNB if a TX D2D UE hands over from the source eNB to a target eNB in a communication system supporting a D2D scheme according to an embodiment of the present disclosure will be described with reference to FIG. 22.

Figure 22:
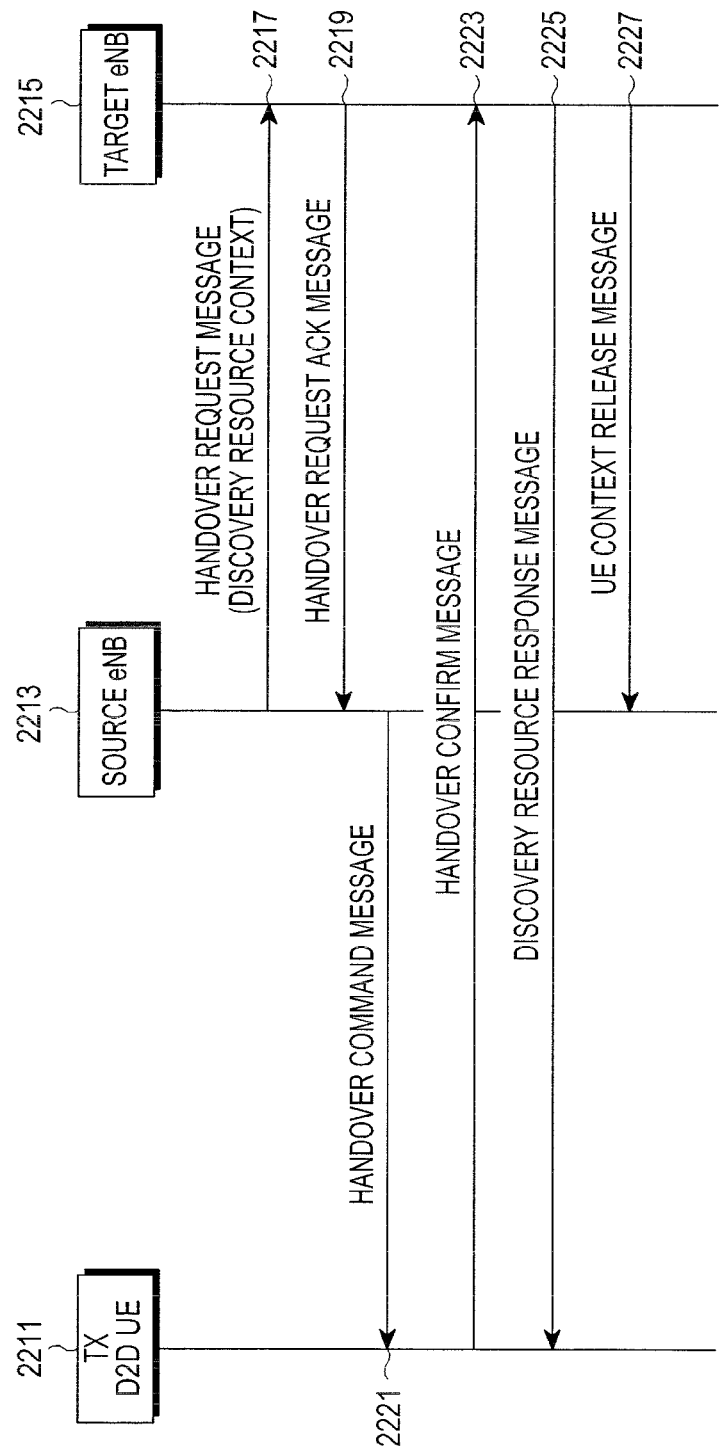
FIG. 22 schematically illustrates still another example of a process of handling the dedicated resource allocation when a TX D2D UE hands over from the source eNB to a target eNB in a communication system supporting a D2D scheme according to an embodiment of the present disclosure.

FIG. 22 schematically illustrates still another example of a process of handling dedicated resource allocation when if a TX D2D UE hands over from the source eNB to a target eNB in a communication system supporting a D2D scheme according to an embodiment of the present disclosure.

Referring to FIG. 22, the communication system includes a TX D2D UE 2211, a source eNB 2213, and a target eNB 2215.

The source eNB 2213 transmits a handover request message for the TX D2D UE 2211 to the target eNB 2215 at operation 2217. The handover request message includes a discovery resource context information i.e. information of dedicated discovery resources which are allocated to the TX D2D UE 2211. After receiving the handover request message from the source eNB 2213, the target eNB 2215 transmits a handover request ACK message as a response message to the handover request message to the source eNB 2213 at operation 2219.

After receiving the handover request ACK message from the target eNB 2215, the source eNB 2213 transmits a handover command message to the TX D2D UE 2211 at operation 2221. After receiving the handover command message from the source eNB 2213, the TX D2D UE 2211 transmits a handover confirm message to the target eNB 2215 at operation 2223. After receiving the handover confirm message from the TX D2D UE 2211, the target eNB 2215 transmits a discovery resource response message to the TX D2D UE 2211 at operation 2225. The target eNB 2215 transmits a UE context release message to the source eNB 2213 at operation 2227. After receiving the UE context release message from the target eNB 2215, the source eNB 2213 releases a dedicated discovery resource which is allocated to the TX D2D UE 2211.

Although FIG. 22 illustrates still another example of a process of releasing a dedicated discovery resource which is allocated from a source eNB if a TX D2D UE hands over from the source eNB to a target eNB in a communication system supporting a D2D scheme according to an embodiment of the present disclosure, various changes could be made to FIG. 22. For example, although shown as a series of operations, various operations in FIG. 22 could overlap, occur in parallel, occur in a different order, or occur multiple times.

Meanwhile, after a TX D2D UE hands over to a target eNB, that is, the target eNB receives a handover complete message or a RRC connection reconfiguration message from the TX D2D UE, the target eNB may transmit information on new dedicated discovery resources. The target eNB wants to continuously use a dedicated discovery resource which has been already allocated to the TX D2D UE, so the target eNB may not allocate new dedicated discovery resources if the target eNB supports a D2D discovery service and dedicated discovery resources. After receiving a handover success indication from the target eNB, a source eNB releases a dedicated discovery resource which is allocated to the TX D2D UE. For example, the handover success indication from the target eNB may be a UE context release message. The TX D2D UE continuously uses the dedicated discovery resource which is allocated by the source eNB until the target eNB requests to release the dedicated discovery resource which is allocated by the source eNB or the target eNB allocates the new dedicated discovery resources to the TX D2D UE.

For example, the TX D2D UE stops using the dedicated discovery resource which is allocated by the source eNB until the target eNB requests to continuously use the dedicated discovery resource which is allocated by the source eNB or allocates the new dedicated discovery resources to the TX D2D UE. The target eNB may indicate to the TX D2D UE whether the TX D2D UE has to continuously use a dedicated discovery resource which has been already allocated.

(3) Dedicated Discovery Resource Handling Operation #3

A source eNB transmits to a target eNB the information on dedicated discovery resources (a type 1 resource pool or dedicated discovery resources) which are allocated to a TX D2D UE by the source eNB The source eNB also transmits to the target eNB the information received from the TX D2D UE in a discovery resource request. The source eNB may transmit this information to the target eNB directly in a handover request message or via an MME. If dedicated discovery resources have been already allocated to the TX D2D UE by the source eNB, the target eNB may allocate new dedicated discovery resources or update a part of the dedicated discovery resources which have been already allocated. If dedicated discovery resources have been already allocated to the TX D2D UE by the source eNB, the target eNB may allocate a type 1 resource pool to the TX D2D UE after receiving information on the dedicated discovery resources from the source eNB.

If the TX D2D UE uses the type 1 resource pool in the source eNB, the target eNB may allocate dedicated discovery resources to the TX D2D UE. If the TX D2D UE uses a type 2 resource pool in the source eNB, the target eNB may request to the TX D2D UE to release the type 1 resource pool. The TX D2D UE transmits a discovery resource request message to the target eNB.

The target eNB transmits the information on the dedicated discovery resource to the source eNB using a handover request ACK message. The source eNB transmits the information on the dedicated discovery resource to the TX D2D UE through one of a RRC reconfiguration message, a discovery resource response message, and a handover command message.

(4) Dedicated Discovery Resource Handling Operation #4

If a TX D2D UE uses a type 1 resource pool in a source eNB, a dedicated discovery resource releasing operation is performed as a dedicated discovery resource handling operation #1. If the TX D2D UE uses dedicated discovery resources which the source eNB allocates, a dedicated discovery resource handling operation is performed as a dedicated discovery resource releasing operation #2.

After allocating dedicated discovery resources, an eNB may determine that a TX D2D UE has to exist in a RRC connected state or a RRC idle state. Here, the eNB may determine that the TX D2D UE has to exist in the RRC connected state or the RRC idle state based on a mobility state of the TX D2D UE. If a RRC connection is released, the eNB may indicate whether allocated dedicated discovery resources are available in the RRC idle state.

A dedicated resource which is allocated to the TX D2D UE is released in one of the following cases.

a) The TX D2D UE is powered down.
b) The TX D2D UE indicates to the eNB that the TX D2D UE does not need the allocated dedicated resource any more.

Upon determining not to transmit discovery information any more, the TX D2D UE may indicate that the TX D2D UE does not require allocated discovery resource any more.

c) A period during which the allocated dedicated discovery resource is available is terminated.
d) The TX D2D UE hands over to other eNB.
e) The eNB wants to withdraw the allocated dedicated discovery resource.
f) A RRC connection is terminated.

This is for a case that the dedicated discovery resource is used in only a RRC connected state.

Meanwhile, a TX D2D UE transmits a discovery resource release message to an eNB. If a plurality of dedicated discovery resources are allocated to the TX D2D UE, and the TX D2D UE wants to release a part of the plurality of the dedicated discovery resources, the TX D2D UE indicates the number of dedicated discovery resources which will be released or retained or the dedicated discovery resources which will be released.

In an eNB initiated release case, or as a response to a discovery resource release message from a TX D2D UE, the eNB transmits a discovery resource release message or RRC connection reconfiguration message, releases dedicated discovery resources, and indicates old dedicated discovery resources (if any) or the released dedicated discovery resources.

For example, all dedicated discovery resources are released if a discovery resource release message or a RRC reconfiguration message is received. If allocated dedicated discovery resources are available only in a RRC connected state, or all dedicated discovery resources are released, the eNB may transmit a connection release message to release all dedicated discovery resources.

For example, the discovery resource release message may become a discovery resource request message, and indicate discovery resource release by the TX D2D UE. That is, the discovery resource request message may be used for requesting a discovery resource or releasing a discovery resource.

For example, the discovery resource release message may become a discovery resource response message, and indicate discovery resource release by the eNB. The discovery resource response message may be used for allocating a discovery resource or releasing a discovery resource.

If allocated dedicated discovery resources are available only in a RRC connected state, or all dedicated discovery resources are released, a TX D2D UE may transmit a connection release message to release all dedicated discovery resources.

After releasing a dedicated discovery resource which is allocated to a TX D2D UE, an eNB updates information on the dedicated discovery resource into discovery resource information to remove information on the released dedicated discovery resource. The updated discovery resource information is transmitted at time that system information is broadcasted.

If there is update for dedicated discovery resources for a TX D2D UE, information on the updated dedicated discovery resource is notified to a RX D2D UE which corresponds to a dedicated discovery resource of the TX D2D UE based on a discovery resource request table.

An operation of releasing a type 2 discovery resource which is allocated to a RX D2D UE from an eNB will be described below.

(1) Type 2 Discovery Resource Releasing Operation #1

In a UE initiated release case, a TX D2D UE transmits a discovery resource release message to an eNB. If a plurality of dedicated discovery resources are allocated to the TX D2D UE, and the TX D2D UE wants to release a part of the plurality of dedicated discovery resources, the TX D2D UE indicates the number of dedicated discovery resources which will be released.

(2) Type 2 Discovery Resource Releasing Operation #2

In an eNB initiated release case, or as a response to a discovery resource release message from a TX D2D UE, an eNB transmits the discovery resource release message, releases dedicated discovery resources which are allocated to the TX D2D UE, and indicates old dedicated discovery resources (if any). After receiving the discovery resource release message, the TX D2D UE does not use the released dedicated discovery resources. For example, if the discovery resource release message is received in a discovery resource cycle x by the TX D2D UE, dedicated discovery resources are released from a discovery resource cycle x+p, and p is greater than 0. The p may be pre-configured or signaled.

The TX D2D UE releases the allocated dedicated discovery resource from discovery resources which correspond to system information, e.g., information on a discovery resource which is signaled through an SIB, e.g., a discovery resource RX pool. Here, the TX D2D UE will check whether the allocated dedicated discovery resource is included in the discovery resources which correspond to the SIB. If the allocated dedicated discovery resource is not included in the discovery resources which correspond to the SIB, the TX D2D UE will consider that the dedicated discovery resource is released.

An operation of releasing a type 2 discovery resource which is allocated from an eNB to a TX D2D UE in a communication system supporting a D2D scheme according to an embodiment of the present disclosure will be described with reference to FIGS. 23 to 28.

An example of a process of releasing a type 2 discovery resource which is allocated from an eNB to a TX D2D UE in a communication system supporting a D2D scheme according to an embodiment of the present disclosure will be described with reference to FIG. 23.

Figure 23:
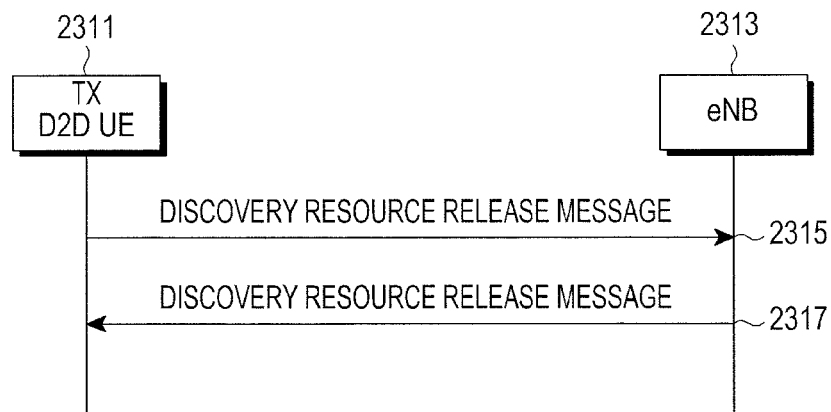
FIG. 23 schematically illustrates an example of a process of releasing a type 2 discovery resource which is allocated from an eNB to a TX D2D UE in a communication system supporting a D2D scheme according to an embodiment of the present disclosure.

FIG. 23 schematically illustrates an example of a process of releasing a type 2 discovery resource which is allocated from an eNB to a TX D2D UE in a communication system supporting a D2D scheme according to an embodiment of the present disclosure.

Referring to FIG. 23, the communication system includes a TX D2D UE 2311 and an eNB 2313.

The TX D2D UE 2311 transmits a discovery resource release message to the eNB 2313 at operation 2315. After receiving the discovery resource release message from the TX D2D UE 2311, the eNB 2313 releases dedicated discovery resources which are allocated to the TX D2D UE 2311, and transmits a discovery resource release message as a response message to the discovery resource release message at operation 2317.

An example of a process of releasing a type 2 discovery resource which is allocated from an eNB to a TX D2D UE in a communication system supporting a D2D scheme according to an embodiment of the present disclosure has been described with reference to FIG. 23, and another example of a process of releasing a type 2 discovery resource which is allocated from an eNB to a TX D2D UE in a communication system supporting a D2D scheme according to an embodiment of the present disclosure will be described with reference to FIG. 24.

Figure 24:
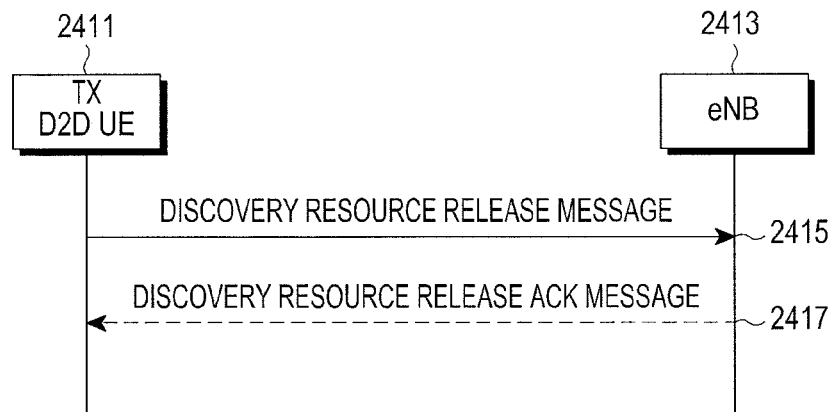
FIG. 24 schematically illustrates another example of a process of releasing a type 2 discovery resource which is allocated from an eNB to a TX D2D UE in a communication system supporting a D2D scheme according to an embodiment of the present disclosure.

FIG. 24 schematically illustrates another example of a process of releasing a type 2 discovery resource which is allocated from an eNB to a TX D2D UE in a communication system supporting a D2D scheme according to an embodiment of the present disclosure.

Referring to FIG. 24, the communication system includes a TX D2D UE 2411 and an eNB 2413.

Upon determining to release a discovery resource which is allocated to the TX D2D UE 2411, the eNB 2413 transmits a discovery resource release message to the TX D2D UE 2411 at operation 2415. After receiving the discovery resource release message from the eNB 2413, the TX D2D UE 2411 transmits a discovery resource release ACK message to the eNB 2413 at operation 2417.

Another example of a process of releasing a type 2 discovery resource which is allocated from an eNB to a TX D2D UE in a communication system supporting a D2D scheme according to an embodiment of the present disclosure has been described with reference to FIG. 24, and still example of a process of releasing a type 2 discovery resource which is allocated from an eNB to a TX D2D UE in a communication system supporting a D2D scheme according to an embodiment of the present disclosure will be described with reference to FIG. 25.

Figure 25:
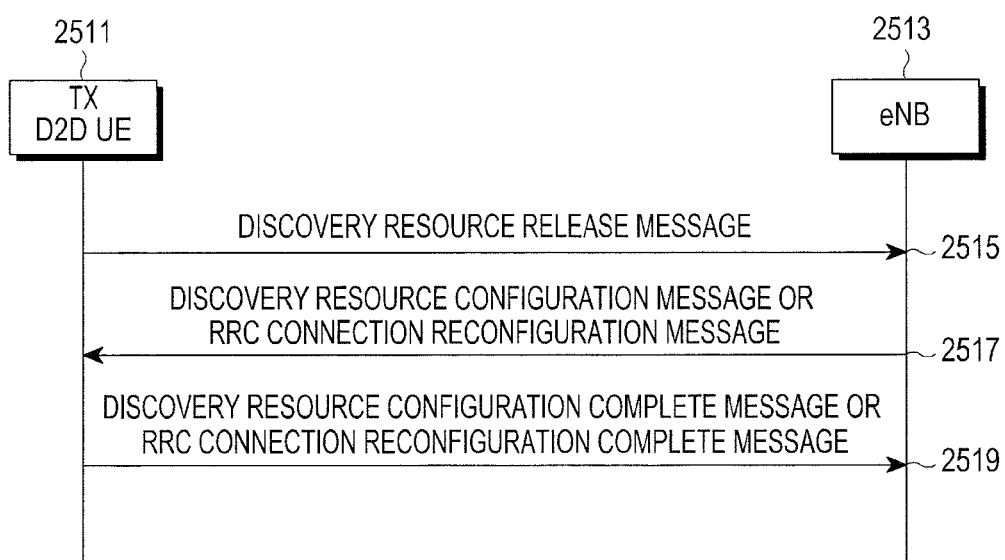
FIG. 25 schematically illustrates still another example of a process of releasing a type 2 discovery resource which is allocated from an eNB to a TX D2D UE in a communication system supporting a D2D scheme according to an embodiment of the present disclosure.

FIG. 25 schematically illustrates still another example of a process of releasing a type 2 discovery resource which is allocated from an eNB to a TX D2D UE in a communication system supporting a D2D scheme according to an embodiment of the present disclosure.

Referring to FIG. 25, the communication system includes a TX D2D UE 2511 and an eNB 2513.

The TX D2D UE 2511 transmits a discovery resource release message to the eNB 2513 at operation 2515. After receiving the discovery resource release message from the TX D2D UE 2511, the eNB 2513 releases dedicated discovery resources which are allocated to the TX D2D UE 2511, and transmits a discovery resource configuration message or a RRC connection reconfiguration message as a response message to the discovery resource release message to the TX D2D UE 2511 at operation 2517. After receiving the discovery resource configuration message or the RRC connection reconfiguration message from the eNB 2513, the TX D2D UE 2511 transmits a discovery resource configuration complete message as a response message to the discovery resource configuration message or a RRC connection reconfiguration complete message as a response message to the RRC connection reconfiguration message to the eNB 2513 at operation 2519.

Still another example of a process of releasing a type 2 discovery resource which is allocated from an eNB to a TX D2D UE in a communication system supporting a D2D scheme according to an embodiment of the present disclosure has been described with reference to FIG. 25, and still example of a process of releasing a type 2 discovery resource which is allocated from an eNB to a TX D2D UE in a communication system supporting a D2D scheme according to an embodiment of the present disclosure will be described with reference to FIG. 26.

Figure 26:
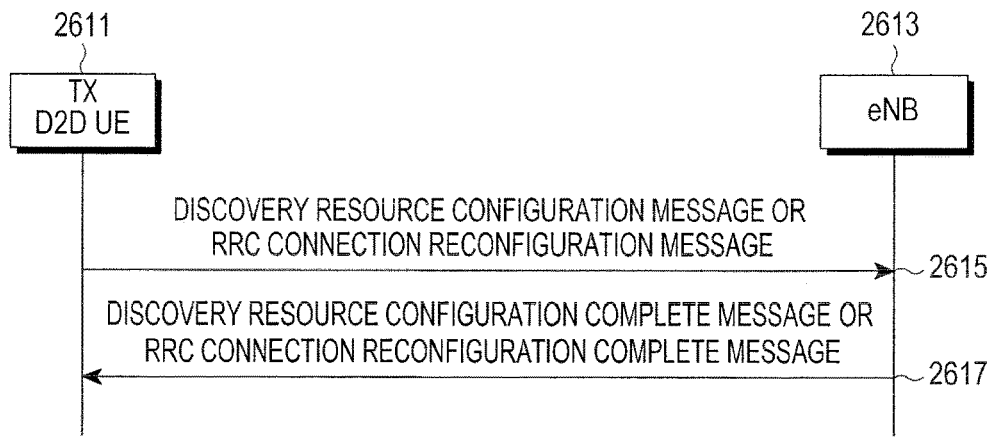
FIG. 26 schematically illustrates still another example of a process of releasing a type 2 discovery resource which is allocated from an eNB to a TX D2D UE in a communication system supporting a D2D scheme according to an embodiment of the present disclosure.

FIG. 26 schematically illustrates still another example of a process of releasing a type 2 discovery resource which is allocated from an eNB to a TX D2D UE in a communication system supporting a D2D scheme according to an embodiment of the present disclosure.

Referring to FIG. 26, the communication system includes a TX D2D UE 2611 and an eNB 2613.

Upon determining to release a discovery resource which is allocated to the TX D2D UE 2611, the eNB 2613 transmits a discovery resource configuration message or a RRC connection reconfiguration message to the TX D2D UE 2611 at operation 2615. After receiving the discovery resource configuration message or the RRC connection reconfiguration message from the eNB 2613, the TX D2D UE 2611 transmits a discovery resource configuration complete message as a response message to the discovery resource configuration message or a RRC connection reconfiguration complete message as a response message to the RRC connection reconfiguration message to the eNB 2613 at operation 2617.

Still another example of a process of releasing a type 2 discovery resource which is allocated from an eNB to a TX D2D UE in a communication system supporting a D2D scheme according to an embodiment of the present disclosure has been described with reference to FIG. 26, and an inner structure of a TX D2D UE in a communication system supporting a D2D scheme according to an embodiment of the present disclosure will be described with reference to FIG. 27.

Figure 27:
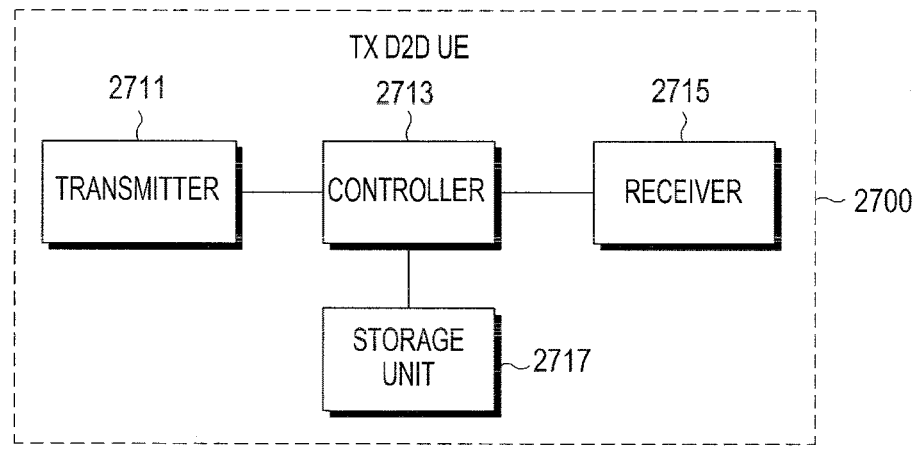
FIG. 27 schematically illustrates an inner structure of a TX D2D UE in a communication system supporting a D2D scheme according to an embodiment of the present disclosure.

FIG. 27 schematically illustrates an inner structure of a TX D2D UE in a communication system supporting a D2D scheme according to an embodiment of the present disclosure.

Referring to FIG. 27, a TX D2D UE 2700 includes a transmitter 2711, a controller 2713, a receiver 2715, and a storage unit 2717.

The controller 2713 controls the overall operation of the TX D2D UE 2700. More particularly, the controller 2713 controls the TX D2D UE 2700 to perform an operation related to an operation of transmitting/receiving resource allocation information according to an embodiment of the present disclosure. The operation related to the operation of transmitting/receiving the resource allocation information is performed in the manner described with reference to FIGS. 1 to 26, and a description thereof will be omitted herein.

The transmitter 2711 transmits various signals, various messages, and the like to a RX D2D UE, an eNB, a server, and the like under a control of the controller 2713. The various signals, the various messages, and the like transmitted in the transmitter 2711 have been described in FIGS. 1 to 39, and a description thereof will be omitted herein.

The receiver 2715 receives various signals, various messages, and the like from the RX D2D UE, the eNB, the server, and the like under a control of the controller 2713. The various signals, the various messages and the like received in the receiver 2715 have been described in FIGS. 1 to 26, and a description thereof will be omitted herein.

The storage unit 2717 stores various data necessary for the operation of the TX D2D UE 2700, information related to the operation of transmitting/receiving the resource allocation information, and the like. The storage unit 2717 stores the various signals, the various messages, and the like received in the receiver 2715.

While the transmitter 2711, the controller 2713, the receiver 2715, and the storage unit 2717 are described as separate processors, it is to be understood that this is merely for convenience of description. In other words, two or more of the transmitter 2711, the controller 2713, the receiver 2715, and the storage unit 2717 may be incorporated into a single processor.

An inner structure of a TX D2D UE in a communication system supporting a D2D scheme according to an embodiment of the present disclosure has been described with reference to FIG. 27, and an inner structure of a RX D2D UE in a communication system supporting a D2D scheme according to an embodiment of the present disclosure will be described with reference to FIG. 28.

Figure 28:
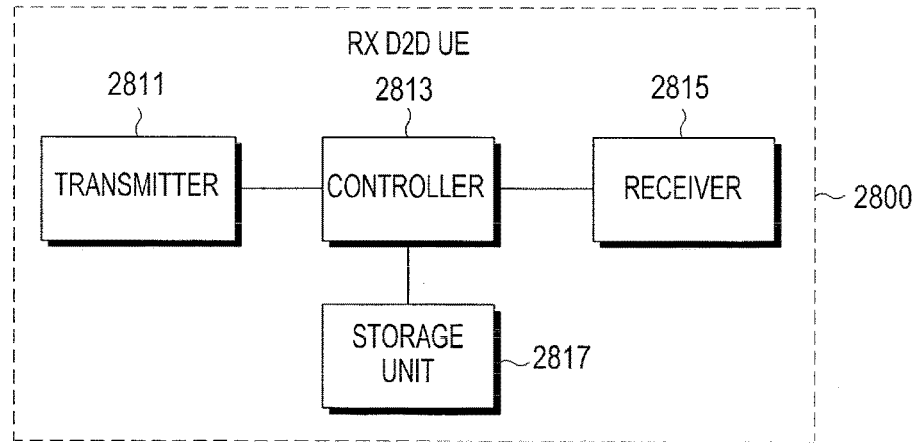
FIG. 28 schematically illustrates an inner structure of a RX D2D UE in a communication system supporting a D2D scheme according to an embodiment of the present disclosure.

FIG. 28 schematically illustrates an inner structure of a RX D2D UE in a communication system supporting a D2D scheme according to an embodiment of the present disclosure.

Referring to FIG. 28, a RX D2D UE 2800 includes a transmitter 2811, a controller 2813, a receiver 2815, and a storage unit 2817.

The controller 2813 controls the overall operation of the RX D2D UE 2800. More particularly, the controller 2813 controls the RX D2D UE 2800 to perform an operation related to an operation of transmitting/receiving resource allocation information according to an embodiment of the present disclosure. The operation related to the operation of transmitting/receiving the resource allocation information is performed in the manner described with reference to FIGS. 1 to 26, and a description thereof will be omitted herein.

The transmitter 2811 transmits various signals, various messages, and the like to a TX D2D UE, an eNB, a server, and the like under a control of the controller 2813. The various signals, the various messages, and the like transmitted in the transmitter 2811 have been described in FIGS. 1 to 26, and a description thereof will be omitted herein.

The receiver 2815 receives various signals, various messages, and the like from the TX D2D UE, the eNB, the server, and the like under a control of the controller 2813. The various signals, the various messages and the like received in the receiver 2815 have been described in FIGS. 1 to 26, and a description thereof will be omitted herein.

The storage unit 2817 stores various data necessary for the operation of the RX D2D UE 2800, information related to the operation of transmitting/receiving the resource allocation information, and the like. The storage unit 2817 stores the various signals, the various messages, and the like received in the receiver 2815.

While the transmitter 2811, the controller 2813, the receiver 2815, and the storage unit 2817 are described as separate processors, it is to be understood that this is merely for convenience of description. In other words, two or more of the transmitter 2811, the controller 2813, the receiver 2815, and the storage unit 2817 may be incorporated into a single processor.

An inner structure of a RX D2D UE in a communication system supporting a D2D scheme according to an embodiment of the present disclosure has been described with reference to FIG. 28, and an inner structure of an eNB in a communication system supporting a D2D scheme according to an embodiment of the present disclosure will be described with reference to FIG. 29.

Figure 29:
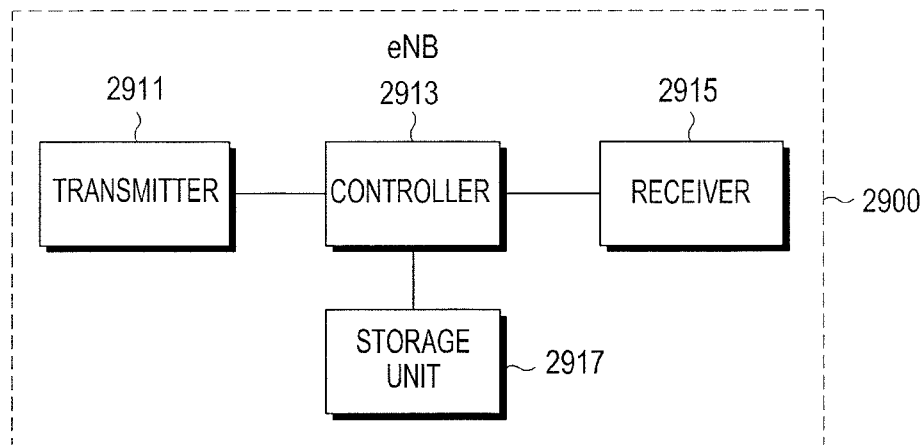
FIG. 29 schematically illustrates an eNB in a communication system supporting a D2D scheme according to an embodiment of the present disclosure.

FIG. 29 schematically illustrates an eNB in a communication system supporting a D2D scheme according to an embodiment of the present disclosure.

Referring to FIG. 29, an eNB 2900 includes a transmitter 2911, a controller 2913, a receiver 2915, and a storage unit 2917.

The controller 2913 controls the overall operation of the eNB 2900. More particularly, the controller 2913 controls the eNB 2900 to perform an operation related to an operation of transmitting/receiving resource allocation information according to an embodiment of the present disclosure. The operation related to the operation of transmitting/receiving the resource allocation information is performed in the manner described with reference to FIGS. 1 to 26, and a description thereof will be omitted herein.

The transmitter 2911 transmits various signals, various messages, and the like to a TX D2D UE, a RX D2D UE, a server, a resource coordinator, and the like under a control of the controller 2913. The various signals, the various messages, and the like transmitted in the transmitter 2911 have been described in FIGS. 1 to 26 and a description thereof will be omitted herein.

The receiver 2915 receives various signals, various messages, and the like from the TX D2D UE, the RX D2D UE, the server, the resource coordinator, and the like under a control of the controller 2913. The various signals, the various messages and the like received in the receiver 2915 have been described in FIGS. 1 to 26, and a description thereof will be omitted herein.

The storage unit 2917 stores various data necessary for the operation of the eNB 2900, information related to the operation of transmitting/receiving the resource allocation information, and the like. The storage unit 2917 stores the various signals, the various messages, and the like received in the receiver 2915.

While the transmitter 2911, the controller 2913, the receiver 2915, and the storage unit 2917 are described as separate processors, it is to be understood that this is merely for convenience of description. In other words, two or more of the transmitter 2911, the controller 2913, the receiver 2915, and the storage unit 2917 may be incorporated into a single processor.

An inner structure of an eNB in a communication system supporting a D2D scheme according to an embodiment of the present disclosure has been described with reference to FIG. 29, and an inner structure of a resource coordinator in a communication system supporting a D2D scheme according to an embodiment of the present disclosure will be described with reference to FIG. 30.

Figure 30:
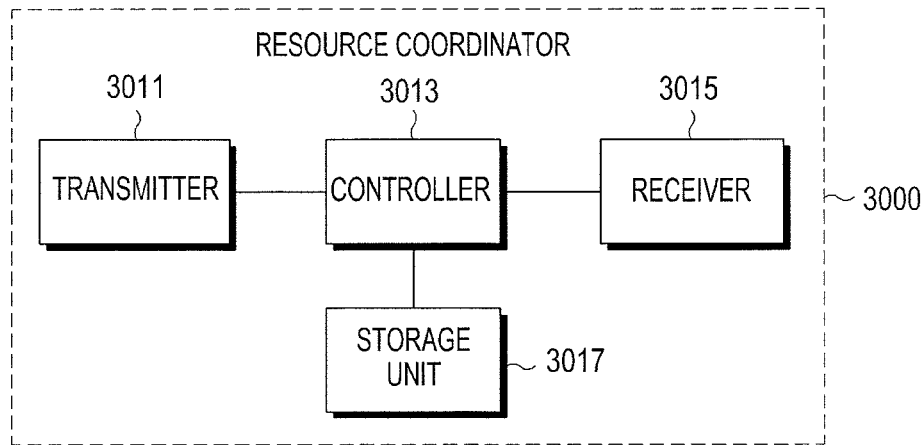
FIG. 30 schematically illustrates an inner structure of a resource coordinator in a communication system supporting a D2D scheme according to an embodiment of the present disclosure.

FIG. 30 schematically illustrates an inner structure of a resource coordinator in a communication system supporting a D2D scheme according to an embodiment of the present disclosure.

Referring to FIG. 30, a resource coordinator 3000 includes a transmitter 3011, a controller 3013, a receiver 3015, and a storage unit 3017.

The controller 3013 controls the overall operation of the resource coordinator 3000. More particularly, the controller 3013 controls the resource coordinator 3000 to perform an operation related to an operation of transmitting/receiving resource allocation information according to an embodiment of the present disclosure. The operation related to the operation of transmitting/receiving the resource allocation information is performed in the manner described with reference to FIGS. 1 to 26, and a description thereof will be omitted herein.

The transmitter 3011 transmits various signals, various messages, and the like to an eNB, a server, and the like under a control of the controller 3013. The various signals, the various messages, and the like transmitted in the transmitter 3011 have been described in FIGS. 1 to 26, and a description thereof will be omitted herein.

The receiver 3015 receives various signals, various messages, and the like from the eNB, the server, and the like under a control of the controller 3013. The various signals, the various messages and the like received in the receiver 3015 have been described in FIGS. 1 to 26, and a description thereof will be omitted herein.

The storage unit 3017 stores various data necessary for the operation of the resource coordinator 3000, information related to the operation of transmitting/receiving the resource allocation information, and the like. The storage unit 3017 stores the various signals, the various messages, and the like received in the receiver 3015.

While the transmitter 3011, the controller 3013, the receiver 3015, and the storage unit 3017 are described as separate processors, it is to be understood that this is merely for convenience of description. In other words, two or more of the transmitter 3011, the controller 3013, the receiver 3015, and the storage unit 3017 may be incorporated into a single processor.

An inner structure of a resource coordinator in a communication system supporting a D2D scheme according to an embodiment of the present disclosure has been described with reference to FIG. 30, and an inner structure of a server in a communication system supporting a D2D scheme according to an embodiment of the present disclosure will be described with reference to FIG. 31.

Figure 31:
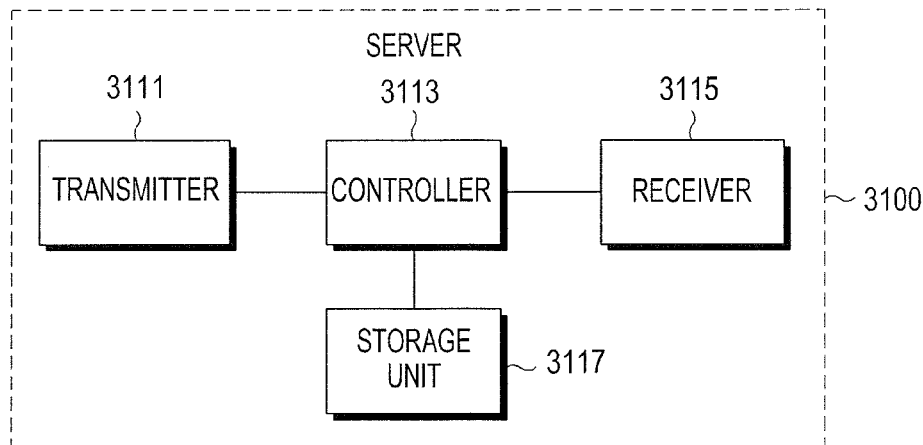
FIG. 31 schematically illustrates an inner structure of a server in a communication system supporting a D2D scheme according to an embodiment of the present disclosure.

FIG. 31 schematically illustrates an inner structure of a server in a communication system supporting a D2D scheme according to an embodiment of the present disclosure.

Referring to FIG. 31, a server 3100 includes a transmitter 3111, a controller 3113, a receiver 3115, and a storage unit 3117.

The controller 3113 controls the overall operation of the server 3100. More particularly, the controller 3113 controls the server 3100 to perform an operation related to an operation of transmitting/receiving resource allocation information according to an embodiment of the present disclosure. The operation related to the operation of transmitting/receiving the resource allocation information is performed in the manner described with reference to FIGS. 1 to 26, and a description thereof will be omitted herein.

The transmitter 3111 transmits various signals, various messages, and the like to an eNB, a resource coordinator, and the like under a control of the controller 3113. The various signals, the various messages, and the like transmitted in the transmitter 3111 have been described in FIGS. 1 to 26, and a description thereof will be omitted herein.

The receiver 3115 receives various signals, various messages, and the like from the eNB, the resource coordinator, and the like under a control of the controller 3113. The various signals, the various messages and the like received in the receiver 3115 have been described in FIGS. 1 to 26, and a description thereof will be omitted herein.

The storage unit 3117 stores various data necessary for the operation of the server 3100, information related to the operation of transmitting/receiving the resource allocation information, and the like. The storage unit 3117 stores the various signals, the various messages, and the like received in the receiver 3115.

While the transmitter 3111, the controller 3113, the receiver 3115, and the storage unit 3117 are described as separate processors, it is to be understood that this is merely for convenience of description. In other words, two or more of the transmitter 3111, the controller 3113, the receiver 3115, and the storage unit 3117 may be incorporated into a single processor.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as a data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a source base station (BS), the method comprising:
    transmitting, to a target BS, a first message including information about at least one discovery resource which the source BS allocates to a user equipment (UE), and information received in a discovery resource request of the UE; and
    receiving, from the target BS, a second message including information about at least one discovery resource which the target BS allocates to the UE,
    wherein the information received in the discovery resource request of the UE includes information indicating a number of at least one discovery message for which the UE requests to allocate the at least one discovery resource.

2. The method of claim 1, wherein the at least one discovery resource which the source BS allocates to the UE is indicated by time information and frequency information.

3. The method of claim 1, wherein the at least one discovery resource allocated to the UE from the target BS is used in a next discovery period from a discovery period at which the UE receives the second message.

4. The method of claim 1, wherein the at least one discovery resource which the target BS allocates to the UE is indicated by time information and frequency information.

5. The method of claim 1, further comprising:
    transmitting, to the UE, the information about the at least one discovery resource which the target BS allocates to the UE.

6. A method of a target base station (BS), the method comprising:
    receiving, from a source BS, a first message including information about at least one discovery resource which the source BS allocates to a user equipment (UE), and information received in a discovery resource request of the UE; and
    transmitting, to the source BS, a second message including information about at least one discovery resource which the target BS allocates to the UE,
    wherein the information received in the discovery resource request of the UE includes information indicating a number of at least one discovery message for which the UE requests to allocate the at least one discovery resource.

7. The method of claim 6,
    wherein the at least one discovery resource which the source BS allocates to the UE is indicated by time information and frequency information, and wherein the at least one discovery resource which the target BS allocates to the UE is indicated by time information and frequency information.

8. The method of claim 6, wherein the at least one discovery resource allocated to the UE from the target BS is used in a next discovery period from a discovery period at which the UE receives the second message.

9. A source base station (BS), the source BS comprising:
a transmitter;
a receiver; and
a processor configured to:
  control the transmitter to transmit, to a target BS, a first message including information about at least one discovery resource which the source BS allocates to a user equipment (UE), and information received in a discovery resource request of the UE, and
  control the receiver to receive, from the target BS, a second message including information about at least one discovery resource which the target BS allocates to the UE,
wherein the information received in the discovery resource request of the UE includes information indicating a number of at least one discovery message for which the UE requests to allocate the at least one discovery resource.

10. The source BS of claim 9, wherein the at least one discovery resource which the source BS allocates to the UE is indicated by time information and frequency information.

11. The source BS of claim 9, wherein the at least one discovery resource allocated to the UE from the target BS is used in a next discovery period from a discovery period at which the UE receives the second message.

12. The source BS of claim 9, wherein the at least one discovery resource which the target BS allocates to the UE is indicated by time information and frequency information.

13. The source BS of claim 9, wherein the processor is further configured to control the transmitter to transmit, to the UE, the information about the at least one discovery resource which the target BS allocates to the UE.

14. A target base station (BS), the target BS comprising:
a transmitter;
a receiver; and
a processor configured to:
  control the receiver to receive, from a source BS, a first message including information about at least one discovery resource which the source BS allocates to a user equipment (UE), and information received in a discovery resource request of the UE, and
  control the transmitter to transmit, to the source BS, a second message including information about at least one discovery resource which the target BS allocates to the UE,
wherein the information received in the discovery resource request of the UE includes information indicating a number of at least one discovery message for which the UE requests to allocate the at least one discovery resource.

15. The target BS of claim 14,
wherein the at least one discovery resource which the source BS allocates to the UE is indicated by time information and frequency information, and
wherein the at least one discovery resource which the target BS allocates to the UE is indicated by time information and frequency information.

16. The target BS of claim 14, wherein the at least one discovery resource allocated to the UE from the target BS is used in a next discovery period from a discovery period at which the UE receives the second message.

* * * * *